United States Patent
Super et al.

(10) Patent No.: US 10,422,531 B2
(45) Date of Patent: Sep. 24, 2019

(54) SYSTEM AND APPROACH FOR CONTROLLING A COMBUSTION CHAMBER

(71) Applicant: Honeywell International Inc., Morris Plains, NJ (US)

(72) Inventors: Willem Super, Emmen (NL); Frank van Prooijen, Sleen (NL); David Kucera, Bílovice nad Svitavou (CZ); Sybrandus Munsterhuis, Dalen (NL); Jos Praat, Borger (NL)

(73) Assignee: Honeywell International Inc., Morris Plains, NJ (US)

( * ) Notice: Subject to any disclaimer, the term of this patent is extended or adjusted under 35 U.S.C. 154(b) by 303 days.

(21) Appl. No.: 15/600,403

(22) Filed: May 19, 2017

(65) Prior Publication Data
US 2017/0254536 A1    Sep. 7, 2017

Related U.S. Application Data

(63) Continuation-in-part of application No. 14/992,826, filed on Jan. 11, 2016, now Pat. No. 9,657,946, and a
(Continued)

(51) Int. Cl.
*F23K 5/00* (2006.01)
*F23N 1/02* (2006.01)
(Continued)

(52) U.S. Cl.
CPC .............. *F23N 1/022* (2013.01); *F23N 5/003* (2013.01); *G01F 5/005* (2013.01); *G01G 1/36* (2013.01);
(Continued)

(58) Field of Classification Search
CPC ........ F23D 2208/10; F23K 5/002; F23K 5/16; F23K 2203/104; F23K 2900/05001;
(Continued)

(56) References Cited

U.S. PATENT DOCUMENTS 156,769 A    11/1874  Cameron
424,581 A    1/1890  Sickels
(Continued)

FOREIGN PATENT DOCUMENTS

DE    3638604    5/1988
DE    3818363    4/1989
(Continued)

OTHER PUBLICATIONS

"Flexible, Compact and with a High Performance—the New Valvario, G. Kromschroder AG Launches it's New, Improved Series of Gas Fittings," Press Release, 2 pages, 2003.
(Continued)

*Primary Examiner* — Gregory L Huson
*Assistant Examiner* — Daniel E Namay
(74) *Attorney, Agent, or Firm* — Seager, Tufte & Wickhem LLP

(57) ABSTRACT

A system for controlling activity in a combustion chamber. The system does not necessarily need to be mechanically adjusted and yet may provide precise control of a fuel air mixture ratio. A sensing module of the system may have a mass flow sensor that relates to air flow and another sensor that relates to fuel flow. Neither sensor may need contact with fuel. Fuel and air to the system may be controlled. Pressure of the fuel and/or air may be regulated. The sensors may provide signals to a processor to indicate a state of the fuel and air in the system. The processor, with reliance on a programmed curve, table or the like, often based on data, in a storage memory, may regulate the flow or pressure of the
(Continued)

fuel and air in a parallel fashion to provide an appropriate fuel-air mixture to the combustion chamber.

19 Claims, 19 Drawing Sheets

Related U.S. Application Data continuation-in-part of application No. 14/485,519, filed on Sep. 12, 2014, said application No. 14/992,826 is a continuation of application No. 13/621,175, filed on Sep. 15, 2012, now Pat. No. 9,234,661.

(51) Int. Cl.
| | |
|---|---|
| F23N 5/00 | (2006.01) |
| G01F 5/00 | (2006.01) |
| G01G 1/36 | (2006.01) |
| F23K 5/14 | (2006.01) |
| G01F 1/34 | (2006.01) |

(52) U.S. Cl.
CPC .............. F23N 2025/06 (2013.01); F23N 2900/05181 (2013.01)

(58) Field of Classification Search
CPC .. F23K 2900/07006; F23N 1/02; F23N 1/022; F23N 1/025; F23N 1/027; F23N 5/003; F23N 2025/06; F23N 2037/20; F23N 2900/05181; G01F 1/34; G01F 5/005; G01G 1/36
USPC ................ 431/12, 18, 76, 89, 38, 90; 137/7, 137/118.06, 87.04
See application file for complete search history.

(56) References Cited

U.S. PATENT DOCUMENTS

| | | |
|---|---|---|
| 1,033,204 A | 7/1912 | Skinner |
| 1,147,840 A | 7/1915 | Bowser |
| 1,156,977 A | 10/1915 | Cloos |
| 1,165,315 A | 12/1915 | Cameron |
| 1,206,532 A | 11/1916 | Gray |
| 1,847,385 A | 3/1932 | Dengler |
| 2,093,122 A | 9/1937 | Andrews |
| 2,196,798 A | 4/1940 | Horstmann |
| 2,403,692 A | 7/1946 | Tibbetts |
| 2,400,329 A | 4/1948 | Doble |
| 2,497,549 A | 2/1950 | Heller |
| 2,561,793 A | 7/1951 | Furczyk |
| 2,791,238 A | 5/1957 | Bryant |
| 2,975,307 A | 3/1961 | Schroeder et al. |
| 3,164,364 A | 1/1965 | McColl |
| 3,202,170 A | 8/1965 | Holbrook |
| 3,304,406 A | 2/1967 | King |
| 3,346,008 A | 10/1967 | Scaramucci |
| 3,381,623 A | 5/1968 | Elliott |
| 3,393,965 A | 7/1968 | Vaughan |
| 3,414,010 A | 12/1968 | Sparrow |
| 3,493,005 A | 2/1970 | Kakegawa |
| 3,641,373 A | 2/1972 | Elkuch |
| 3,646,969 A | 3/1972 | Stampfli |
| 3,744,754 A | 7/1973 | Demi |
| 3,768,955 A | 10/1973 | McLaughlin |
| 3,769,531 A | 10/1973 | Elkuch |
| 3,803,424 A | 4/1974 | Smiley et al. |
| 3,884,266 A | 5/1975 | Kondo |
| 3,993,939 A | 1/1976 | Slavin et al. |
| 3,947,644 A | 3/1976 | Uchikawa |
| 3,960,364 A | 6/1976 | Hargrave |
| 3,973,576 A | 8/1976 | Dietiker |
| 3,973,976 A | 8/1976 | Boyd |
| 4,114,652 A | 9/1978 | Oberle |
| 4,115,036 A | 9/1978 | Paterson |
| 4,140,936 A | 2/1979 | Bullock |
| 4,188,013 A | 2/1980 | Battersby et al. |
| 4,188,972 A | 2/1980 | Van Der Zee |
| 4,197,737 A | 4/1980 | Pittman |
| 4,242,080 A | 12/1980 | Tabei |
| 4,277,832 A | 7/1981 | Wong |
| 4,360,955 A | 11/1982 | Block |
| 4,402,340 A | 9/1983 | Lockwood, Jr. |
| 4,406,131 A | 9/1983 | Weasel, Jr. |
| 4,418,886 A | 12/1983 | Holzer |
| 4,442,853 A | 4/1984 | Gort |
| 4,450,868 A | 5/1984 | Duval et al. |
| 4,453,169 A | 6/1984 | Martner |
| 4,478,076 A | 10/1984 | Bohrer |
| 4,478,077 A | 10/1984 | Bohrer et al. |
| 4,481,776 A | 11/1984 | Araki et al. |
| 4,493,303 A | 1/1985 | Thompson et al. |
| 4,498,850 A | 2/1985 | Perlov et al. |
| 4,501,144 A | 2/1985 | Higashi et al. |
| 4,539,575 A | 9/1985 | Nilsson |
| 4,543,974 A | 10/1985 | Dietiker et al. |
| 4,576,050 A | 3/1986 | Lambert |
| 4,581,624 A | 4/1986 | O'Connor |
| 4,581,707 A | 4/1986 | Millar |
| 4,585,209 A | 4/1986 | Aine et al. |
| 4,613,072 A | 9/1986 | Kikuchi et al. |
| 4,619,438 A | 10/1986 | Coffee |
| 4,622,699 A | 11/1986 | Spriggs |
| 4,622,999 A | 11/1986 | Ray |
| 4,628,499 A | 12/1986 | Hammett |
| 4,645,450 A | 2/1987 | West |
| 4,651,564 A | 3/1987 | Johnson et al. |
| 4,654,546 A | 3/1987 | Kirjavainen |
| 4,698,015 A | 10/1987 | Brunel |
| 4,722,360 A | 2/1988 | Odajima et al. |
| 4,756,508 A | 7/1988 | Giachino et al. |
| 4,815,699 A | 3/1989 | Mueller |
| 4,821,999 A | 4/1989 | Ohtaka |
| 4,829,826 A | 5/1989 | Valentin et al. |
| 4,835,717 A | 5/1989 | Michel et al. |
| 4,836,247 A | 6/1989 | Chuang |
| 4,898,200 A | 2/1990 | Odajima et al. |
| 4,911,616 A | 3/1990 | Laumann, Jr. |
| 4,915,613 A | 4/1990 | Landis |
| 4,938,742 A | 7/1990 | Smits |
| 4,939,405 A | 7/1990 | Okuyama et al. |
| 5,022,435 A | 6/1991 | Jaw-Shiunn |
| 5,057,822 A | 10/1991 | Hoffman |
| 5,065,978 A | 11/1991 | Albarda et al. |
| 5,069,419 A | 12/1991 | Jerman |
| 5,070,252 A | 12/1991 | Castenschiold et al. |
| 5,078,581 A | 1/1992 | Blum et al. |
| 5,082,242 A | 1/1992 | Bonne et al. |
| 5,082,246 A | 1/1992 | Stanley et al. |
| 5,085,562 A | 2/1992 | Van Lintel |
| 5,096,388 A | 3/1992 | Weinberg |
| 5,129,794 A | 7/1992 | Beatty |
| 5,146,941 A | 9/1992 | Statler |
| 5,148,074 A | 9/1992 | Fujita et al. |
| 5,171,132 A | 12/1992 | Miyazaki et al. |
| 5,176,358 A | 1/1993 | Bonne et al. |
| 5,180,288 A | 1/1993 | Richter et al. |
| 5,180,623 A | 1/1993 | Ohnstein |
| 5,186,054 A | 2/1993 | Sekimura |
| 5,190,068 A | 3/1993 | Philbin |
| 5,192,197 A | 3/1993 | Culp |
| 5,193,993 A | 3/1993 | Dietiker |
| 5,199,456 A | 4/1993 | Love et al. |
| 5,199,462 A | 4/1993 | Baker |
| 5,203,688 A | 4/1993 | Dietiker |
| 5,205,323 A | 4/1993 | Baker |
| 5,206,557 A | 4/1993 | Bobbio |
| 5,215,112 A | 6/1993 | Davison |
| 5,215,115 A | 6/1993 | Dietiker |
| 5,219,278 A | 6/1993 | Van Lintel |
| 5,224,843 A | 7/1993 | Van Lintel |
| 5,244,527 A | 9/1993 | Aoyagi |
| 5,244,537 A | 9/1993 | Ohnstein |
| 5,263,514 A | 11/1993 | Reeves |

(56) References Cited

U.S. PATENT DOCUMENTS

| | | |
|---|---|---|
| 5,294,089 A | 3/1994 | LaMarca |
| 5,322,258 A | 6/1994 | Bosch et al. |
| 5,323,999 A | 6/1994 | Bonne |
| 5,325,880 A | 7/1994 | Johnson et al. |
| 5,336,062 A | 8/1994 | Richter |
| 5,368,571 A | 11/1994 | Hones, Jr. |
| 5,388,607 A | 2/1995 | Ramaker et al. |
| 5,441,597 A | 8/1995 | Bonne et al. |
| 5,449,142 A | 9/1995 | Banick |
| 5,452,878 A | 9/1995 | Gravesen et al. |
| 5,460,196 A | 10/1995 | Yonnet |
| 5,477,877 A | 12/1995 | Schulze et al. |
| 5,499,909 A | 3/1996 | Yamada et al. |
| 5,513,611 A | 5/1996 | Ricouard et al. |
| 5,520,533 A * | 5/1996 | Vrolijk .................. F23N 1/027 137/100 |
| 5,526,172 A | 6/1996 | Kanack |
| 5,529,465 A | 6/1996 | Zengerle et al. |
| 5,536,963 A | 7/1996 | Polla |
| 5,538,220 A | 7/1996 | LaMarca |
| 5,541,465 A | 7/1996 | Higuchi et al. |
| 5,552,654 A | 9/1996 | Konno et al. |
| 5,565,832 A | 10/1996 | Haller et al. |
| 5,571,401 A | 11/1996 | Lewis et al. |
| 5,580,444 A | 12/1996 | Burrows |
| 5,590,235 A | 12/1996 | Rappenecker et al. |
| 5,621,164 A | 4/1997 | Woodbury et al. |
| 5,642,015 A | 6/1997 | Whitehead et al. |
| 5,676,342 A | 10/1997 | Otto et al. |
| 5,683,159 A | 11/1997 | Johnson |
| 5,685,707 A | 11/1997 | Ramsdell et al. |
| 5,696,662 A | 12/1997 | Bauhahn |
| 5,725,363 A | 3/1998 | Bustgens et al. |
| 5,735,503 A | 4/1998 | Hietkamp |
| 5,741,978 A | 4/1998 | Gudmundsson |
| 5,748,432 A | 5/1998 | Przywozny et al. |
| 5,755,259 A | 5/1998 | Schulze et al. |
| 5,759,014 A | 6/1998 | Van Lintel |
| 5,759,015 A | 6/1998 | Van Lintel et al. |
| 5,769,043 A | 6/1998 | Nitkiewicz |
| 5,774,372 A | 6/1998 | Berwanger |
| 5,790,420 A | 8/1998 | Lang |
| 5,792,957 A | 8/1998 | Luder et al. |
| 5,797,358 A | 8/1998 | Brandt et al. |
| 5,808,205 A | 9/1998 | Romo |
| 5,822,170 A | 10/1998 | Cabuz et al. |
| 5,827,950 A | 10/1998 | Woodbury et al. |
| 5,836,750 A | 11/1998 | Cabuz |
| 5,839,467 A | 11/1998 | Saaski et al. |
| 5,847,523 A | 12/1998 | Rappenecker et al. |
| 5,863,708 A | 1/1999 | Zanzucchi et al. |
| 5,887,847 A | 3/1999 | Holborow |
| 5,893,389 A | 4/1999 | Cunningham |
| 5,901,939 A | 5/1999 | Cabuz et al. |
| 5,911,872 A | 6/1999 | Lewis et al. |
| 5,918,852 A | 7/1999 | Otto |
| 5,933,573 A | 8/1999 | Lukenich et al. |
| 5,944,257 A | 8/1999 | Dietiker et al. |
| 5,954,079 A | 9/1999 | Barth et al. |
| 5,954,089 A | 9/1999 | Seymour |
| 5,957,158 A | 9/1999 | Volz et al. |
| 5,959,448 A | 9/1999 | Baranski et al. |
| 5,967,124 A | 10/1999 | Cook et al. |
| 5,971,355 A | 10/1999 | Biegelsen et al. |
| 5,982,274 A | 11/1999 | Stetler et al. |
| 5,986,573 A | 11/1999 | Franklin et al. |
| 6,003,552 A | 12/1999 | Shank et al. |
| 6,021,652 A | 2/2000 | Walker |
| 6,050,281 A | 4/2000 | Adams et al. |
| 6,057,771 A | 5/2000 | Lakra |
| 6,077,068 A | 6/2000 | Okumura |
| 6,106,245 A | 8/2000 | Cabuz |
| 6,109,889 A | 8/2000 | Zengerle et al. |
| 6,116,863 A | 9/2000 | Ahn et al. |
| 6,122,973 A | 9/2000 | Nomura et al. |
| 6,151,967 A | 11/2000 | McIntosh et al. |
| 6,152,168 A | 11/2000 | Ohmi et al. |
| 6,155,531 A | 12/2000 | Holborow et al. |
| 6,167,761 B1 | 1/2001 | Hanzawa et al. |
| 6,176,247 B1 | 1/2001 | Winchcomb et al. |
| 6,179,000 B1 | 1/2001 | Zdobinski et al. |
| 6,179,586 B1 | 1/2001 | Herb et al. |
| 6,182,941 B1 | 2/2001 | Scheurenbrand et al. |
| 6,184,607 B1 | 2/2001 | Cabuz et al. |
| 6,189,568 B1 | 2/2001 | Bergum et al. |
| 6,213,758 B1 | 4/2001 | Tesar et al. |
| 6,215,221 B1 | 4/2001 | Cabuz et al. |
| 6,240,944 B1 | 6/2001 | Ohnstein et al. |
| 6,242,909 B1 | 6/2001 | Dorsey et al. |
| 6,247,919 B1 | 6/2001 | Welz, Jr. et al. |
| 6,255,609 B1 | 7/2001 | Samuelson et al. |
| 6,263,908 B1 | 7/2001 | Love et al. |
| 6,288,472 B1 | 9/2001 | Cabuz et al. |
| 6,297,640 B1 | 10/2001 | Hayes |
| 6,321,781 B1 | 11/2001 | Kurth |
| 6,360,773 B1 | 3/2002 | Rhodes |
| 6,373,682 B1 | 4/2002 | Goodwin-Johansson |
| 6,386,234 B2 | 5/2002 | Sontag |
| 6,390,027 B1 | 5/2002 | Lyons et al. |
| 6,397,798 B1 | 6/2002 | Fiaccabrino |
| 6,401,753 B2 | 6/2002 | Neu |
| 6,418,793 B1 | 7/2002 | Pechoux et al. |
| 6,445,053 B1 | 9/2002 | Cho |
| 6,450,200 B1 | 9/2002 | Ollivier |
| 6,460,567 B1 | 10/2002 | Hansen, III et al. |
| 6,463,546 B1 | 10/2002 | Jeske et al. |
| 6,496,348 B2 | 12/2002 | McIntosh |
| 6,496,786 B1 | 12/2002 | Dieterle et al. |
| 6,505,838 B1 | 1/2003 | Cavaliere |
| 6,508,528 B2 | 1/2003 | Fujii et al. |
| 6,520,753 B1 | 2/2003 | Grosjean et al. |
| 6,533,574 B1 | 3/2003 | Pechoux |
| 6,536,287 B2 | 3/2003 | Beekhuizen et al. |
| 6,537,060 B2 | 3/2003 | Vegter |
| 6,547,554 B2 | 4/2003 | Koegl et al. |
| 6,550,495 B1 | 4/2003 | Schulze |
| 6,553,979 B2 | 4/2003 | Albright |
| 6,561,791 B1 | 5/2003 | Vrolijk et al. |
| 6,563,233 B1 | 5/2003 | Hinks |
| 6,564,824 B2 | 5/2003 | Lowery et al. |
| 6,571,817 B1 | 6/2003 | Bohan, Jr. |
| 6,572,077 B1 | 6/2003 | Worner |
| 6,579,087 B1 | 6/2003 | Vrolijk |
| 6,584,852 B2 | 7/2003 | Suzuki et al. |
| 6,590,267 B1 | 7/2003 | Goodwin-Johansson et al. |
| 6,606,911 B2 | 8/2003 | Akiyama et al. |
| 6,619,388 B2 | 9/2003 | Dietz et al. |
| 6,619,612 B2 | 9/2003 | Freisinger et al. |
| 6,623,012 B1 | 9/2003 | Perry et al. |
| 6,640,642 B1 | 11/2003 | Onose et al. |
| 6,644,351 B2 | 11/2003 | LaMarca et al. |
| 6,650,211 B2 | 11/2003 | Pimouguet |
| 6,651,506 B2 | 11/2003 | Lee et al. |
| 6,651,636 B1 | 11/2003 | Albright |
| 6,651,954 B1 | 11/2003 | Porcher et al. |
| 6,655,409 B1 | 12/2003 | Steenburgh et al. |
| 6,655,652 B2 | 12/2003 | Meinhof |
| 6,658,928 B1 | 12/2003 | Pollack et al. |
| 6,676,580 B2 | 1/2004 | Tsai et al. |
| 6,704,186 B2 | 3/2004 | Ishikura |
| 6,725,167 B2 | 4/2004 | Grumstrup et al. |
| 6,728,600 B1 | 4/2004 | Contaldo et al. |
| 6,729,601 B2 | 5/2004 | Freisinger et al. |
| 6,742,541 B2 | 6/2004 | Pimouguet |
| 6,768,406 B1 | 7/2004 | Fiaccabrino |
| 6,796,326 B2 | 9/2004 | Bayer |
| 6,813,954 B2 | 11/2004 | Gokhfeld |
| 6,814,102 B2 | 11/2004 | Hess et al. |
| 6,814,339 B2 | 11/2004 | Berger et al. |
| 6,819,208 B1 | 11/2004 | Peghaire et al. |
| 6,820,650 B2 | 11/2004 | Solet et al. |
| 6,825,632 B2 | 11/2004 | Hahn et al. |
| 6,826,947 B2 | 12/2004 | Solet et al. |
| 6,851,298 B2 | 2/2005 | Miura et al. |

(56) References Cited

U.S. PATENT DOCUMENTS

| | | |
|---|---|---|
| 6,874,367 B2 | 4/2005 | Jakobsen |
| 6,877,380 B2 | 4/2005 | Lewis |
| 6,877,383 B2 | 4/2005 | Horie et al. |
| 6,880,548 B2 | 4/2005 | Schultz et al. |
| 6,880,567 B2 | 4/2005 | Klaver et al. |
| 6,885,184 B1 | 4/2005 | Gofman |
| 6,888,354 B1 | 5/2005 | Gofman |
| 6,889,705 B2 | 5/2005 | Newman et al. |
| 6,892,756 B2 | 5/2005 | Schulze |
| 6,906,484 B1 | 6/2005 | Berroth et al. |
| 6,923,069 B1 | 8/2005 | Stewart |
| 6,956,340 B2 | 10/2005 | Schondelmaier et al. |
| 6,956,343 B2 | 10/2005 | Berroth et al. |
| 6,968,851 B2 | 11/2005 | Ramirez et al. |
| 6,981,426 B2 | 1/2006 | Wang et al. |
| 6,983,759 B2 | 1/2006 | Maichel et al. |
| 6,984,122 B2 | 1/2006 | Sullivan et al. |
| 6,994,308 B1 | 2/2006 | Wang et al. |
| 6,997,684 B2 | 2/2006 | Hahn et al. |
| 7,000,635 B2 | 2/2006 | Erbe et al. |
| 7,004,034 B2 | 2/2006 | Chen |
| 7,039,502 B2 | 5/2006 | Berwanger et al. |
| 7,066,203 B2 | 6/2006 | Baarda |
| 7,082,835 B2 | 8/2006 | Cook et al. |
| 7,089,086 B2 | 8/2006 | Schoonover |
| 7,089,959 B2 | 8/2006 | Cai |
| 7,093,611 B2 | 8/2006 | Murray et al. |
| 7,101,172 B2 | 9/2006 | Jaesschke |
| 7,107,820 B2 | 9/2006 | Nunnally et al. |
| 7,119,504 B2 | 10/2006 | Dornhof |
| 7,121,525 B2 | 10/2006 | Gelez |
| 7,174,771 B2 | 2/2007 | Cooper |
| 7,216,547 B1 | 5/2007 | Stewart et al. |
| 7,223,094 B2 | 5/2007 | Goebel |
| 7,225,056 B2 | 5/2007 | Bolduan et al. |
| 7,249,610 B2 | 7/2007 | Moses |
| 7,290,502 B2 | 11/2007 | Kidd et al. |
| 7,297,640 B2 | 11/2007 | Xie et al. |
| 7,302,863 B2 | 12/2007 | Kielb et al. |
| 7,319,300 B2 | 1/2008 | Hahn |
| 7,328,719 B2 | 2/2008 | Madden |
| 7,347,221 B2 | 3/2008 | Berger et al. |
| 7,360,751 B2 | 4/2008 | Herrfurth |
| 7,390,172 B2 | 6/2008 | Winkler |
| 7,402,925 B2 | 7/2008 | Best et al. |
| 7,405,609 B2 | 7/2008 | Krotsch |
| 7,422,028 B2 | 9/2008 | Nugent et al. |
| 7,451,600 B2 | 11/2008 | Patel et al. |
| 7,451,644 B2 | 11/2008 | Karte |
| 7,453,696 B2 | 11/2008 | Tungl et al. |
| 7,461,828 B2 | 12/2008 | Kidprasert |
| 7,493,822 B2 | 2/2009 | Stewart et al. |
| 7,503,221 B2 | 3/2009 | Wade |
| 7,504,961 B2 | 3/2009 | Flanders |
| 7,520,487 B2 | 4/2009 | Mattes |
| 7,537,019 B2 | 5/2009 | Ting et al. |
| 7,543,604 B2 | 6/2009 | Benda |
| 7,553,151 B2 | 6/2009 | O'Mara et al. |
| 7,556,238 B2 | 7/2009 | Seberger |
| 7,574,896 B1 | 8/2009 | Cooper |
| 7,586,228 B2 | 9/2009 | Best |
| 7,586,276 B2 | 9/2009 | Dornhoff |
| 7,624,755 B2 | 12/2009 | Benda et al. |
| 7,627,455 B2 | 12/2009 | Lenz et al. |
| 7,644,731 B2 | 1/2010 | Benda et al. |
| 7,647,940 B2 | 1/2010 | Minervini et al. |
| 7,669,461 B2 | 3/2010 | Kates |
| 7,688,011 B2 | 3/2010 | Berroth et al. |
| 7,715,168 B2 | 5/2010 | Gofman et al. |
| 7,735,509 B2 | 6/2010 | Galloway et al. |
| 7,740,024 B2 | 6/2010 | Brodeur et al. |
| 7,759,884 B2 | 7/2010 | Dufner et al. |
| 7,811,069 B2 | 10/2010 | Fleig |
| 7,812,488 B2 | 10/2010 | Cosco et al. |
| 7,816,813 B2 | 10/2010 | Yagudayev et al. |
| 7,841,541 B2 | 11/2010 | Ardelt et al. |
| 7,869,971 B2 | 1/2011 | Varga |
| 7,880,421 B2 | 2/2011 | Karwath |
| 7,880,427 B2 | 2/2011 | Foll et al. |
| 7,890,216 B2 | 2/2011 | Boger et al. |
| 7,890,276 B2 | 2/2011 | Killion et al. |
| 7,891,972 B2 | 2/2011 | Blank et al. |
| 7,898,372 B2 | 3/2011 | Melchionne, Jr. |
| 7,902,776 B2 | 3/2011 | Karwath |
| 7,905,251 B2 | 3/2011 | Flanders |
| 7,922,481 B2 | 4/2011 | Geiger et al. |
| 7,940,189 B2 | 5/2011 | Brown |
| 8,020,585 B2 | 9/2011 | Shock et al. |
| 8,036,837 B2 | 10/2011 | Wilke |
| 8,066,255 B2 | 11/2011 | Wang |
| 8,109,289 B2 | 2/2012 | Trnka et al. |
| 8,126,631 B2 | 2/2012 | Scalia, Jr. |
| 8,201,572 B2 | 6/2012 | Segal |
| 8,205,484 B2 | 6/2012 | Sasaki |
| 8,225,814 B2 | 7/2012 | Igarashi |
| 8,240,636 B2 | 8/2012 | Smith |
| 8,265,794 B2 | 9/2012 | Minervini et al. |
| 8,271,141 B2 | 9/2012 | Cummings et al. |
| 8,303,297 B2 | 11/2012 | Tompkins et al. |
| 8,307,845 B2 | 11/2012 | Kouchi et al. |
| 8,381,760 B2 | 2/2013 | Santinanavat et al. |
| 8,387,441 B2 | 3/2013 | Falta et al. |
| 8,424,563 B2 | 4/2013 | Haller et al. |
| 8,601,957 B2 | 12/2013 | Conrads et al. |
| 8,639,464 B2 | 1/2014 | Artiuch |
| 8,677,913 B2 | 3/2014 | Kastingschafer et al. |
| 8,706,381 B2 | 4/2014 | Donar et al. |
| 9,234,661 B2 | 1/2016 | Young et al. |
| 9,657,946 B2 | 5/2017 | Young et al. |
| 2002/0029808 A1 | 3/2002 | Friend et al. |
| 2002/0157713 A1 | 10/2002 | Pimouguet |
| 2002/0175791 A1 | 11/2002 | LaMarca et al. |
| 2003/0011136 A1 | 1/2003 | Ramirez et al. |
| 2003/0013054 A1 | 1/2003 | Fredricks et al. |
| 2003/0117098 A1 | 6/2003 | Berroth et al. |
| 2003/0150499 A1 | 8/2003 | Solet et al. |
| 2003/0167851 A1 | 9/2003 | Parker |
| 2003/0201414 A1 | 10/2003 | Freisinger et al. |
| 2004/0035211 A1 | 2/2004 | Pinto et al. |
| 2004/0129909 A1 | 7/2004 | Wiese |
| 2004/0214118 A1 | 10/2004 | Sullivan et al. |
| 2004/0263103 A1 | 12/2004 | Weisser et al. |
| 2005/0058961 A1 | 3/2005 | Moses |
| 2005/0166979 A1 | 8/2005 | Berger et al. |
| 2005/0199286 A1 | 9/2005 | Appleford et al. |
| 2005/0255418 A1 | 11/2005 | Goebel |
| 2005/0279956 A1 | 12/2005 | Berger et al. |
| 2006/0202572 A1 | 9/2006 | Tungl et al. |
| 2006/0226299 A1 | 10/2006 | Tungl et al. |
| 2006/0228237 A1 | 10/2006 | Winkler |
| 2006/0240370 A1 | 10/2006 | Neville et al. |
| 2006/0243334 A1 | 11/2006 | Brochhaus et al. |
| 2006/0260701 A1 | 11/2006 | Mattes |
| 2006/0272712 A1 | 12/2006 | Sontag |
| 2006/0278281 A1 | 12/2006 | Gynz-Rekowski et al. |
| 2007/0024225 A1 | 2/2007 | Hahn et al. |
| 2007/0068511 A1 | 3/2007 | Bachinsky et al. |
| 2007/0089789 A1 | 4/2007 | Mudd et al. |
| 2007/0095144 A1 | 5/2007 | Oboodi et al. |
| 2007/0164243 A1 | 7/2007 | Volz |
| 2007/0189739 A1 | 8/2007 | Dufner et al. |
| 2007/0241705 A1 | 10/2007 | Karwath |
| 2007/0256478 A1 | 11/2007 | Guadagnoia et al. |
| 2007/0257628 A1 | 11/2007 | Gofman et al. |
| 2007/0261618 A1 | 11/2007 | Kastingschafer et al. |
| 2008/0035456 A1 | 2/2008 | Melchionn, Jr. |
| 2008/0099082 A1 | 5/2008 | Moenkhaus |
| 2008/0156077 A1 | 7/2008 | Flanders et al. |
| 2008/0157707 A1 | 7/2008 | Jeske et al. |
| 2008/0297084 A1 | 12/2008 | Berroth et al. |
| 2008/0315807 A1 | 12/2008 | Loffler et al. |
| 2008/0318098 A1 | 12/2008 | Matsunaga |
| 2008/0318172 A1 | 12/2008 | Geiger et al. |
| 2009/0068503 A1 | 3/2009 | Yamazaki et al. |

(56) References Cited

U.S. PATENT DOCUMENTS

| | | | |
|---|---|---|---|
| 2009/0111065 A1 | 4/2009 | Tompkins et al. |
| 2009/0120338 A1 | 5/2009 | Adendorff et al. |
| 2009/0126798 A1 | 5/2009 | Mather |
| 2009/0142717 A1 | 6/2009 | Lavelle |
| 2009/0146091 A1 | 6/2009 | Ams et al. |
| 2009/0148798 A1 | 6/2009 | Geiger et al. |
| 2009/0197212 A1 | 8/2009 | Masen |
| 2009/0240445 A1 | 9/2009 | Umekage et al. |
| 2009/0280989 A1 | 11/2009 | Astra et al. |
| 2009/0288399 A1 | 11/2009 | Fayard |
| 2009/0303076 A1 | 12/2009 | Setiadi et al. |
| 2010/0018324 A1 | 1/2010 | Killian et al. |
| 2010/0043896 A1 | 2/2010 | Shock et al. |
| 2010/0064818 A1 | 3/2010 | Shubert |
| 2010/0074777 A1 | 3/2010 | Laufer et al. |
| 2010/0102259 A1 | 4/2010 | Forster |
| 2010/0112500 A1 | 5/2010 | Maiello et al. |
| 2010/0146939 A1 * | 6/2010 | Sim .................. F01N 3/0256 60/286 |
| 2010/0180688 A1 | 7/2010 | Khemet et al. |
| 2010/0180882 A1 | 7/2010 | Oberhomburg et al. |
| 2010/0193045 A1 | 8/2010 | Xu |
| 2010/0254826 A1 | 10/2010 | Streng et al. |
| 2010/0269931 A1 | 10/2010 | Seebauer |
| 2010/0282988 A1 | 11/2010 | Kasprzyk et al. |
| 2010/0315027 A1 | 12/2010 | Wystup et al. |
| 2011/0025237 A1 | 2/2011 | Wystup et al. |
| 2011/0033808 A1 | 2/2011 | Geiger et al. |
| 2011/0039217 A1 | 2/2011 | Happe |
| 2011/0041483 A1 | 2/2011 | Kapparos |
| 2011/0046903 A1 | 2/2011 | Franklin |
| 2011/0080072 A1 | 4/2011 | Strobel et al. |
| 2011/0107826 A1 | 5/2011 | Wallis |
| 2011/0137579 A1 | 6/2011 | Seebauer |
| 2011/0212404 A1 | 9/2011 | Fan et al. |
| 2011/0240157 A1 | 10/2011 | Jones et al. |
| 2011/0266473 A1 | 11/2011 | Santinanavat et al. |
| 2011/0270544 A1 | 11/2011 | Kucera et al. |
| 2011/0284777 A1 | 11/2011 | Pitchford et al. |
| 2012/0107753 A1 | 5/2012 | Kemp |
| 2012/0148962 A1 | 6/2012 | Bernero et al. |
| 2012/0251960 A1 | 10/2012 | Newby et al. |
| 2013/0152673 A1 | 6/2013 | Young et al. |
| 2013/0153036 A1 | 6/2013 | Young et al. |
| 2013/0153041 A1 | 6/2013 | Kucera |
| 2013/0153042 A1 | 6/2013 | Young et al. |
| 2013/0153062 A1 | 6/2013 | Young et al. |
| 2013/0153798 A1 | 6/2013 | Kucera et al. |
| 2013/0154841 A1 | 6/2013 | Kucera et al. |
| 2013/0302738 A1 | 11/2013 | Rennie et al. |
| 2014/0080075 A1 | 3/2014 | Young et al. |
| 2014/0096850 A1 | 4/2014 | Filkovski et al. |
| 2015/0045971 A1 | 2/2015 | Endel et al. |
| 2015/0079526 A1 | 3/2015 | Lou et al. |
| 2015/0107675 A1 | 4/2015 | Kucera |
| 2016/0076767 A1 | 3/2016 | Super et al. |
| 2016/0123584 A1 | 5/2016 | Young et al. |
| 2017/0016752 A1 | 1/2017 | Speldrich et al. |

FOREIGN PATENT DOCUMENTS

| | | | |
|---|---|---|---|
| DE | 3818363 A1 * | 4/1989 | ............. F23N 1/027 |
| DE | 19617852 | 10/1997 | |
| DE | 19824521 | 12/1999 | |
| DE | 102005033611 | 10/2006 | |
| DE | 102005033611 B3 * | 10/2006 | ............. F23N 1/005 |
| EP | 1571906 | 7/1980 | |
| EP | 0062854 | 10/1982 | |
| EP | 0062854 A1 * | 10/1982 | ............. F23N 1/047 |
| EP | 0068517 | 1/1986 | |
| EP | 0275439 | 7/1988 | |
| EP | 0282758 | 9/1988 | |
| EP | 0356690 | 5/1993 | |
| EP | 0563787 | 10/1993 | |
| EP | 0617234 | 9/1994 | |
| EP | 0522479 | 5/1996 | |
| EP | 0744821 | 11/1996 | |
| EP | 0645562 | 12/1996 | |
| EP | 0678178 | 12/1996 | |
| EP | 0664422 | 4/1997 | |
| EP | 0665396 | 1/1998 | |
| EP | 0822376 | 2/1998 | |
| EP | 0817931 | 12/1998 | |
| EP | 0652501 | 3/1999 | |
| EP | 0907052 | 4/1999 | |
| EP | 0817934 | 5/1999 | |
| EP | 0896192 | 10/1999 | |
| EP | 0952357 | 10/1999 | |
| EP | 0757200 | 4/2000 | |
| EP | 1031792 | 8/2000 | |
| EP | 1069357 | 1/2001 | |
| EP | 0896191 | 2/2001 | |
| EP | 1084358 | 3/2001 | |
| EP | 0881435 | 9/2001 | |
| EP | 1186779 | 3/2002 | |
| EP | 0976957 | 4/2002 | |
| EP | 1157205 | 9/2002 | |
| EP | 1084369 | 1/2003 | |
| EP | 1121511 | 4/2003 | |
| EP | 0992658 | 5/2003 | |
| EP | 1323966 | 7/2003 | |
| EP | 1078187 | 8/2003 | |
| EP | 1084357 | 8/2003 | |
| EP | 1382907 | 1/2004 | |
| EP | 1403885 | 3/2004 | |
| EP | 1413045 | 4/2004 | |
| EP | 1424708 | 6/2004 | |
| EP | 1176317 | 8/2004 | |
| EP | 1269054 | 8/2004 | |
| EP | 1484509 | 12/2004 | |
| EP | 1073192 | 1/2005 | |
| EP | 1191676 | 1/2005 | |
| EP | 1275039 | 1/2005 | |
| EP | 1499008 | 1/2005 | |
| EP | 1446607 | 3/2005 | |
| EP | 1510756 | 3/2005 | |
| EP | 1299665 | 4/2005 | |
| EP | 1324496 | 6/2005 | |
| EP | 1535388 | 6/2005 | |
| EP | 1584870 | 10/2005 | |
| EP | 1243857 | 12/2005 | |
| EP | 1282798 | 12/2005 | |
| EP | 0843287 | 2/2006 | |
| EP | 1626321 A1 * | 2/2006 | ............. F23D 14/60 |
| EP | 1346463 | 3/2006 | |
| EP | 1659462 | 5/2006 | |
| EP | 1703140 | 9/2006 | |
| EP | 1703146 | 9/2006 | |
| EP | 1183772 | 10/2006 | |
| EP | 1303718 | 10/2006 | |
| EP | 1314240 | 10/2006 | |
| EP | 1715229 A2 * | 10/2006 | ........... F16K 31/402 |
| EP | 1256763 | 11/2006 | |
| EP | 1727268 | 11/2006 | |
| EP | 1559936 | 12/2006 | |
| EP | 1748534 | 1/2007 | |
| EP | 1748545 | 1/2007 | |
| EP | 1327808 | 2/2007 | |
| EP | 1329659 | 2/2007 | |
| EP | 1291532 | 6/2007 | |
| EP | 1610046 | 6/2007 | |
| EP | 1592905 | 7/2007 | |
| EP | 1610045 | 7/2007 | |
| EP | 1727261 | 10/2007 | |
| EP | 1860328 | 11/2007 | |
| EP | 1882882 | 1/2008 | |
| EP | 1626321 | 2/2008 | |
| EP | 1848907 | 4/2008 | |
| EP | 1936778 | 6/2008 | |
| EP | 1536169 | 11/2008 | |
| EP | 1298679 | 12/2008 | |
| EP | 1714040 | 12/2008 | |
| EP | 2014979 | 1/2009 | |

(56) References Cited

FOREIGN PATENT DOCUMENTS

| | | | |
|---|---|---|---|
| EP | 2014979 A2 * | 1/2009 | ............ F23D 14/04 |
| EP | 1669648 | 2/2009 | |
| EP | 2048439 | 4/2009 | |
| EP | 2107248 | 7/2009 | |
| EP | 2093545 | 8/2009 | |
| EP | 1715229 | 10/2009 | |
| EP | 2116857 | 11/2009 | |
| EP | 2119946 | 11/2009 | |
| EP | 1370787 | 3/2010 | |
| EP | 1413044 | 3/2010 | |
| EP | 2164164 | 3/2010 | |
| EP | 2177796 | 4/2010 | |
| EP | 2178201 | 4/2010 | |
| EP | 1970610 | 5/2010 | |
| EP | 2197101 | 6/2010 | |
| EP | 2068056 | 8/2010 | |
| EP | 2212984 | 8/2010 | |
| EP | 1712800 | 10/2010 | |
| EP | 2118493 | 10/2010 | |
| EP | 2242344 | 10/2010 | |
| EP | 1715582 | 11/2010 | |
| EP | 1675757 | 12/2010 | |
| EP | 2267883 | 12/2010 | |
| EP | 1703139 | 1/2011 | |
| EP | 2286976 | 2/2011 | |
| EP | 1596495 | 4/2011 | |
| EP | 2306622 | 4/2011 | |
| EP | 2010500 | 6/2011 | |
| EP | 2113696 | 7/2011 | |
| EP | 1230517 | 7/2013 | |
| FR | 2609154 | 7/1988 | |
| GB | 2099158 | 12/1982 | |
| GB | 2327750 | 2/1999 | |
| GB | 2327750 A * | 2/1999 | ............ F23N 5/242 |
| JP | 02-086258 | 3/1990 | |
| JP | 05-219760 | 8/1993 | |
| JP | 9061284 | 3/1997 | |
| JP | 9184600 | 7/1997 | |
| JP | 2004125809 | 4/2004 | |
| JP | 2004309159 | 11/2004 | |
| JP | 2008135922 | 6/2008 | |
| JP | 2008286478 | 11/2008 | |
| SU | 744877 | 6/1980 | |
| WO | WO 87/05375 | 9/1987 | |
| WO | WO 98/01709 | 1/1995 | |
| WO | WO 96/27095 | 9/1996 | |
| WO | WO 97/29538 | 8/1997 | |
| WO | WO 99/24758 | 5/1999 | |
| WO | WO 99/60292 | 11/1999 | |
| WO | WO 99/64769 | 12/1999 | |
| WO | WO 99/64770 | 12/1999 | |
| WO | WO 00/28215 | 5/2000 | |
| WO | WO 01/06179 | 1/2001 | |
| WO | WO 01/33078 | 5/2001 | |
| WO | WO 01/61226 | 8/2001 | |
| WO | WO 01/73297 | 10/2001 | |
| WO | WO 01/90617 | 11/2001 | |
| WO | WO 02/04852 | 1/2002 | |
| WO | WO 02/077502 | 10/2002 | |
| WO | WO 02/084156 | 10/2002 | |
| WO | WO 02/086365 | 10/2002 | |
| WO | WO 02/086918 | 10/2002 | |
| WO | WO 02/097840 | 12/2002 | |
| WO | WO 2004/059830 | 7/2004 | |
| WO | WO 2004/070245 | 8/2004 | |
| WO | WO 2005/042313 | 3/2005 | |
| WO | WO 2005/076455 | 8/2005 | |
| WO | WO 2005/076456 | 8/2005 | |
| WO | WO 2005/085652 | 9/2005 | |
| WO | WO 2005/094150 | 10/2005 | |
| WO | WO 2006/000366 | 1/2006 | |
| WO | WO 2006/000367 | 1/2006 | |
| WO | WO 2006/053816 | 3/2006 | |
| WO | WO 2006/039956 | 4/2006 | |
| WO | WO 2006/042635 | 4/2006 | |
| WO | WO 2006/077069 | 7/2006 | |
| WO | WO 2006/088367 | 8/2006 | |
| WO | WO 2007/012419 | 2/2007 | |
| WO | WO 2007/018876 | 2/2007 | |
| WO | WO 2007/093312 | 8/2007 | |
| WO | WO 2007/140927 | 12/2007 | |
| WO | WO 2008/061575 | 3/2008 | |
| WO | WO 2008/039061 | 4/2008 | |
| WO | wo 2008/119404 | 10/2008 | |
| WO | WO 2008/141911 | 11/2008 | |
| WO | WO 2008/148401 | 12/2008 | |
| WO | WO 2009/000481 | 12/2008 | |
| WO | WO 2009/049694 | 4/2009 | |
| WO | WO 2009/065815 | 5/2009 | |
| WO | WO 2009/073510 | 6/2009 | |
| WO | WO 2009/089857 | 7/2009 | |
| WO | WO 2009/126020 | 10/2009 | |
| WO | wo 2010/018192 | 2/2010 | |
| WO | WO 2010/052137 | 5/2010 | |
| WO | WO 2010/056111 | 5/2010 | |
| WO | WO 2010/083877 | 7/2010 | |
| WO | WO 2011/010274 | 1/2011 | |
| WO | WO 2011/045776 | 4/2011 | |
| WO | WO 2011/047895 | 4/2011 | |
| WO | WO 2011/051002 | 5/2011 | |
| WO | WO 2011/069805 | 6/2011 | |
| WO | WO 2011/072888 | 6/2011 | |
| WO | WO 2011/092011 | 8/2011 | |
| WO | WO 2011/095928 | 8/2011 | |
| WO | WO 2013/117516 | 8/2013 | |

OTHER PUBLICATIONS

"Large-Scale Linearization Circuit for Electrostatic Motors" IBM Technical Disclosure Bulletin, U.S. IBM Corporation, Bulletin, U.S. IBM Corporation, vol. 37, No. 10, pp. 563-564, Oct. 1, 1994.
Allianz Risk Consulting, "Safety Shutoff Valves for Fuel-Fired Heating Equipment," Tech Talk, vol. 1, 3 pages, Oct. 2012.
ASCO RedHat, "2-Way Normally Closed General Purpose & Watertight Enclosure Gas Shutoff Valves ¾" to 3" NPT, 2/2 Series 8214 (200)," 8 pages, prior to Dec. 15, 2011.
ASCO RedHat, "2-Way Normally Closed General Purpose & Watertight Enclosure Gas Shutoff Valves ¾" to 3" NPT, 2/2 Series 8214 (200 AH(E) V710(B)," 6 pages, prior to Dec. 15, 2011.
ASCO Valve, Inc., "8290 Series Angle Body Piston Valves, Introducing the All New 8290 Assembly Configurator," 12 pages, prior to Dec. 15, 2011.
ASCO, "2-Way Normally Closed V710(B) Valve Body Pipe Sizes ¾" to 3" NPT, Series V710(B)," 4 pages, prior to Dec. 15, 2011.
ASCO, "On/Off General Purpose & Watertight Hydramotor Actuator for Use with V710 Gas Valve Body, Series AH2E," 2 pages, prior to Dec. 15, 2011.
Athavale et al., "Coupled Electrostatics-Structures-Fluidic Simulations of a Bead Mesopump," Proceedings of the International Mechanical Engineers Congress & Exhibition, pp. 1-7, Oct. 1999.
Bertz et al., "Silicon Grooves With Sidewall Angles Down to 1° made by Dry Etching", pp. 331-339, prior to Dec. 29, 2004.
Bonne et al. "Actuation-Based Fuel Gas Microsensors", IGT Symposium on "Natural Gas Quality, Energy Measurement, Metering and Utilization Practices", 17 pages, Mar. 2001.
Branebjerg, "A New Electrostatic Actuator Providing Improved Stroke Length and Force." IEEE, pp. 6-11, Feb. 4-7, 1992.
Bustgens et al., "Micropump Manufactured by Thermoplastic Molding" IEEE, pp. 18-21, 1994.
Cabuz et al., "Factors Enhancing the Reliability of Touch-Mode Electrostatic Actuators," Sensors and Actuators 79, pp. 245-250, 2000.
Cabuz et al., "Mesoscopic Sampler Based on 3D Array of Electrostatically Activated Diaphragms," Proceedings of the 10th Int. Conf. on Solid-State Sensors and Actuators, Transducers 1999.
Cabuz et al., "The Dual Diaphragm Pump," 4 pages prior to Dec. 29, 2004.
Cabuz, "Dielectric Related Effects in Microromachined Electrostatic Actuators," IEEE, 1999 Conference on Electrical Insulation and Dielectric Phenomena, pp. 327-332, 1999.

(56) References Cited

OTHER PUBLICATIONS

Cabuz, "Electrical Phenomena at the Interface of Rolling-Contact, Electrostatic Actuators," 16 pages, prior to Dec. 29, 2004.
Cabuz, et al., "High Reliability Touch-Mode Electrostatic Actuators", Technical Digest of the Solid State Sensor and Aauator Workshop, Hilton Head, S.C., pp. 296-299, Jun. 8-11, 1998.
Cabuz. "Tradeoffs in MEMS Materials," SPIE, vol. 2881, pp. 160-170, prior to Dec. 29, 2004.
Carlisle, "10 Tips on Valve-Proving Systems," Karl Dungs Inc., 5 pages, Aug. 1, 2002, printed May 23, 2012.
Communication of a Notice of Opposition for EP Application Serial No. EP12196398.7, dated Feb. 15, 2016.
European Search Report for EP Application No. 12196394.6 dated May 23, 2013.
European Search Report for EP Application No. 12196396.1 dated Jun. 11, 2013.
European Search Report for EP Application No. 12196398.7 dated Jun. 11, 2013.
Examination Report for EP Application No. 12196398.7, dated Apr. 11, 2014.
European Search Report for EP Application No. 15184490.9 dated May 3, 2016.
CSA, "B149.3S1-07 Supplement No. 1 to CAN/CAS-B149.3-05 Code for the Field Approval of Fuel-Related Components on Appliances and Equipment," 40 pages, Jan. 2007.
Dungs Combustion Controls, "Double Solenoid Valve Combined Pressure Regulator and Safety Valves Servo Pressure Regulator, MBC- . . . -SE DN 65 DN 125," 8 pages, prior to Dec. 15, 2011.
Dungs Combustion Controls, "Double Solenoid Valve Combined Pressure Regulator and Safety Valves Infinitely Variable Operating Mode, MBC- . . . -VEF DN65—DN100," 8 pages, prior to Dec. 15, 2011.
Dungs Combustion Controls, "Double Solenoid Valve Control and Safety Combination Valve Servo Pressure Controller, DMV-SE 507/11-525/11," 8 pages, prior to Dec. 15, 2011.
Dungs Combustion Controls, "Double Solenoid Valve Regulator and Safety Combination Infinitely Variable Floating Operation, DMV-VEF 507-525," 8 pages, prior to Dec. 15, 2011.
Dungs Combustion Controls, "Gas/Air Ratio Control MB-VEF, DMV-VEF," 15 pages, prior to Dec. 15, 2011.
Dungs Combustion Controls, "GasMultiBloc Combined Regulator and Safety Shut-Off Valves Two-Stage Function, MB-ZRD(LE) 415-420 B01," pp. 1-6, prior to Dec. 15, 2011.
Dungs Combustion Controls, "GasMultiBloc Combined Regulator and Safety Valve Infinitely Variable Air/Gas Ratio Control Mode, MBC-300-VEF, MBC-700-VEF, MBC-1200-VEF," 8 pages, prior to Dec. 15, 2011.
Dungs Combustion Controls, "GasMultiBloc Combined Servo Pressure Regulator and Safety Shut-Off Valves, MBC-300-SE, MBC-700-SE, MBC-1200-SE, MBC-300-N, MBC-700-N," 8 pages, prior to Dec. 15, 2011.
Dungs Combustion Controls, "Pressure Regulator FRN Zero Pressure Regulator," 4 pages, prior to Dec. 15, 2011.
Dungs Combustion Controls, "Pressure Regulator FRS," 6 pages prior to Dec. 15, 2011.
Dungs Combustion Controls, "Pressure Regulator FRU Circulation Regulator," 4 pages, prior to Dec. 15, 2011.
Dungs Combustion Controls, "Pressure Switch for Gas, Air, Flue Gases and Combustion Products, GW 500 A4, GW 500 A4/2" 6 pages, prior to Dec. 15, 2011.
Dungs Combustion Controls, "Program," 4 pages, prior to Dec. 15, 2011.
Dungs Combustion Controls, "Valve Testing System VPS 504 for Multiple Actuators," 12 pages, prior to Dec. 15, 2011.
Dungs Combustion Controls, "Valve Testing System VPS 508 for Multiple Actuators," 12 pages, prior to Dec. 15, 2011.
Freund et al., "A Chemically Diverse Conducting Polymer-Based 'Electronic Nose'", Proceedings of the National Academy of Sciences of the United States of America, vol. 92, No. 7, pp. 2652-2656, Mar. 28, 1995.

Haig, "On a Nonvolatile Memory Cell Based on Micro-Electro-Mechanics", IEEE pp. 172-176, 1990.
Honeywell Inc., "Hall Effect Sensing and Application," 126 pages, prior to Dec. 15, 2011.
Honeywell, "RM7800L1087; RM7840G1022,L1075,L1091; EC7840L1014 Relay Modules with Valve Proving," Installation Instructions, 32 pages, 2009.
Honeywell, "V4730C/V8730C/V4734C 1:1 Gas/Air Servo Regulated Gas Valves, Product Data," 16 pages, 2006.
Honeywell, "V4943A/V8943A On/Off Diaphragm Gas Valves, Product Data," 8 pages, Apr. 2009.
Honeywell, "V5055A-F Industrial Gas Valves, Product Data," 12 pages, Nov. 2012.
https://en.wikipedia.org/wiki/SCADA, "SCADA," 10 pages, printed Mar. 29, 2016.
Korte et al., "Smart Valve Positioners and Their Use in Safety Instrumented Systems," Industrial Valves, pp. 41-47, 2009.
Kromschroder, "Governor with Solenoid Valve VAD Air/Gas Ratio Control with Solenoid Valve VAG," 8 pages, prior to Dec. 15, 2011.
Kromschroder, "Governor with Solenoid Valve VAD Air/Gas Ratio Control with Solenoid Valve VAG," 24 pages, prior to Dec. 15, 2011.
Kromschroder, "Solenoid Valves for Gas VAS," 28, pages, prior to Dec. 15, 2011.
Kromschroder, "Solenoid Valves for Gas VAS," 8 pages, prior to Dec. 15, 2011.
Kromschroder, "Tightness Control TC," 8 pages, 2011.
Maxon Corporation, "Functional Testing of Maxon Shut-off Valves, Valve Technical Data," 3 pages, 2008.
Minami et al., "Fabrication of Distributed Electrostatic Micro Actuator (DEMA)," IEEE Journal of Microelectromechanical Systems, vol. 2, No. 3, pp. 121-127, Sep. 1993.
Ohnstein et al., "Micromachined Silicon Microvalve," IEEE, pp. 95-98, 1990.
Porex Technologies, brochure, 4 pages, prior to Dec. 29, 2004.
Response to Opposition for EP Application Serial No. EP12196398.7, filed Jul. 15, 2016.
Shikida et al., "Characteristics of an Electrostatically-Driven Gas Valve Under High Pressure Conditions," IEEE , pp. 235-240, 1994.
Shikida et al., "Electrostatically Driven Gas Valve With High Conductance," IEEE Journal of Microelectromechanical Systems, vol. 3, No. 2, pp. 76-80, Jun. 1994.
Shikida et al., "Fabrication of an S-Shaped Microactuator," IEEE Journal of Microelectromechanical Systems, vol. 6, No. 1, pp. 18-24, Mar. 1997.
Siemens Building Technologies, "Double Gas Valves VGD20 . . . , VGD40 . . . ," 12 pages, Aug. 5, 2002.
Siemens Building Technologies, Inc., "Siemens Technical Instructions Document No. 155-512P25VG . . . ," 12 pages, Aug. 11, 2005.
Siemens Building Technologies, Inc., "SKP . . . 15U . . . Gas Valve Actuator with Safety Shutoff Function," Document No. 155-751 SKP15 . . . U . . . , 5 pages, Jul. 1, 2005.
Siemens Building Technologies, Inc., "SKP25 . . . U . . . Air/Gas Ratio Controlling Gas Valve Actuator with Safety Shutoff Function," Technical Instructions Document No. 155-754, SKP25 . . . U, 9 pages, Jul. 1, 2005.
Siemens Building Technologies, Inc., "SKP25 . . . U . . . Pressure Regulating Gas Valve Actuator with Safety Shut-Off function," Technical Instructions Document No. 155-752, SKP25 . . . U, 7 pages, Jul. 1, 2005.
Srinivasan et al., "Self-Assembled Fluorocarbon Films for Enhanced Stiction Reduction", IEEE Transducers, 1997 International Conference on Solid-State Sensors and Actuators, Chicago, pp. 1399-1402, Jun. 16-19, 1997.
Universal Metering, "SmartValve Wireless Shut-Off Valve," Universal Metering Ltd., 4 pages, prior to Mar. 12, 2013.
Wagner et al., "Bistable Microvalve with Pneumatically Coupled Membranes," IEEE, pp. 384-388, 1996.
Wilkerson, "Understanding Valve Actuatior Diagnostics," Control Engineering, vol. 56, No. 11, 4 pages, Nov. 2009.
www.combustion911.com/products/value-proving-controls-tc-410.html, "Kromschroeder Valve Proving Controls TC410," 7 pages, prior to Dec. 15, 2011, printed May 23, 2012.

(56) References Cited

OTHER PUBLICATIONS

Yang et al., "Fluorescent Porous Polymer Films as TNT Chemosensors: Electronic and Structural Effects", J. Am. Chem. Soc., pp. 11864-11873, 1998.

Yang et al., "Porous Shape Persistent Fluorescent Polymer Films: An Approach to TNT Sensory Materials", J. Am. Chem. Soc., pp. 5321-5322, 1998.

* cited by examiner

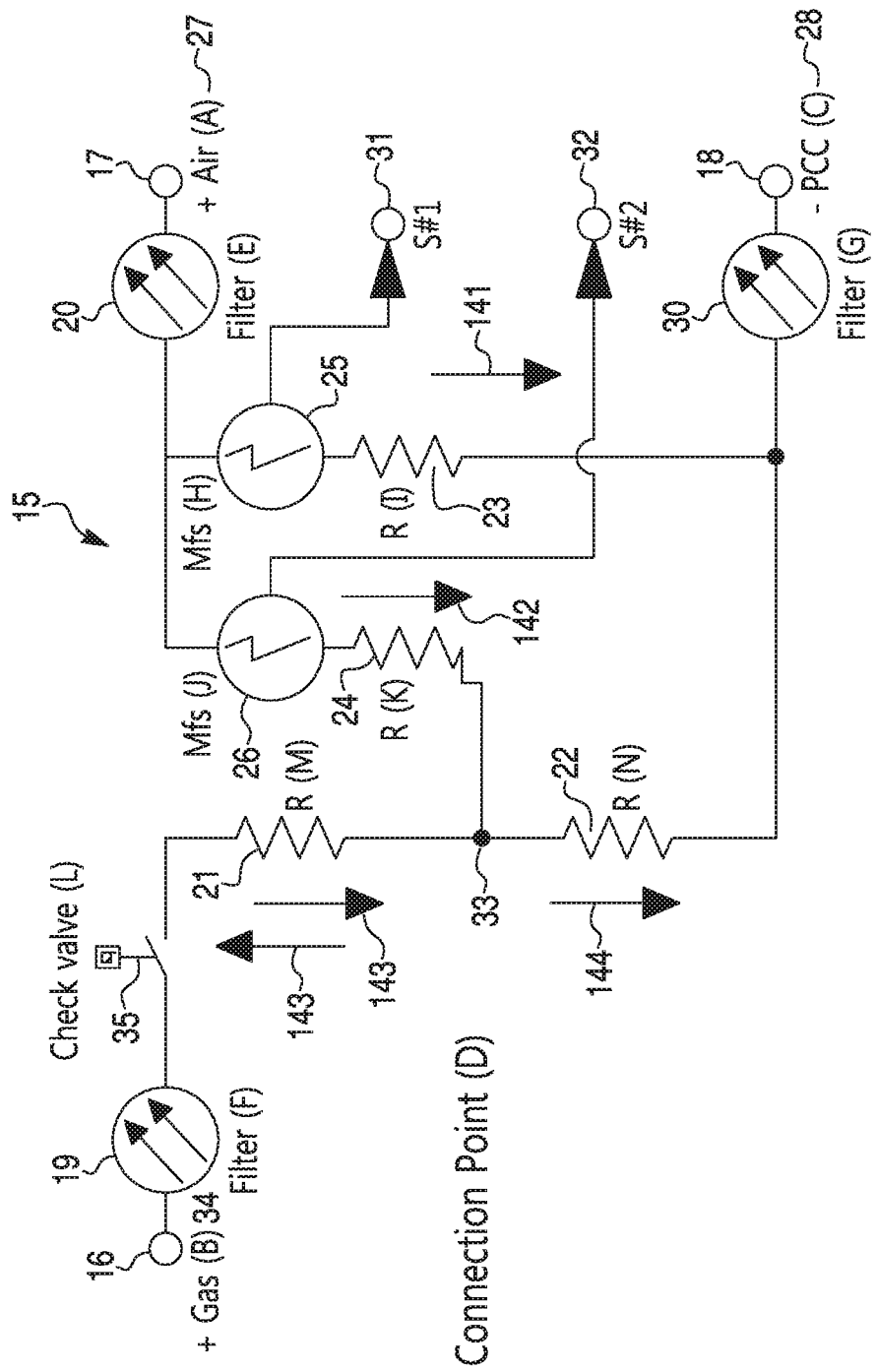

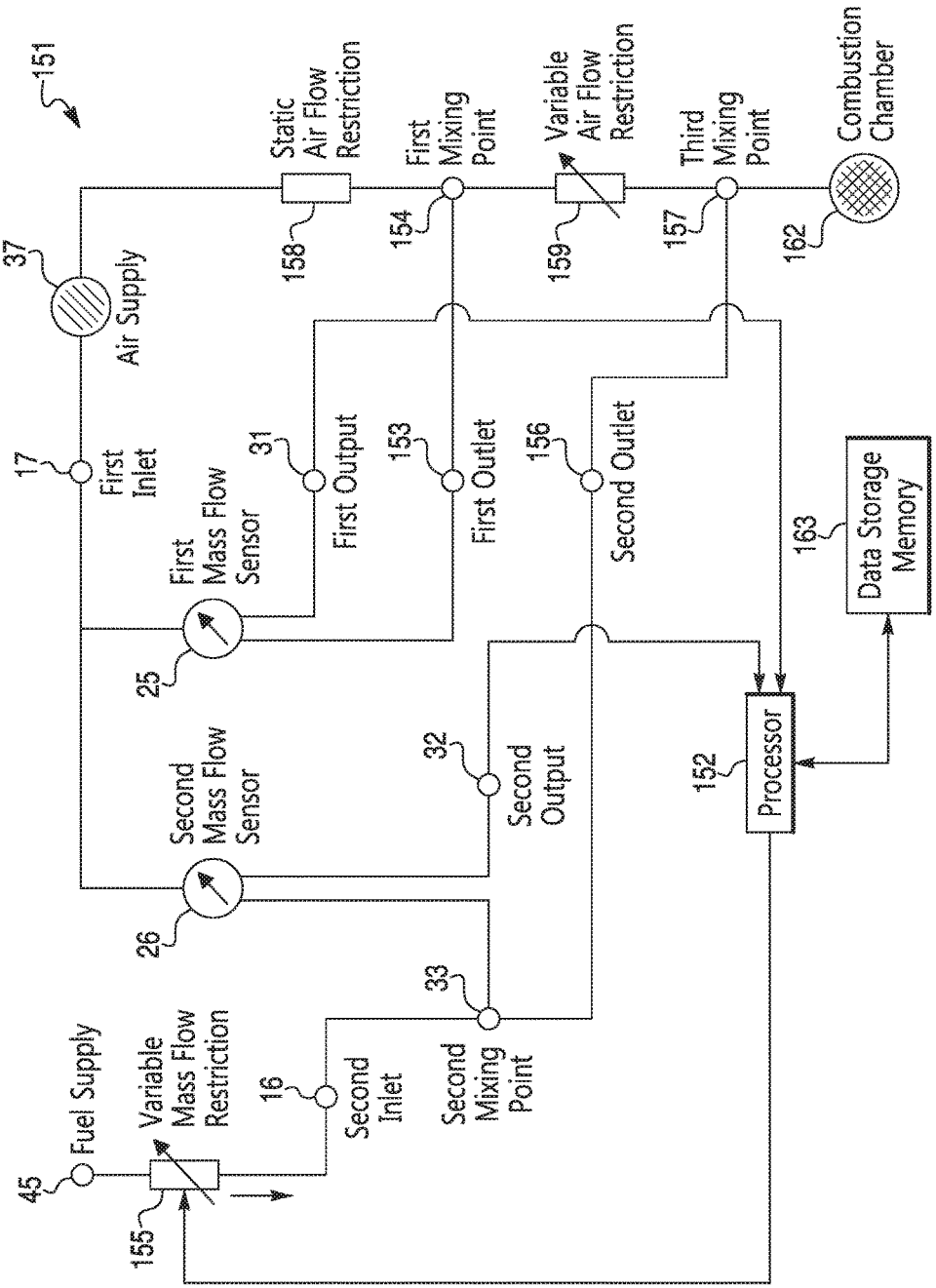

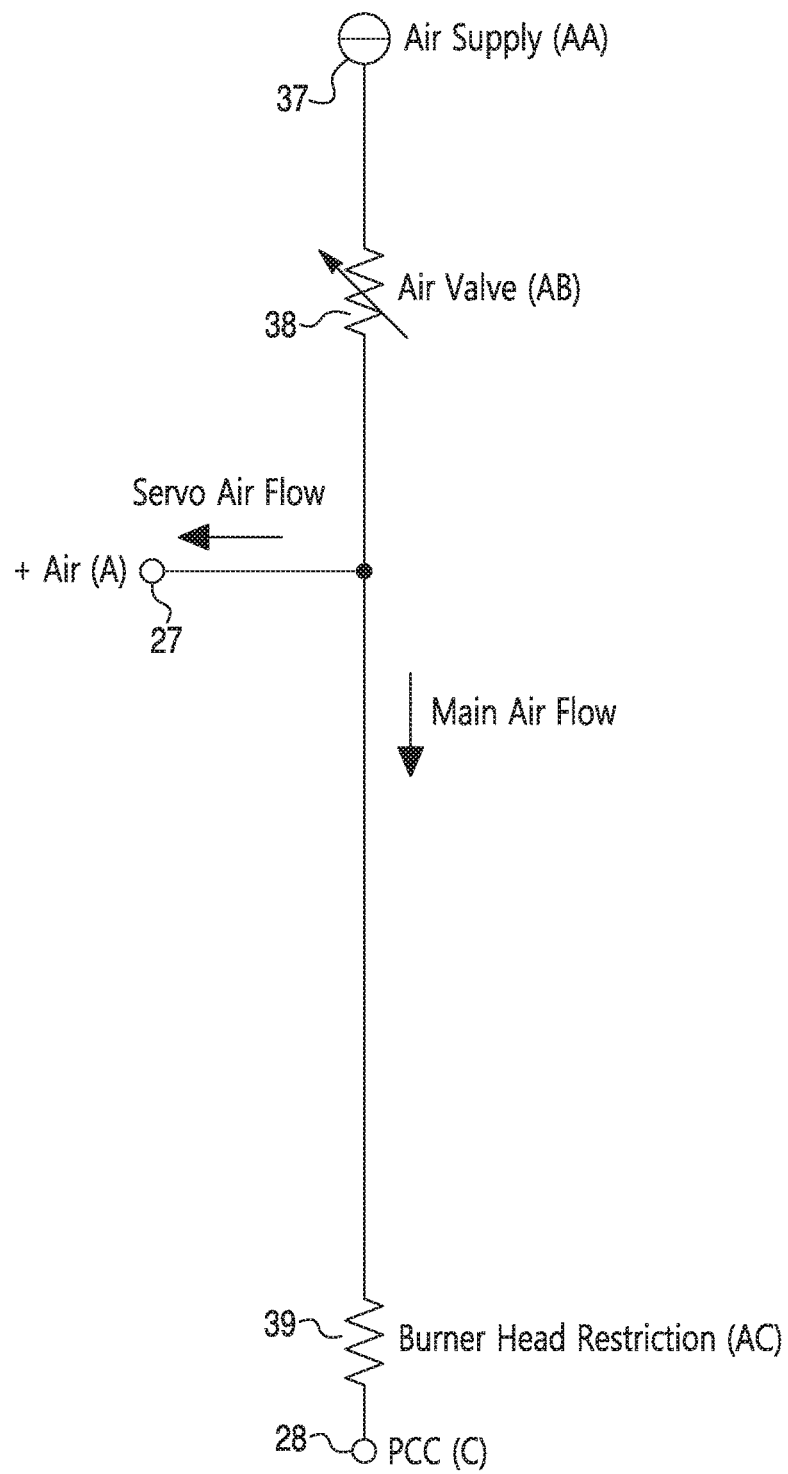

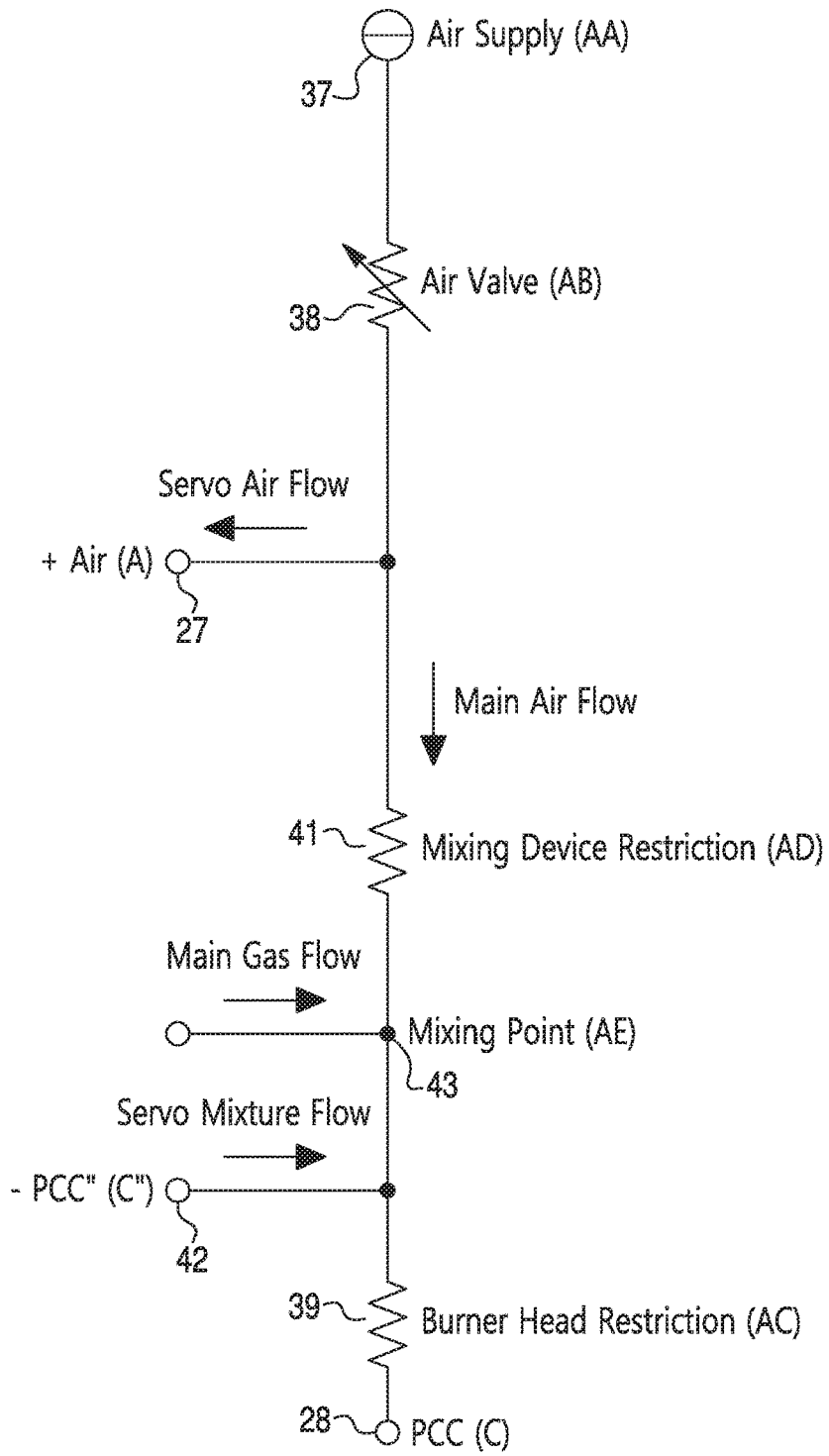

SYSTEM AND APPROACH FOR CONTROLLING A COMBUSTION CHAMBER

This application is a continuation-in-part of U.S. patent application Ser. No. 14/992,826, filed on Jan. 11, 2016, which is a continuation of U.S. patent application Ser. No. 13/621,175, filed on Sep. 15, 2012, now U.S. Pat. No. 9,234,661. U.S. patent application Ser. No. 14/992,826, filed on Jan. 11, 2016, is hereby incorporated by reference. U.S. patent application Ser. No. 13/621,175, filed on Sep. 15, 2012, is hereby incorporated by reference.

This application is a continuation-in-part of U.S. patent application Ser. No. 14/485,519, filed on Sep. 12, 2014. U.S. patent application Ser. No. 14/485,519, filed on Sep. 12, 2014, is hereby incorporated by reference.

BACKGROUND

The present disclosure pertains to combustion devices, for example, burners. Particularly, the disclosure pertains to controlling combustion in the devices.

SUMMARY

The disclosure reveals a system and approach for controlling activity in a combustion chamber, such as a burner. The system does not necessarily need to be mechanically adjusted and yet may provide precise control of a fuel air mixture ratio. A sensing module of the system may have a mass flow sensor that relates to air flow and another sensor that relates to fuel flow. Neither sensor may need contact with fuel. Fuel to the system may be controlled, for example, by a mass flow restriction valve. Pressure of the fuel and air may be a regulated parameter. Air to the system may be controlled as a reference. The sensors may provide signals to a processor to indicate a state of the fuel and air in the system. The processor, with reliance on a programmed curve, table or the like, often based on data, in a storage memory, may regulate the flow or pressure of the fuel and air in a parallel fashion to provide an appropriate fuel-air mixture to the combustion chamber in various situations relative to burner capacity, setpoints, commissioning, purge, and so on.

BRIEF DESCRIPTION OF THE DRAWING

FIG. 1 is a diagram of a measurement system that may provide signals for fuel regulation;

FIG. 1a is a diagram of a burner control system having three mixing points;

FIG. 2 is a diagram of a representation of a reference air flow;

FIG. 3 is a diagram of a representation of a reference air flow for a premix

DESCRIPTION

Figure 1B:
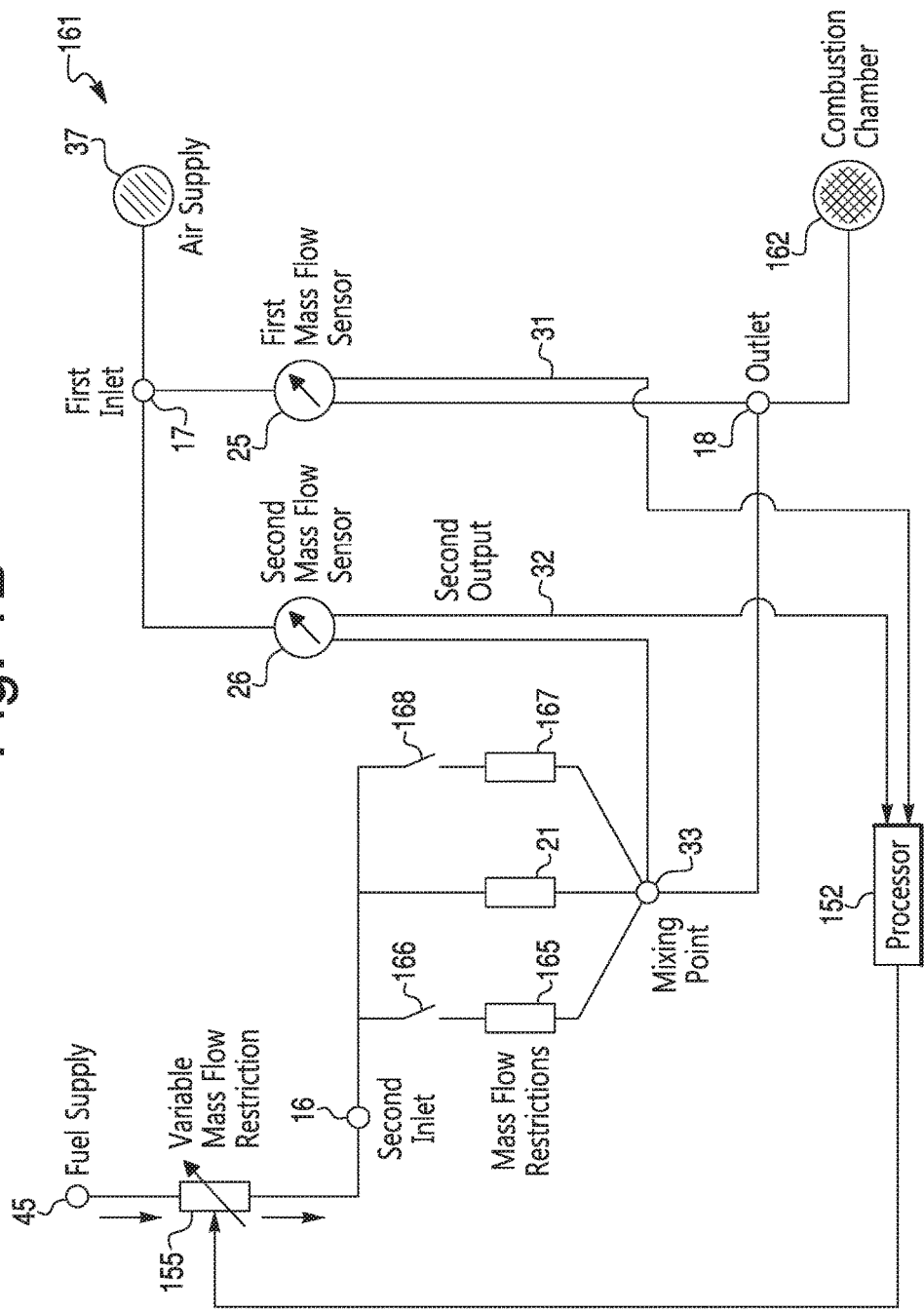
FIG. 1b is a diagram of a burner control system having selectable mass flow restrictions relative to fuel flow to a mixing point.

The present system and approach may incorporate one or more processors, computers, controllers, user interfaces, wireless and/or wire connections, and/or the like, in an implementation described and/or shown herein.

This description may provide one or more illustrative and specific examples or ways of implementing the present system and approach. There may be numerous other examples or ways of implementing the system and approach.

The present approach and system may feature a pneumatic connection between a reference air pressure, a reference combustion chamber pressure and a regulated fuel pressure. The pneumatic connection may contain flow channels, flow resistances and sensing elements. The system may provide feedback signals that can be used to regulate fuel pressure accurately, resulting in a precisely controlled air-fuel mixing ratio. The terms "resistance" and "restriction" may be used herein interchangeably. The terms "inlet" and "outlet" may pertain to fluid devices. The term "port" may refer an inlet or an outlet. The terms "input" and "output" may pertain to electrical or fluid devices.

The present system does not necessarily need mechanical adjustment downstream of the pressure regulator. The system does not necessarily need an adjustable throttle, an adjustable orifice, or an adjustment for the mechanical or pneumatic pressure amplifier.

Still the present system may control an air-fuel mixing ratio for a wide range of applications, such as premix, air fuel proportional power jet, parallel positioning power jet, and the like.

The system may enable ways for air fuel mixing accuracy, fuel adaptability, air fuel proportional mixing, non-linear mixing curve, automatic commissioning, diagnostics, modulation range, fuel metering, fuel pressure surveillance, air pressure surveillance, revision control of settings, authorization control, safety and protection, and fail safe operation.

Precise control of the fuel-air ratio may be one of the most important aspects of improving overall burner performance and efficiency of a combustion chamber, such as a burner.

The description may show how a regulation approach measures a servo air mass flow, with a first mass flow sensor, that relates to a main air mass flow and how the regulation approach measures a servo air flow, with a second mass flow sensor, which relates to a main fuel flow.

The description may further show how the system is made fail safe by a first embedded approach to detect that mixture could go to an unsafe ratio due to sensor drift by detection and measuring the amount of sensor readings drift, and to correct for the measured amount of sensor drift in the first place or to shut off the application when the measured amount of drift passes a predefined threshold. Correction may be applied for changes in filter or orifice restriction.

The description may also show how the system is made fail safe by a second embedded approach that would detect that the mixing ratio could go to an unsafe situation due to increased restriction of the fuel side filter and which will shut off the application when a certain predefined threshold is crossed.

The description may yet show how an installer can program virtually any curve that best fits the application, for mixing ratio of air mass flow and fuel mass flow as a function of burner capacity, and how the system can regulate the mixing ratio of air mass flow and fuel mass flow based on the commissioned and approved set points.

One item may be the related art regulation devices may have issues embedded which may be resolved. The issues may include difficult to access the adjustment devices, poor signal feedback to the installer, no possibility to fixate, lock or secure the tested and approved setting, needs manual adjustment, no automatic commissioning, no diagnostics, limited programmed mixing ratio possibility for different heat capacities, reliant at skills and patience of installer for safety and combustion quality, only valid for zero governor systems, a different solution is required for non-zero governor systems, and no or crude detection that settings have drifted off from the commissioned values.

The valve may be installed in all kinds of situations, which means that reading the markings of the adjustment screw and adjusting the adjustment screw can be difficult in many cases. In a typical gas burner, it may be difficult to access, or to adjust. Thus, visual feedback of the adjustment device may be poor at a location of the burner.

Fixating or securing the adjustment device in a favored setting without disturbing the achieved setup may be very difficult or impossible, and time consuming.

Placing a cover to withdraw the adjustment screw from sight does not necessarily fixate the settings. It may be easy to touch the adjustment screw, and accidentally de-adjust the setting, while mounting the cover. Any cap or cover should be removable for the installer and can, unnoticed, be removed by some individual to change the setting of the boiler.

The related art systems may need manual adjustments. During commissioning, the installer may attach a temporary combustion sensor to read combustion quality. Based on the measured result, the installer may need to turn screws according a defined procedure until combustion quality is good and acceptable. After each adjustment step, the combustion process and the burner may need to stabilize over time. The procedure may require patience, tools, time, and skills by the installer. For air-gas proportional regulation systems, there may be two settings that can be adjusted by the adjustment screws.

Principally, a stepper motor may be applied to turn the adjustment devices for the installer. As soon as the power is off however, the stepper may lose its position and need a reset of steps. An independent position feedback may need to validate that the adjustment devices are at a correct position. Thus, one or two actuators and one or two feedback systems may be needed just to maintain a static setting over time. These items may make it financially difficult to apply automatic commissioning.

During an operation of a system, a number of things may happen for which one may need sensing and diagnostics. For example, the building regulator may break resulting in high gas supply pressure; something may damage or block a gas supply line leading to an insufficient gas supply, and block an air supply leading to insufficient supply of air. Something may happen to a power supply leading to higher or lower fan speed than expected. Something may go wrong with air restriction valve. Something may block the chimney leading to changing air flow and causing higher combustion chamber pressure. A filter in a servo flow channel may get plugged by pollution. A sensor may drift from its setting. Chemical gas content may change over time. One of the orifices in one of the servo channels may get blocked. Someone may make a mistake during commissioning. Gas metering may go wrong. Different switches and/or sensors may be needed to detect an event about to happen. Zero governor systems or differential pressure sensors may have just limited use for applying diagnostics.

A programmed mixing ratio may be desired. Mixing a ratio of air and gas resulting from any zero governor system (where a flow sensor that regulates around zero flow is basically a zero governor as well) may be described as a first order function, such as y=ax+b, where y stands for fuel mass flow, x stands for air mass flow, a defines steepness of mixing ratio, defined by throttle screw, adjustable orifice, and b defines offset, defined by offset screw or flow through sensor.

A gas mass flow reading may be desired. Gas suppliers may change chemical content of gas over the year to improve demand for the winter and summer seasons, as many systems rely on pressure regulators. The gas content may be changed such that a Wobbe index (specific heat/density) remains constant, meaning that typical applications will not necessarily suffer from mis-adjustment because of changed content. A major drawback of flow sensors, even when the sensor is approved for use in natural gas, may be that the sensor measures flow by heat transfer, meaning that the reading relies on all kinds of specific gas parameters like density, viscosity, specific heat, and a specific heat conduction coefficient. When the chemical content of the gas used changes over time, a reading error may occur in the mass flow sensor. For this reason, a flow sensor cannot necessarily be applied to accurately measure gaseous flows with changing chemical content over time.

Drift detection may be desired. In some systems, pressure switches may be used to shut the application off when a certain pressure target is not met. When the application runs at a relative low power level, it may be difficult to distinguish between acceptable and non-acceptable drift.

A redundancy configuration may be desired for air and fuel flow paths. A burner system (e.g., pre-mix burner applications, forced draft burner applications, and/or other burner applications) or other system may produce a differential pressure signal that relates to a main air flow path and a differential pressure signal that relates to a main fuel flow path. A pressure downstream of a mixing point in the system may be considered a downstream (sink) reference pressure for both differential pressures. A pressure upstream of the mixing point in the air channel may be taken as a (source) reference pressure for differential air pressure. A pressure upstream of the mixing point in the fuel channel may be taken as a (source) reference pressure for differential pressure.

The redundancy configuration may include a first flow path (e.g., a main air flow path), a second flow path (e.g., a main fuel flow path), a third flow path (e.g., a redundancy flow path), and/or one or more other flow paths. The first flow path may be connected to an air source (e.g., an air source pressure, P1) and the pressure downstream of the mixing point (e.g., the sink pressure, Po). The first flow path may be equipped with a first sensor (e.g., a mass flow sensor, a differential pressure sensor, and/or other sensor) that may produce a reading that is related to fluid flow through the first flow path. The second flow path may be connected to the air source, a fuel source (e.g., a fuel source pressure, P2), and to the sink pressure, Po. The second flow path may be equipped with a second sensor (e.g., a mass flow sensor, a differential pressure sensor, and/or other sensor) that may produce a reading that is related to fluid flow through the second flow path in respect to the first flow path.

The third flow path may be connected in a first arrangement to the air source and the sink pressure, Po, or in a second arrangement the air source, the fuel source, and the sink pressure, Po. The third flow path may be equipped with an open/close valve and depending on the state of the open/close valve, the third flow path may be in the first arrangement or the second arrangement. Further, the third flow path may be equipped with a third sensor (e.g., a mass flow sensor, a differential pressure, or other sensor) that may return a reading related to fluid flow through the first flow path and that is redundant with the first sensor when the third flow path is in the first arrangement and may return a reading related to fluid flow through the second flow path in respect to the first flow path and that is redundant with the second sensor when the third flow path is in the second arrangement.

In some cases, readings (e.g., measurements or measurement values) from the third sensor may be compared to readings from one or more of the first sensor and the second sensor to identify a malfunction in the burner system. When a malfunction is identified, an alert or alarm may be triggered. A malfunction may include one or more of a blocked or partially blocked flow path, a sensor not operating correctly, and/or one or more other issues with the operation of the burner system or a component thereof.

The present system may involve (1) a regulation system, (2) a regulation approach, and (3) a regulation product that solves known issues and offers a solution for gas burner application systems (e.g., air-gas proportional premix, air-gas proportional forced draft, and/or parallel positioning forced draft).

The present control system may eliminate weaknesses regarding mechanical adjustment devices and flow measuring with a flow sensor of gaseous fluids. The control system may exclude mechanical adjustment needs. Also, the system may combine the measurement of fuel and air in such a way that a second flow sensor can be used to measure both fluids with respect to each other while just air flows through the first and second sensors.

FIG. 1 is a diagram of a measurement system 15 (e.g., a sensing module) that may provide signals for fuel regulation. An example fuel may be natural gas for illustrative examples discussed herein but other kinds of fuel may be applicable to the present system and approach. The system may consist of two servo mass flow inlets. One inlet 17 may be connected to a reference air flow duct with a reference air pressure. Another inlet 16 may be connected to a gas flow duct with a regulated pressure.

The system 15 may include one outlet 18 which is connected to a reference point downstream of the inlet points in the boiler where air and gas has been mixed together, for instance, at a combustion chamber or downstream of a mixing device. The system may also include three or so filters 19, 20, 30 to filter particles out of the incoming air, out of incoming gas and outgoing air-gas that might flow back due to a pressure surge during ignition. The system may include four or so flow resistances 21, 22, 23, 24, typically orifices. The flow resistances may be different from each other in size and resistance level. The system may incorporate two mass flow sensors 25, 26, of which produce flow dependent (electrical) signals.

Pressure in a fuel channel is not necessarily measured. Mass flow through the sensors may be measured; or in case that a sensor is calibrated for differential pressure, a pressure drop over the sensor may be measured. From there, an indication for pressure in the fuel channel may be calculated. The calculated pressure is not necessarily an exact value.

Although the system is described above and depicted in FIG. 1 as having two servo mass flow inlets (e.g., inlets 16 and 17) and one outlet (e.g., outlet 18), the system may have one servo mass flow inlet and two outlets. In one example, the one inlet 17 may be connected to a reference air flow duct with a reference air pressure, one of the two outlets (e.g., outlet 18) may be connected to a reference point downstream of the inlet point 17 in the boiler where air and gas has been mixed together, for instance, at a combustion chamber or downstream of a mixing device, and the inlet 16 may be converted into the second outlet. Such a configuration may allow for regulating relative low fuel pressure, as compared to air pressure.

The system may incorporate a first servo flow channel 141 from positive air reference pressure (A) 27 to a lower pressure (C) 28 combustion chamber. The first servo channel may incorporate an inlet filter (E) 20, a mass flow sensor (H) 25, a mass flow resistance (I) 23 and a back-flow outlet filter (G) 30. The mass flow sensor (H) 25 may produce a first electrical signal (#1) 31 which reflects the servo mass flow of air through the first mass flow channel. The system may incorporate a second servo flow channel 142 from positive air reference (A) pressure to an intermediate pressure connection point (D). The second servo channel may incorporate the inlet filter (E) 20, a mass flow sensor (J) 26 and a mass flow resistance (K) 24. The mass flow sensor 26 may produce a second electrical signal (#2) 32 which reflects the servo mass flow of air through the second mass flow channel.

The system may incorporate a third servo flow channel 143 from positive regulated gas pressure (B) 34 to an intermediate pressure connection point (D) 33. The third servo channel may incorporate an inlet filter (F) 19, a check valve (L) 35 and one or more mass flow resistances in parallel (M) 21. The check valve 35 may be open to allow gas to flow from the inlet 16 of regulated gas (B) 34 pick-up to the intermediate pressure point (D) 33, or from the intermediate pressure point (D) 33 to the regulated gas pressure (B) 34 pick-up point. The check valve (L) 35 may be closed (shut of) to prevent gas to flow from or to the intermediate pressure point (D) 33 to the regulated gas pressure pick up point (as flow is still allowed to flow from intermediate pressure point to combustion chamber when the valve is closed).

The system may incorporate a fourth servo flow channel 144 from the intermediate connection point (D) 33 to the lower pressure combustion chamber (C) 28. The fourth servo channel may incorporate a flow resistance (N) 22 and an air filter (G) 30. The filters for multiple channels may be combined into one combination filter.

FIG. 1a is a diagram of a burner control system 151 which may be a variant of system 15 in FIG. 1. Air supply 37 may provide air to a first inlet 17 which has a connection with inlets of first mass flow sensor 25 and second mass flow sensor 26. A first signal output 31 from flow sensor 25 may be connected to an input of a processor 152, and a second signal output 32 from flow sensor 26 may be connected to another input of processor 152. An outlet of flow sensor 25 may be connected to a first outlet 153 of system 151. Outlet 153 may be connected to a first mixing point 154. An outlet of flow sensor 26 may be connected to a second mixing point 33.

A fuel supply 45 may be connected to a variable mass flow restriction 155. A downstream end of restriction 155 may be connected to a second inlet 16 of system 151. An output of processor 152 may provide a signal to adjust or vary restriction 155.

Inlet 16 may be connected to mixing point 33. Mixing point 33 may be connected downstream to a second outlet 156 of system 151. Outlet 156 may be connected to a third mixing point 157.

Air supply 37 may be connected to a static air flow restriction 158. Restriction 158 may be connected downstream to first mixing point 154. Mixing point 154 may be connected downstream to a variable air flow restriction 159 which in turn can be connected to third mixing point 157. Mixing point 157 may be connected downstream to a combustion chamber 162. A data storage memory 163 may be connected to processor 152.

FIG. 1b is a diagram of a burner control system 161 which may be a variant of system 15 in FIG. 1. Air supply 37 may provide air to a first inlet 17 which has a connection to inlets of first mass flow sensor 25 and second flow sensor 26. A first signal output 31 from flow sensor 25 may be connected to an input of a processor 152, and a second signal output 32 from flow sensor 26 may be connected to another input of processor 152. An outlet of flow sensor 25 may be connected to an outlet 18 of system 161. Outlet 18 may be connected to a combustion chamber 162. An outlet of flow sensor 26 may be connected to a mixing point 33.

A fuel supply 45 may be connected to a variable mass flow restriction 155. A downstream end of restriction 155 may be connected to a second inlet 16 of system 161. An output of processor 152 may be provided to variable mass flow restriction 155.

Inlet 16 may be connected downstream to a mass flow restriction 21. Restriction 21 may be connected downstream to mixing point 33. One or more additional restrictions may be connected in parallel with restriction 21. For example, a restriction 165 may have an inlet connected to a valve 166 that is connected to inlet 16. An outlet end of restriction 165 may be connected to mixing point 33. If needed or desired, another restriction 167 may have an inlet connected to a valve 168 that is connected to inlet 16. An outlet of restriction 167 may be connected to mixing point 33. Values 166 and 168 may open or close to switch in or out, respectively, restrictions 165 and 167.

FIG. 2 is a diagram of a representation of a reference air flow. In a main air flow channel, a pressure difference may be created by an actuator like a fan or a pump at an air supply inlet (AA) 37. A fan or pump may result in the fact that a relative high pressure occurs upstream, at the inlet (AA) 37 in comparison with a relative low pressure downstream, at the outlet (C) 28. The actuator may be placed near the inlet, but also at other positions in the air channel. In order to adjust the reference air (mass) flow, it may be possible to change the speed of the actuator or possible to operate an adjustable air flow restriction, like an air valve (AB) 38. The air valve (AB) 38 is not necessarily mandatory in the air channel.

Upstream of a combustion chamber (C) 28, a burner head may be positioned to represent a flow restriction (AC) 39. Burner head flow restriction (AC) 39 may be an important feature for the regulation as it can produce a pressure difference between reference point (A) 27 and reference point (C) 28 as a function of the main air flow through the burner head restriction 39 that is used to feed the sensing module 15. Instead of burner head resistance also a dedicated static flow resistance may be used to generate a reference pressure difference. This dedicated resistance may be applied in case that the burner head may be varied for some reason like variation over time or variation over flow capacity.

FIG. 3 is a diagram of a representation of a reference air flow for a premix application. For premix applications where air and gas is mixed before the burner head, it may be possible to make use of the flow resistance of the air side section of the mixing device (for instance, the inlet of a venturi. In case of a premix, a mixing device flow restriction (AD) 41 may be an important feature for the regulation as it can create a pressure difference between reference point (A) 27 and reference point (C") 42 as function of the main air flow over the mixing device restriction 41 and the mixing point (AE) 43 that is used to feed the sensing module 15.

Figure 4:
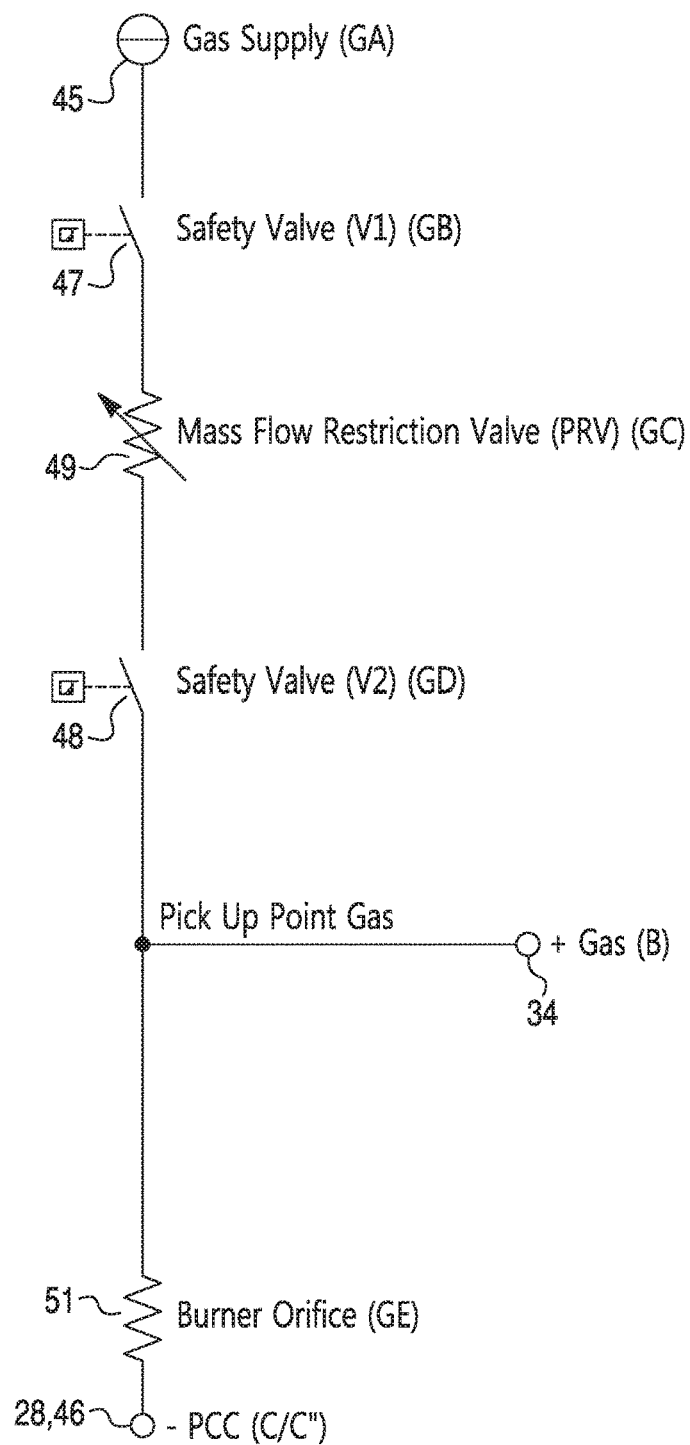
FIG. 4 is a diagram of a representation of a regulated gas flow.

FIG. 4 is a diagram of a representation of a regulated gas flow. In the main gas flow channel, an inlet pressure may be supplied (GA) 45 which is higher than the combustion chamber pressure (C/C") to the system. In the gas channel, a first safety shut off valve (GB) 47 may be present for safety reasons. A second safety shut off valve (GD) 48 may be present for safety reasons. The safety shut off valve may be either opened or closed. An adjustable flow restriction valve (GC) 49 may be available to regulate the gas flow to a desired level between a minimal and maximal value. The adjustable flow restriction valve 49 may be at any position between maximal closed and maximal open. The mass flow restriction valve (GC) 49 may be positioned between the first safety shut off valve (GB) 47 and the second safety shut off valve (GD) 48, but it may also be possible to position the restriction valve (GC) 49 upstream of the first safety shut off valve (GB) 47 and downstream of the second safety shut off valve (GD) 48 though upstream of the pressure pick-up point (B) 34 for gas pressure.

Downstream of gas pick-up point (B) 34 and upstream of combustion chamber pressure (C) 28 or mixing device pressure (C") 42 (FIG. 3), a flow restriction like a burner orifice (GE) 51 (FIG. 4) may be present which generates a pressure difference as a function of gas flow that is used to feed the sensing module 15 between points (B) 34 and (C) 28 (FIG. 1). A pressure after burner office 51 may be combustion chamber PCC(C) 28 or PPC(C") 46 (FIG. 4).

It may be desirable to regulate gas mass flow in relation to an air reference mass flow such that gas and air are mixed together, in the combustion chamber or in the mixing device chamber or likewise, according a pre-defined ratio. The predefined mixing ratio may relate to the production of combustion emission gases like $CO_2$, CO, and NOx. The optimal mixing ratio may differ slightly from application to application. Also, the optimal mixing ratio may differ slightly over the heat capacity band of a given application, meaning that a burner might need a different mixing ratio at low capacity conditions than at medium capacity conditions or than at maximum capacity conditions. Additionally, it may be that a startup condition needs a different mixing ratio than a burning operation condition. In all, the mixing ratio may need to be flexible to cover different conditions and be repeatable in its setting to obtain a comparable combustion result, time and time again.

Setup and commissioning may be noted. In order to set up, use and check the system for proper combustion, a number of different operating conditions may be considered for the regulation system.

Figure 5:
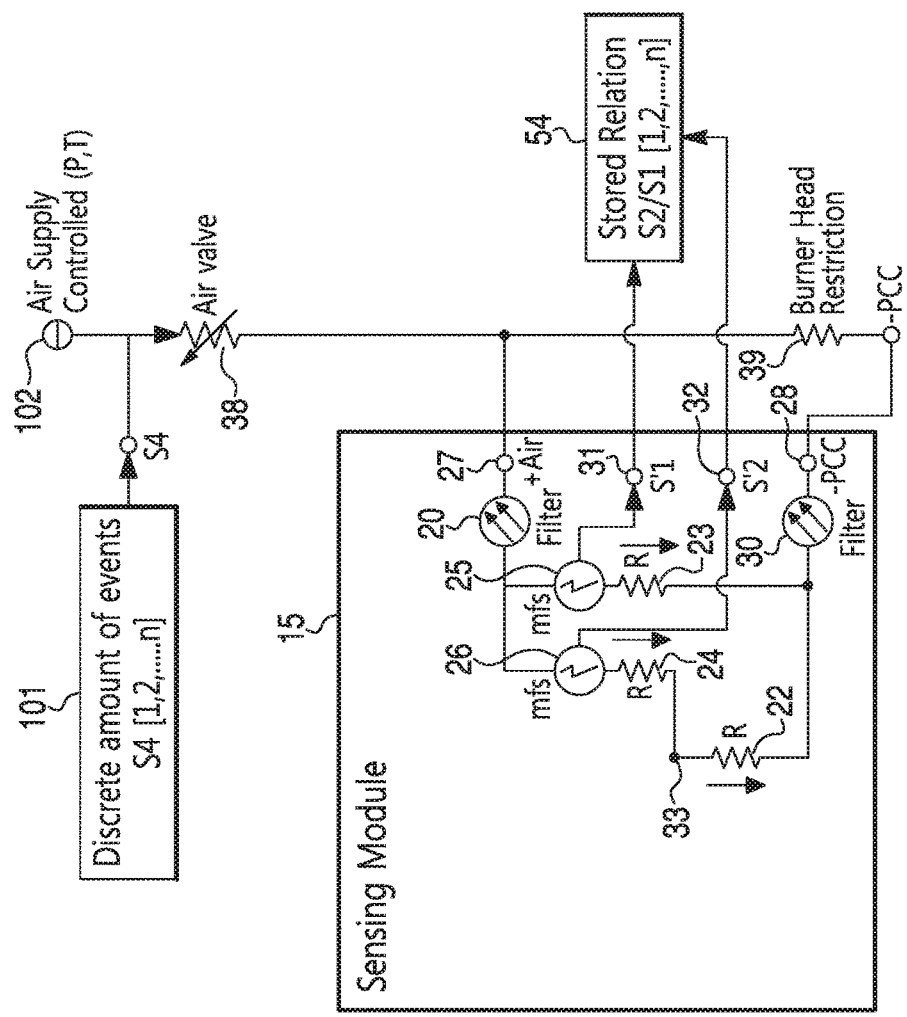
FIG. 5 is a diagram of a first operating condition for a regulation system.

FIG. 5 is a diagram of a first operating condition for a regulation system. In the first operating condition for the regulation system where the check valve 35 in the sensing module 15 is closed and where the gas flow channel is separated from the sensing module, and hence does not necessarily affect the sensor readings 31 and 32, a discrete number of different air flow levels may be generated through the main air flow tube (right side) which can cause a discrete number of different pressure differences over the burner head restriction that leads to a discrete number of servo flows through the first, the second and the fourth servo channels of the sensing module 15 and that will produce a discrete number of sensor readings for mass sensor (#1) 25 and for mass sensor (#2) 26. The air supply pressure and air supply temperature are not necessarily conditioned, but may be least controlled in that they represent a condition that matches the situation when the sensor readings were stored. The first servo channel which contains mass flow sensor (#1) 25 may be, in this situation, in parallel with the second channel and fourth servo channel which contain mass flow sensor (#2) 26. The two parallel channels may be fed by the same source and the mass flows may be released to the same sink. Also, the mass flows may pass the same inlet filter 20 and exit filter 30, and the flow resistances 22, 23, 24, as the mass flow sensors 25, 26 may be static non-variable components meaning that the ratio of sensor (#2) 26 reading and sensor (#1) 25 reading should be consistent and repeatable. The sensor readings as signals 31 and 32 for sensor (#1) 25 and sensor (#2) 26, respectively, may be stored as reference values at storage 54, indicated as S'1[1, 2, . . . , n] and S'2[1, 2, . . . , n].

Corresponding to the readings at storage 54 may be a discrete amount of events S4[1, 2, . . . , n] at symbol 101 with a connection between a controlled air supply 102 and an air valve 38 which may be controlled. During setup the installer is somehow able to control the air supply, by air supply or air valve, but under an operation mode the air flow may be controlled by an external device and not be accessible for our regulation system. Still the relation is there, but one does not necessarily control the source.

Figure 6:
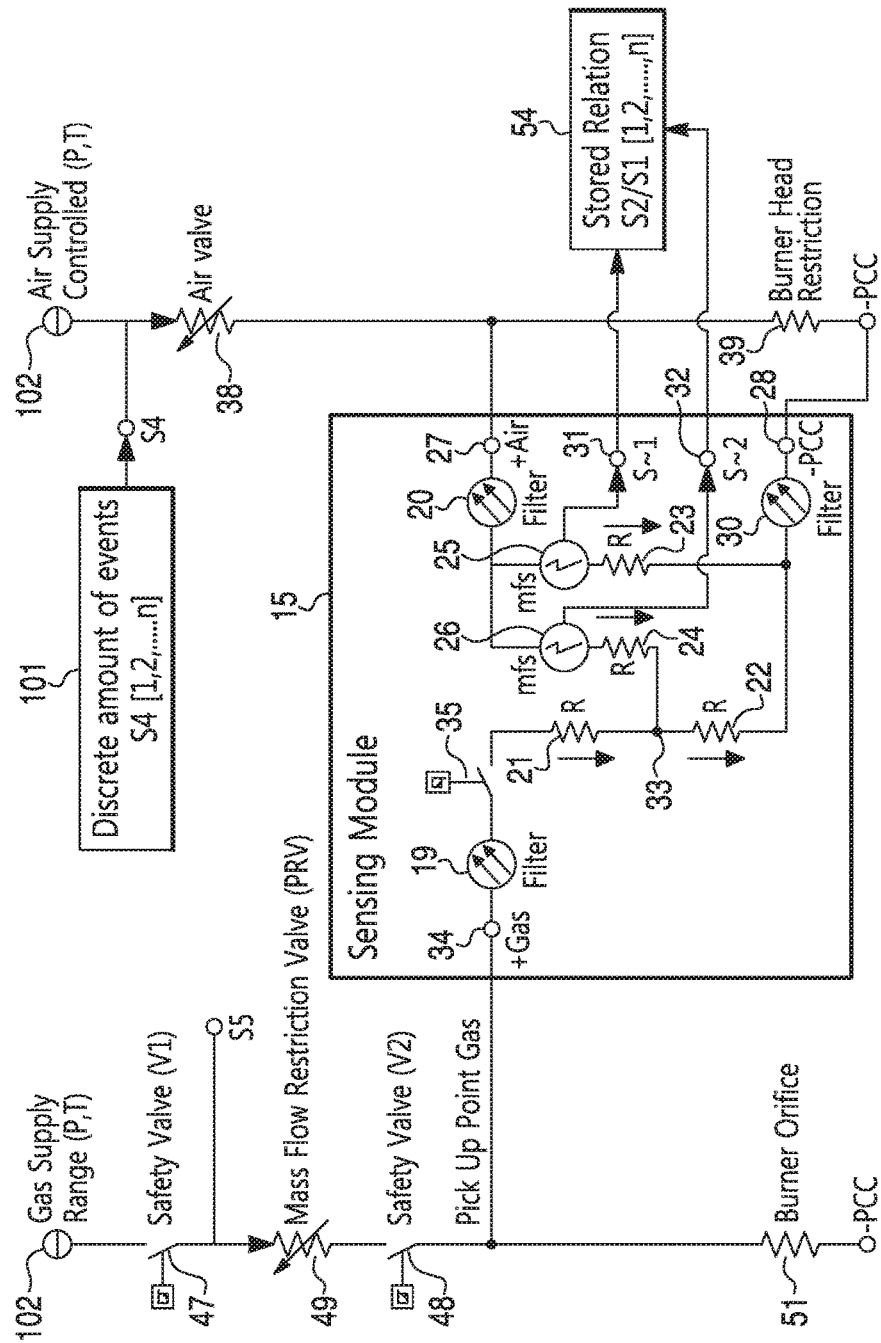
FIG. 6 is a diagram of a second operating condition for the regulation system.

FIG. 6 is a diagram of a second operating condition for the regulation system. In the second operating condition for a regulation system, where the check valve 35 in the sensing module 15 is opened, at least one of the two safety shut off valves 47 and 48 may be closed, and the gas flow channel be transformed (regarded as) into another air flow channel from the sensing module 15 to the combustion chamber or the mixing device chamber, again a discrete number of different air flow levels may be generated through the main air flow tube (right side) which can cause a discrete number of different pressure differences over the burner head restriction 39 which will lead to a discrete number of servo flows through the first, the second, the third and the fourth servo channels of the sensing module 15 and which may produce a discrete number of sensor readings for mass sensor (#1) 25 and for mass sensor (#2) 26. The air supply pressure and air supply temperature are not necessarily conditioned, but are at least controlled in that they represent a condition that matches the situation when the sensor readings are stored. The first servo channel which contains mass flow sensor (#1) 25 may in this situation be in parallel with the second, third and fourth servo channels which contain mass flow sensor (#2) 26.

The two parallel channels may be fed by the same source and the mass flows may be released to the same sink. Also, the mass flows may pass the same inlet filter, but the gas inlet filter in this case may function as a second exit filter and the flow resistances as well as the mass flow sensors may all be static non-variable components meaning that the ratio of sensor (#2) 26 reading 32 and sensor (#1) 25 reading 31 should be consistent and repeatable (the servo air flow crosses also the burner orifice resistance, this burner orifice is ignored for this operation condition, as the cross sectional area of the orifice is dimensioned for the main gas flow and in fact can be regarded infinitely large for the servo air flow which is much smaller than the main flow). The sensor readings for sensor (#1) 25 and sensor (#2) 26 may be stored as reference values at storage 54, indicated as S-1[1, 2, . . . , n] and S-2[1, 2, . . . , n] (or any other indication).

Corresponding to the readings at storage 54 may be a discrete amount of events S4[1, 2, . . . , n] at symbol 101 with a connection between a controlled air supply 102 and an air valve 38 which may be controlled.

Figure 7:
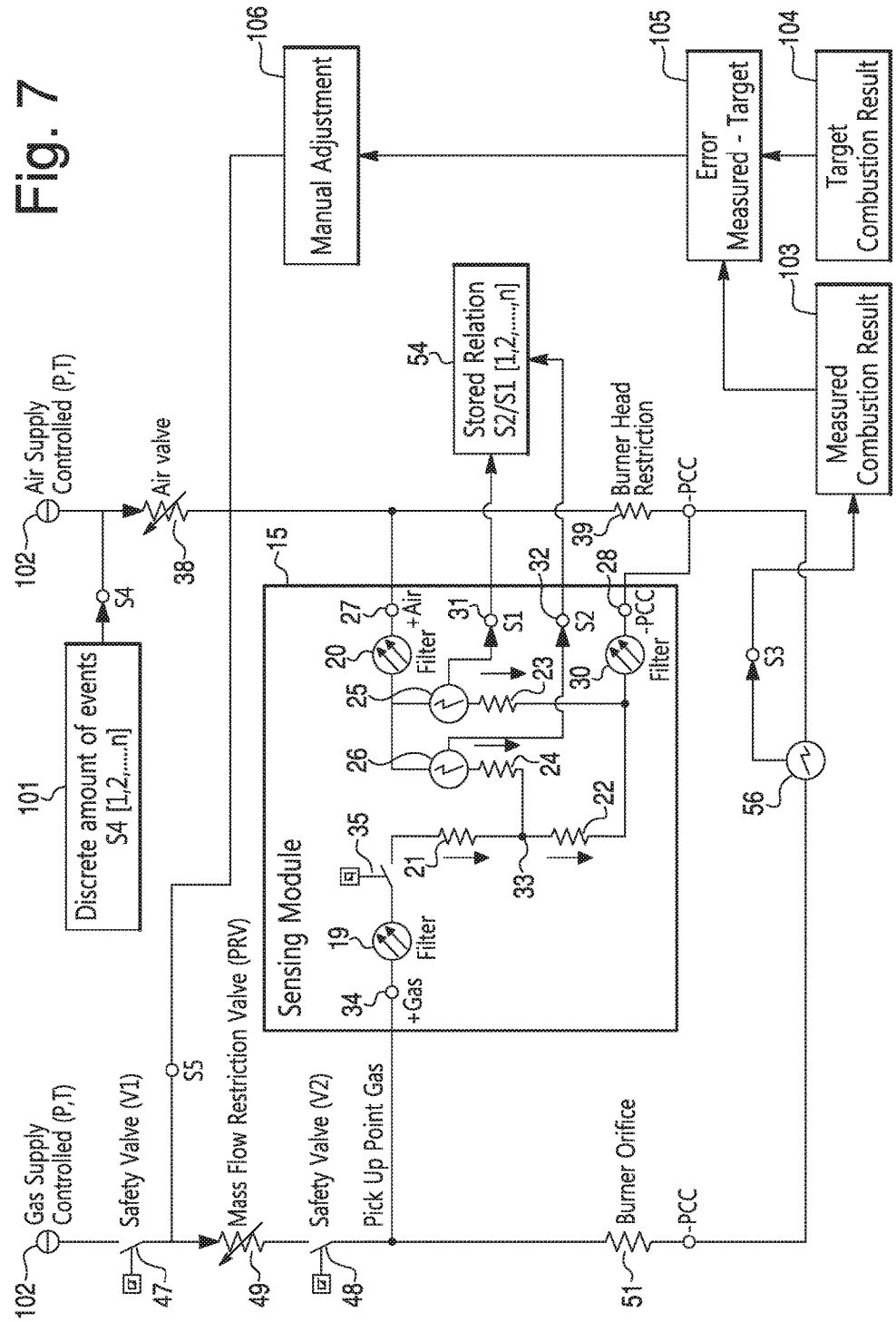
FIG. 7 is a diagram of a third operating condition for the regulation system.

FIG. 7 is a diagram of a third operating condition for the regulation system. A combustion sensor (mixing ratio) 56 may provide a measured combustion result at symbol 103. A target combustion result may be provided at symbol 104. The difference between the measured and target combustion results may be determined as an error at symbol 105. The measured combustion result may be changed with an adjustment of a gas flow from gas supply 102 as indicated at symbol 106 to reduce or eliminate the error or difference between the measured and target combustion results.

In the third operating condition for a regulation system, where the check valve 35 in the sensing module 15 is opened, all safety shut off valves 47 and 48 may be opened. Sensor (#1) 25 may measure air mass flow parallel to the main air flow and the measured flow may have a direct relation to the main air mass flow. Sensor (#2) 26 may measure air mass flow between the air reference point 27 and the intermediate pressure point 33 between channels three and four. As a result of gas mass flow, a pressure difference over the burner orifice 51 may result which forms a second pressure difference over the sensing module 15. As a result of the direction of the main gas flow and the matching pressure difference over the burner orifice 51, the gas inlet pressure 34 over the sensing module 15 at the entrance of servo channel three may be higher than the exit pressure downstream of channel four and channel one. The flow resistances in servo channel three and servo channel four may be chosen such that the intermediate pressure is somewhere between the gas inlet pressure 34 and the mixture outlet pressure 28, and lower than the corresponding reference air inlet pressure 27.

For each discrete number of combinations of air mass flow and gas mass flow, a unique and discrete number of matching combinations of sensor (#1) 25 reading 31 and sensor (#2) 26 reading 32 may be captured. Sensor readings 31 and 32 for sensor (#1) 25 and sensor (#2) 26 may be stored as reference values to a commissioned number of valid and approved settings for the application at storage 54, indicated as S1[1, 2, . . . , n] and S2[1, 2, . . . , n];

where the gas mass flow for each discrete air mass flow is regulated, by adjusting a gas mass flow restriction valve 49, to a level that gives acceptable readings of the combustion sensor 56 which is temporarily installed and processed.

Figure 8:
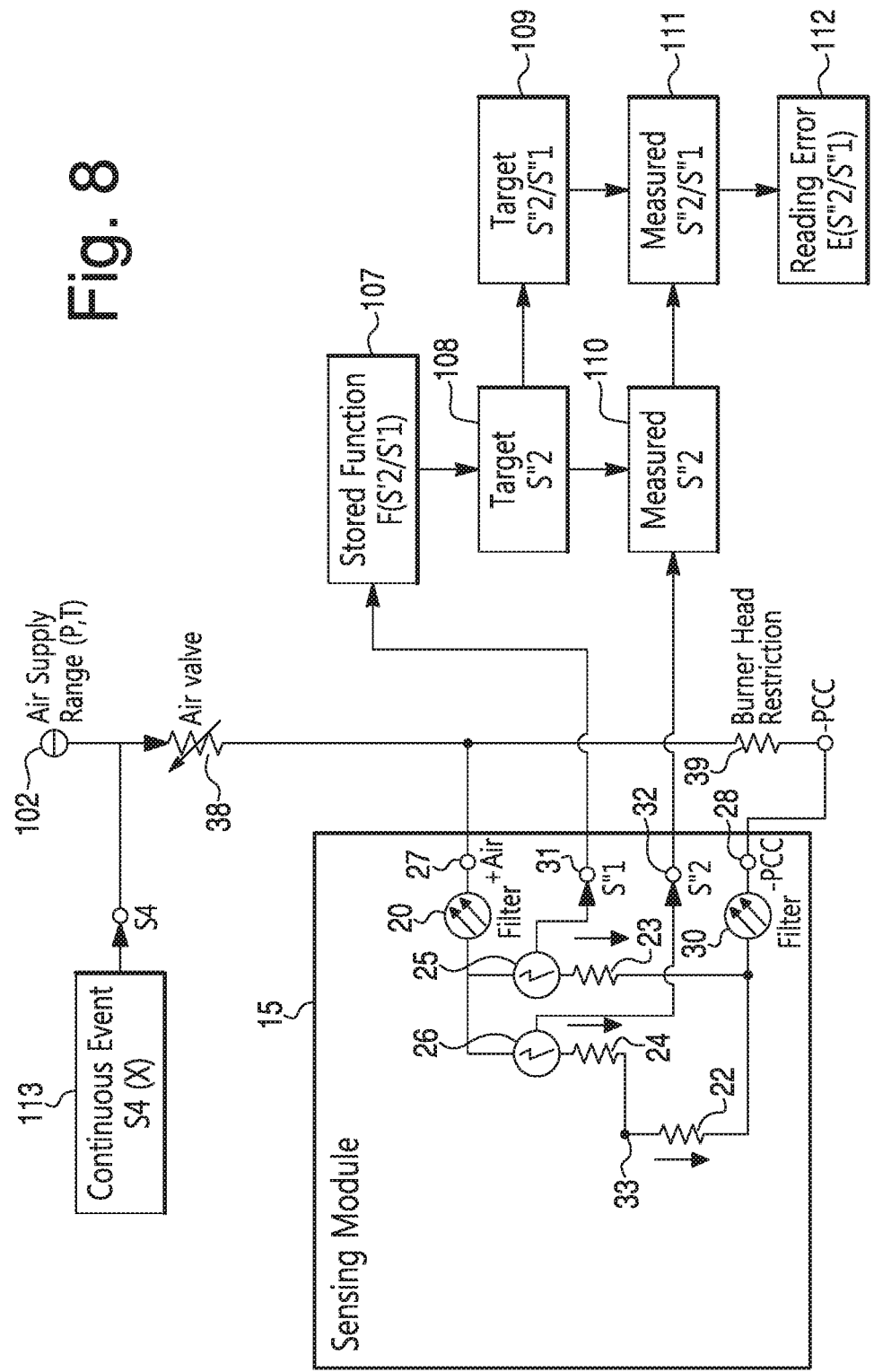
FIG. 8 is a diagram of a fourth operating condition for the regulation system.
Figure 9:
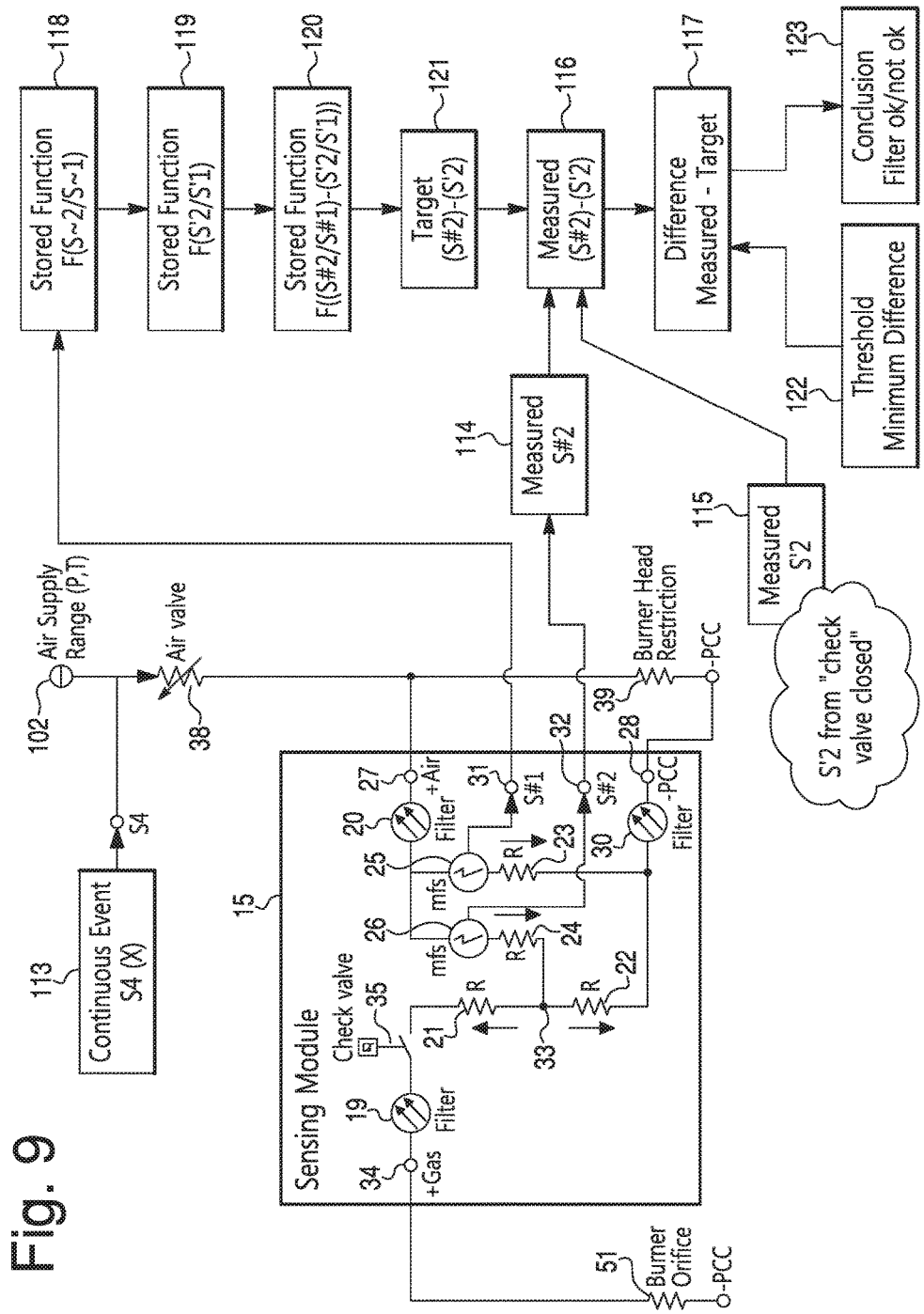
FIG. 9 is a diagram of a fifth operating condition for the regulation system.

Corresponding to the readings at storage 54 may be a discrete amount of events S4[1, 2, . . . , n] at symbol 101 with a connection between a controlled air supply 102 and an air valve 38 which may be controlled, and S3[1, 2, . . . , n] at 103 with a connection between mixing ratio of a controlled air supply and a controlled gas supply. Continuous event (@4(X) 113 may be connected via S4 to air supply range (P,T) 102 and air valve 38 (FIGS. 8 and 9).

Transfer functions may be noted. The transfer functions may be generated out of a discrete number of stored sensor readings for sensor (#1) 25 and sensor (#2) 26, for the above mentioned operating conditions, which should cover a continuous range between the minimal values and the maximal values.

A first transfer function S'2=F1(S'1) may describe a curve that represents sensor readings for the situation in which the check valve 35 is closed, and where it makes no difference if the safety valves 47 and 48 are opened or closed.

A second transfer function S-2-S'2=F2(S-1,s'1) may describe a curve that shows the difference between the check valve 35 closed and check valve 35 opened during a pre-purge situation. Pre-purge may mean that a rather large air flow is blown through the boiler application, while the safety shut off valves 47 and 48 are closed, to clean the application from any unburned gaseous content. The function may describe a reference situation for a clean filter and an open orifice in servo channel three (gas servo channel).

A third transfer function S2=F3(S1) may describe a curve that shows a sensor reading that reflects a curve through commissioned and approved mixing ratio of gas mass flow and air mass flow between the minimum capacity and maximum capacity for which appropriate combustion results have been validated and approved during the commissioning process.

A run mode (run mode=a sixth operation condition) may be noted. After the above mentioned sensor readings 31 and 32 have been measured and stored, and the transfer functions have been established in the software, the application may be ready to run unattended without an installer or combustion result sensor 56 (FIG. 7) by repeating the former approved situation.

During a run mode, the air mass flow may result from a fan/blower speed and or a position of the air valve 38 which fed by some continuous, for the present regulation system, signal. Also, the air supply pressure and the gas supply temperature, as well as the air supply moisture content, might not be the same as the reference values during the commissioning but instead they might be any value within a certain range.

During run mode a combustion sensor (mixing ratio) 56 may provide a measured combustion result at symbol 103. A target combustion result may be provided at symbol 104. The difference between the measured and target combustion results may be determined as an error at symbol 105. Transfer function F3 may be corrected based on the established error between measured combustion results and target values in order to adapt for changed chemical gas content or the like to reduce or eliminate the error or difference between the measured and target combustion results in a continuous and automatic way.

FIG. 8 is a diagram of a fourth operating condition for the regulation system. In the fourth operating condition, an unknown air mass flow may be generated through the main air flow channel, the check valve 35 may be closed, and the safety shut off valves 47 and 48 might be open or closed. An unknown air mass flow may cross the burner head restriction 39 and a pressure difference will occur over that burner head resistance where the upstream pressure is higher than the downstream pressure. The pressure difference over the burner head restriction 39 may feed two servo flows in two separate servo channels in the sensing module 15. Each servo channel may contain mass flow sensors 25 and 26, respectively, which will generate a reading signal based on the servo mass flow through the sensor.

A reading of sensor (#1) 25 may be multiplied with the first transfer function that was derived from the first operating condition to calculate a target reading for sensor (#2) 26, and a target relationship between sensor (#2) 26 reading 32 and sensor (#1) 25 reading 31 may be established. An actual reading 32 of sensor (#2) 26 might be different than the established target reading and also the measured relationship between sensor (#2) 26 and sensor (#1) 25 might be different than the target relationship.

Sensor 25 may be connected via S"1 31 to Stored function 107. Sensor 26 may be connected via S"2 32 to Measured 110. Stored function 107 may be connected to Target 108, which in turn may be connected to Target 109 and Measured 110. Measured 111 may be connected to Target 109 and Reading error 112.

Two different servo channels with virtually all static components that are fed by the same upstream pressure and which release to the same downstream pressure should maintain the same relationship between the servo mass flows. A measured difference between the measured relationship and the target relationship may indicate that the sensor readings have shifted. The shift may have occurred due to different reasons like different temperature, different moisture content, different pressure level, aging and so on.

The amount of error between the target relationship and the measured relationship may be used to determine a correction factor for sensor reading drift. For example, one may assume that the sensor (#1) 25 reading 31 is 1.20 mg air/sec. and the stored transfer function S'2=F1(S'1). The transfer function F1 may be a curve, but for a simplified example the transfer function may also be regarded as a constant=>S'2=0.75*S'1. A target reading 32 for sensor (#2) 26 may be calculated as 1.20*0.75=0.90 mg/sec.

One may assume that the measured reading 32 of sensor (#2) 26 would be 0.93 mg/sec for some reason. It may be noted that the sensor relationship has drifted from 100% to 0.93/0.90*100%=103.3% of the original relationship. A first correction factor for the drifted relationship may be an inverse of the established drift, 100/103.3=96.8%. A first threshold may be defined as a decision parameter if the correction is acceptable or that the installation needs to be re-commissioned.

FIG. 9 is a diagram of a fifth operating condition for the regulation system. The fifth operating condition may occur during a pre-purge situation where an unknown air mass flow is generated through the main air channel, and where the check valve 35 is opened, but where at least one of the safety shut off gas valves 47 and 48 is closed. As the check valve changes state (open/close) during pre-purge, the fourth operating condition may occur nearly at the same time as the fifth operating condition for which applies that the air supply conditions are unknown but at least almost equal for the two operating conditions (fourth and fifth). The unknown air mass flow may cross the burner head restriction 39 and a pressure difference will occur over the burner head restriction where the upstream pressure is higher than the downstream pressure. The pressure difference over the burner head restriction 39 may feed two servo flows in two separate servo channels in the sensing module. Each servo channel may contain a mass flow sensor which will generate a reading signal based on the servo mass flow through the sensor.

A new transfer function may be calculated out of the transfer function for the first and the second operating conditions, which calculates the target difference in sensor (#2) 26 reading 32 for the two operating conditions as a function of sensor (#1) reading 25. A sensor (#2) 26 reading 32 for the fifth operating condition may be measured. A sensor (#2) 26 reading 32 for the fourth operating condition may be measured just before and stored for comparison (or vice versa). A difference of the measured sensor (#2) 26 readings 32 for both operations may be calculated and compared with the target difference.

If the measured difference is smaller than the target difference, then the inlet gas filter 19 or the orifice in the servo gas channel may suffer pollution. As the difference of readings for two situations are compared, the absolute error of the sensors do not necessarily affect the accuracy of the measurement, even a small difference counts many sensor (resolution) steps and change will be detected.

As an example, sensor (#1) 25 reading may be assumed to be 1.20 mg air/sec. The first stored transfer function may be assumed as S'2=0.75*S'1. The second stored transfer function may be assumed as S-2=0.80*S-1. A target difference for the readings of sensor #S may be calculated as 1.20*(0.80−0.75)=0.06 mg/sec.

A measured reading of sensor (#2) 26 with closed check valve 35 may be assumed as 0.93 mg/sec and it may be known that a first correction factor of 96.8% should be applied, to correct the reading to 0.90 mg/sec.

A measured reading of sensor (#2) 26 with an opened check valve 35 may be assumed as 0.97 mg/sec and a first correction factor of 96.8% should be applied to correct the reading to 0.938 mg/sec. A measured difference, which may be corrected for a drift, of the readings of sensor #S may be calculated as 0.938−0.90=0.038 mg/sec.

In the example, the measured difference of 0.038 mg/sec may only be 63% of the target value which indicates that the difference between check valve 35 open and check valve 35 closed has decreased and that the filter 19 or the orifice may suffer from serious pollution. A second threshold may be defined as a decision parameter if the situation is still acceptable or not.

It may be possible to apply a correction for a plugged filter or orifice.

A measured difference from a symbol 116 may be compared with a target difference at a symbol 117 and be difference of the measured and target differences. A threshold minimum difference from symbol 122 may be compared with the difference at symbol 117. If the threshold difference is not exceeded or is exceeded, then a conclusion may be that filter 19 is ok or not ok, respectively, as indicated at symbol 123.

Sensor 25 may be connected via S#1 31 to Stored function 118. Sensor 26 may be connected via S#2 32 to Measured 114. Stored function 118 may be connected to stored function 119, which in turn may be connected to stored function 120. Stored function 120 may be connected to target 121, which in turn is connected to measured 116. Measured 114 may be connected to measured 116. Measured 115 may be connected to measured 116. Measured 116 may be connected to difference measured-target 117. A threshold minimum difference 122 may be connected to difference measured-target 117. Difference measured-target 117 may be connected to conclusion filter ok/not ok 123.

Figure 10:
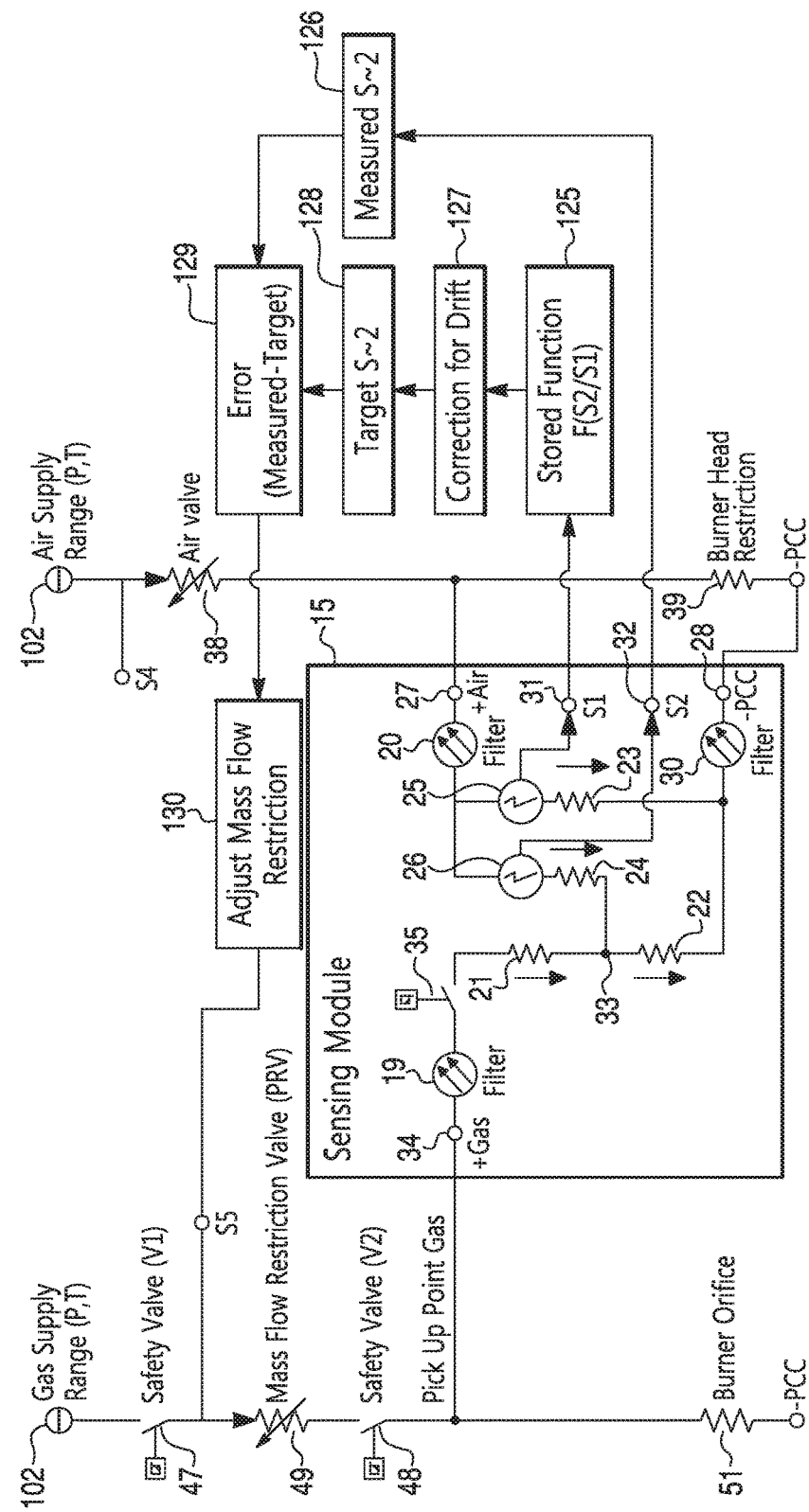
FIG. 10 is a diagram of a sixth operating condition for the regulation system.

FIG. 10 is a diagram of a sixth operating condition for the regulation system. In the sixth operating condition, an unknown air mass flow may be generated through the main air flow channel. The unknown air mass flow may cross the burner head restriction 39 and a pressure difference may occur over that burner head resistance where the upstream pressure is higher than the downstream pressure.

During the sixth operating condition, check valve open, all safety shut off valves open, a gas restriction valve 49 may be at a certain position which is defined by a regulation algorithm, such that the gas mass flow that results out of that setting relative to a given air mass flow results in a reading relationship of sensor (#1) 25 and sensor (#2) 26 that repeats a combustion result in terms of emissions which has been approved during commissioning process. During commissioning one may have set and approved a discrete number of emissions. Then, one may have created a transfer function that connects the discrete number of sensor readings that correspond with the air mass flow and emission reading into a target curve (third transfer function). With a regulation algorithm, gas flow may be regulated such that measured relationship between sensor #1 25 and sensor #2 26 approaches the target relationship.

Sensor (#1) 25 may measure servo air mass flow parallel to the main air flow channel due to a differential pressure over the burner head restriction 39 and the measured flow may have a direct relation to the main air mass flow. Sensor (#2) 26 may measure air mass flow between the air reference point and the intermediate pressure point between channels three and four. As result of gas mass flow, a pressure difference over the burner orifice 51 may occur and form a second pressure difference over the sensing module 15. As a result of the direction of the main gas flow and the matching pressure difference over the burner orifice 51, the gas inlet pressure over the sensing module 15 at the entrance of servo channel three may be higher than the exit pressure downstream of channel four and channel one. The flow resistances in servo channel three and servo channel four may be chosen such that the intermediate pressure is somewhere between the gas inlet 34 pressure and the mixture outlet 28 pressure and lower than the corresponding reference air inlet 27 pressure.

Out of the reading of sensor (#1) 25 and the transfer function, which was derived from the third operating condition, a target reading for sensor (#2) 26 may be calculated. Thus, a target relationship between sensor (#2) 26 reading 32 and sensor (#1) 25 reading 31 may be established.

Both sensor (#1) 25 and sensor (#2) 26 may drift a little bit due to temperature variations, moisture content variations, air pressure variations, aging and so on. The drift may be measured at a defined time interval and/or after each considerable change in burning capacity by closing the check valve 35 according operating condition four. Then a fourth transfer function may be calculated out of the third transfer function and the first correction factor, accordingly to calculate a new, for drift corrected, target reading for sensor (#2) 26.

Relative drift of sensors compared to each other may be determined. Both sensors may drift in a same ratio in the same direction; however, this will likely not be noticed, and it does not necessarily matter for regulation of an air gas mixing ratio.

The reading 32 of sensor (#2) 26 may be compared to the target reading of sensor (#2) 26. The reading 32 of sensor (#2) 26 may be different than the established target reading, thus indicating that the regulated gas mass flow should be adjusted. In case that the reading 32 of sensor (#2) 26 is less than the target of sensor (#2) 26, the gas mass flow is regulated as too large and the stepper motor of the adjustable gas restriction valve 49 may be given the command to close the gas restriction valve 49 with one or more steps.

In case that the reading 32 of sensor (#2) 26 is larger than the target of sensor (#2) 26, then the gas mass flow may be regulated as too low and the stepper motor of the adjustable gas restriction valve 49 may be given the command to open the gas restriction valve 49 with one or more steps.

Pressure regulation versus mixing ratio regulation may be noted. The present control may also be applied regulate gas pressure in a fixed relation with a reference air pressure. Also, combustion chamber pressure may be used as a reference for controlling. Gas pressure might be regulated with final objective to precisely control gas and air mixing ratio.

Main air flow may pass only one flow resistance (indicated as baffle plate resistance or burner head 51 resistance) while it may flow from reference air pressure to combustion pressure.

Symbol 125 indicates a stored function F(S2/S1). One may use transfer function S2=F(S1) relation virtually everywhere from readings 31 and 32. A measurement of S-2 from reading 32 may be indicated by symbol 126. A correction for drift of the stored function indicated by symbol 125 may be noted by symbol 127 and result in a target S-2 at symbol 128. A difference of measured S-2 from symbol 126 and target S-2 from symbol 128 may be noted as an error at symbol 129. To correct for the error, an adjusting of a mass flow restriction valve 49 may be effected as indicated in symbol 130.

Figure 11:
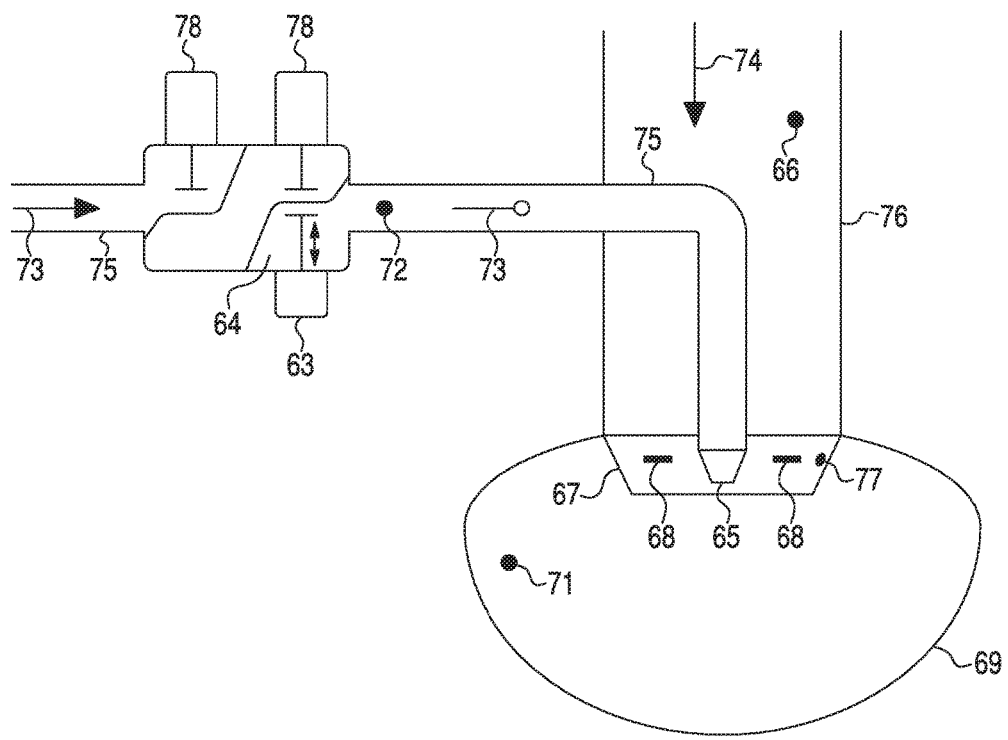
FIG. 11 is a diagram showing where a regulation control regulates gas pressure at a pick-up point for gas pressure directly downstream of the pressure regulator.

FIG. 11 is a diagram showing where regulation control regulates gas 73 pressure at a pick-up point 72 for gas pressure directly downstream of the pressure regulator (pressure regulation valve 64 control). The pressure control system may be mounted downstream in channel 75 from stepper motor 63 driven gas pressure regulation valve 64 and upstream from a burner orifice 65 or gas injector. An air 74 supply/reference at pick-up point 66 for air pressure may be taken in a channel 76 downstream of a fan or air restriction valve and upstream of a burner head 67 and/or baffle plate 68. A combustion chamber 69 reference at pick-up point 71 for combustion pressure may be taken downstream of burner orifice 65 and downstream of burner head baffle plate 68. Air flow resistance may be present at point 77. Gas channel 75 may have one or more safety shut-off valves 78.

Figure 12:
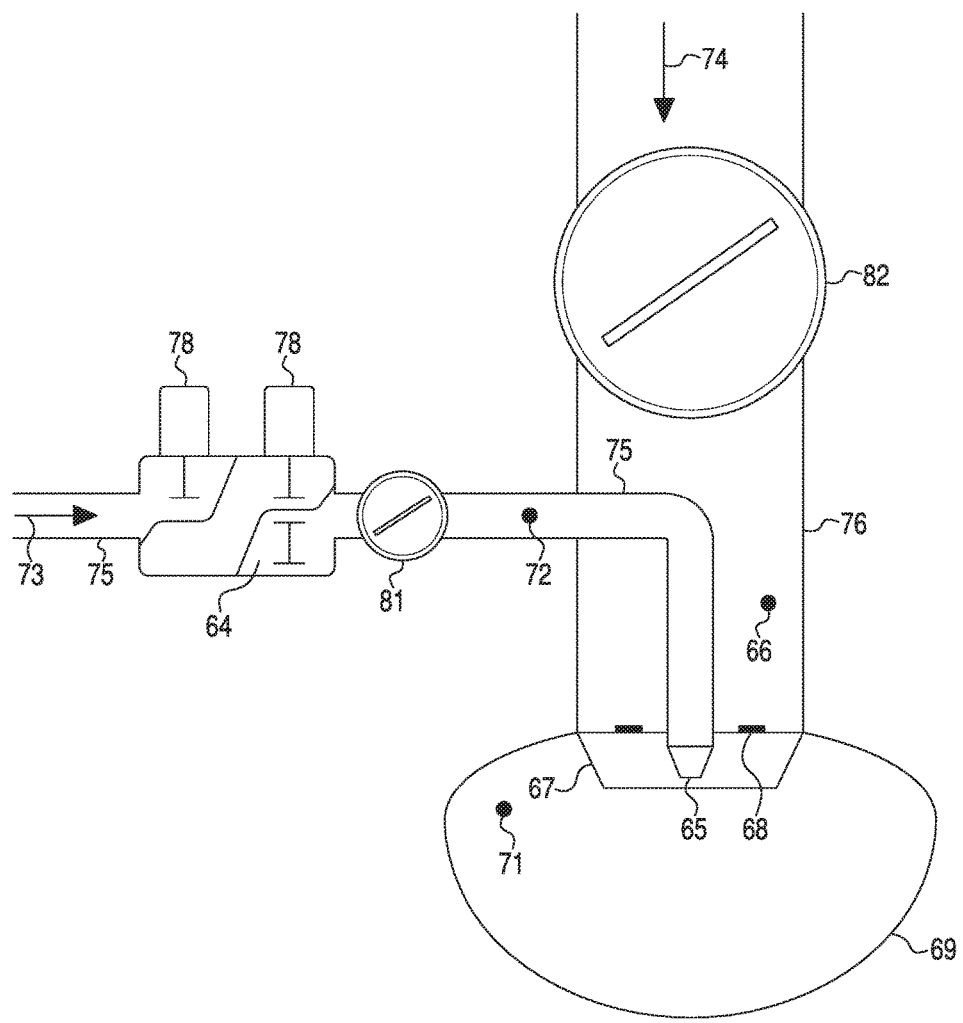
FIG. 12 is a diagram of an example where regulation control is applied as independent feedback to guard positions of an air restriction valve and a gas restriction valve in a so-called parallel positioning system.

FIG. 12 is a diagram of an example where regulation control is applied as mechanically independent feedback to guard positions of an air restriction valve 82 and a gas restriction valve 81 in a so-called parallel positioning system. For instance, there may be a gas butterfly valve 81 (fuel valve) and an air butterfly valve 82 (air valve).

A pressure control system may be used to generate a mechanically independent feedback signal in case of a parallel positioning system. For each combination of butterfly valve positions, a unique combination of sensor readings may exist. The present system may utilize a pressure difference over the burner orifice 65 (gas side) and a pressure difference over the burner head 67 (air side), just like virtually all other systems, that provide input for regulation or guarding the system.

For a parallel position system, there may be no need for a stepper motor 63 driven pressure regulator. The pressure regulator may receive its commands from a different system. There might be no need for an embedded pressure regulator at all as the sensors at pick-up points 66, 71 and 72, may provide signals to the restriction valves 81 and 82 to correct for small errors that typically occur due to building pressure regulator characteristics.

On the other hand, as the present system may provide flow related feedback, in contradiction to valve position related feedback from other systems known from the related art, a stepper driven embedded pressure regulator that receives its feedback from a pressure sensor may be applied in combination with the present burner control system. An advantage of this combination may be that a system with extremely high turn-down (ratio between maximal flow and minimal flow in the range of 100:1 or higher) can be achieved while some typical drift or tolerance may be allowed for the pressure sensor.

Figure 13:
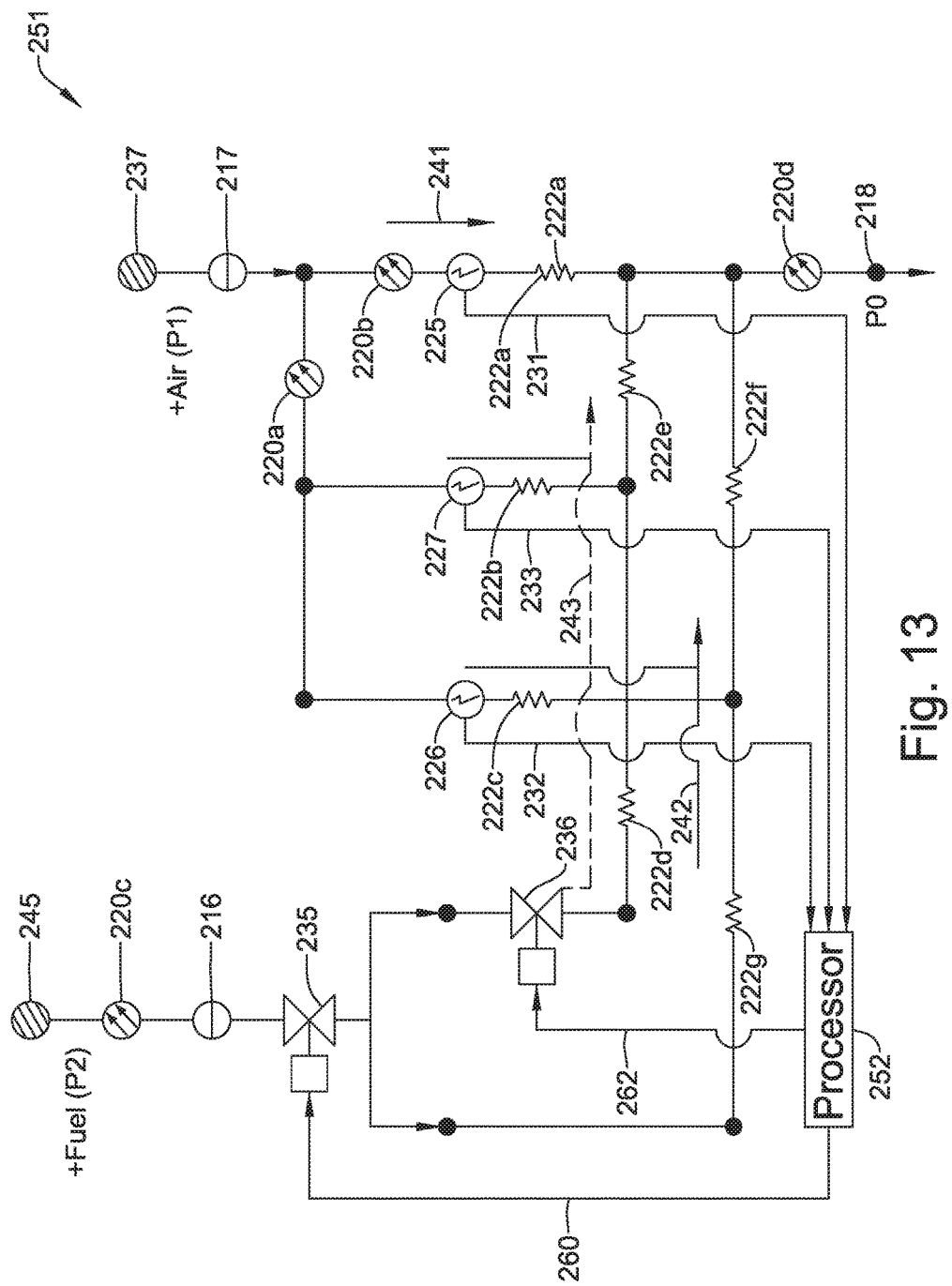
FIG. 13 is a diagram of a burner control system having a redundancy flow path and a selectable mass flow restriction relative to fuel flow to selectively provide fuel flow to the redundancy flow path.

FIG. 13 is a diagram of a burner control system 251 which may be a variant of system 15 in FIG. 1. An air supply 237 may provide air to a first inlet 217 which may have a connection with inlets of a first sensor 225, a second sensor 226, and a third sensor 227. The first sensor 225, the second sensor 226, and/or the third sensor 227 may be any type of sensor including, but not limited to, a pressure sensor, a differential pressure sensor, a mass flow sensor, and/or one or more other types of sensors that are configured to produce flow dependent electrical signals. In some cases, a first signal output 231 from the sensor 225 may be connected to an input of a processor 252, a second signal output 232 from the second sensor 226 may be connected to an input of the processor 252, and a third signal output 233 from the third sensor 227 may be connected to an input of processor 252. Please note that all references to a "first", a "second", a "third" or so on of some feature or element is for descriptive purposes and not intended to limit that feature to always being the "first", the "second", the "third", or so on of that feature. Although not shown, the processor may be connected to a data storage memory (e.g., similar to or different from the data storage memory 163).

In the example system 251 of FIG. 13, the sensors 225, 226, 227 may include a first port connected to or connectable to an air supply 237, a second port, and a signal terminal. Further, the system 251 may include a plurality of coupling points represented by darkened circles depicted in FIG. 13. For example, the system 251 may include at least a first coupling point having a first port connected to the second port of the second sensor, a second port connectable to a fuel source (e.g., the fuel supply 245), and a third port; a second coupling point may include a first port connected to a second port of the third sensor, a second port connectable to a fuel source (e.g., the fuel supply 245), and a third port; a third coupling point having a first port connected to the second port of the first sensor, a second port connected to the third port of the second coupling point, and a third port; a fourth coupling point having a first port connected to the third port of the third coupling point, a second port connected to the third port of the first coupling point, and a third port connectable to a combustion chamber (e.g., via the outlet 218). However, other coupling point configurations and/or one or more additional or alternative coupling points may be utilized.

The system 251 may include one or more outlets including outlet 218 which may be connected to a reference point downstream of the inlet points where air and fuel has been mixed together, for instance, at a combustion chamber of a boiler or downstream of a mixing device. The system 251 may also include one or more filters (e.g., filters 220a, 220b, 220c, 220d, and/or one or more other filters) to filter particles out of the incoming air (e.g., filters 220a, 220b), out of incoming gas (e.g., filter 220c), and/or outgoing air-gas that might flow back due to a pressure surge during ignition (e.g., filter 220d). Further, the system 251 may include of one or more flow resistances (e.g., flow resistances 222a, 222b, 222c, 222d, 222e, 222f, 222g), which may typically be orifices or other resistances. The flow resistances may be the same, similar, and/or different from each other in size and resistance level.

In at least one example of the system 251, the system 251 may incorporate a first flow path or channel 241 from an air supply 237 having positive air reference pressure (P1) to a lower pressure (PO) at the outlet 218. The first flow path or channel 241 may incorporate the inlet filter 220b, the first sensor 225, one or more flow resistances (e.g., the flow resistance 222a or other flow resistances), and/or one or more other features. The first sensor 225 may produce a first electrical output signal 231 which may reflect a measure related to a flow of air through the first flow path or channel 241.

The system 251 may incorporate a second flow path or channel 242 from the air supply 237 having positive air reference pressure (P1) and from a fuel supply 245 having a positive fuel reference pressure (P2) to the lower pressure (PO) at the outlet 218. The second flow path or channel 242 may incorporate an inlet filter 220a, the second sensor 226, one or more flow resistances (e.g., the flow resistances 222c, 222f, 222g or other flow resistances), and/or one or more other features. The second sensor 226 may produce a second electrical signal 232 which reflects a measure related to a flow of fuel through the second flow path or channel 242. Further, in some cases, air may flow through the second flow path or channel 242 in a direction opposite of the arrow of the second flow path or channel 242 and toward a variable restriction valve 235 (e.g., a first variable restriction valve similar to or different than the check valve 35) that is depicted in FIG. 13. In such cases, the second sensor 226 may produce a second electrical signal 232 which may reflect a measure related to a flow of air through the second flow path or channel 242.

In some cases the variable restriction valve 235 may open and close to supply fuel to the second flow path or channel 242. The variable restriction valve 235, in one example, may have a first port connected to or for connection to the fuel supply 245, via filter 220c and item 216, a second port connected to or for connection to the second port of the first coupling point and a third port. In addition to or as an alternative, the second port of the variable restriction valve 235 may be connected to or may be for connection to the second port of the first coupling point and the second port of the second coupling point.

The system 251 may incorporate a third flow path or channel 243. The third flow path or channel 243 may have a first configuration (e.g., the solid line associated with 243 identifies the first configuration) and a second configuration (e.g., the dotted line and solid line associated with 243 identifies the second configuration). In some cases, a variable restriction valve 236 (e.g., a second variable restriction valve similar to or different than the check valve 35) may be configured to open and close to adjust the third flow path or channel 243 between the first configuration and the second configuration. The third flow path or channel 243 may incorporate the inlet filters 220a, 220c (selectively), the third sensor 227, one or more flow resistances (e.g., the flow resistances 222b, 222d, 222e or other flow resistances), and/or one or more other features.

The third sensor 227 may produce a third electrical signal 233 which may reflect a measure related to a flow through the third flow path or channel 243. When the third flow path or channel 243 is in the first configuration, the third sensor 227 may produce a reading that reflects a measure related to a flow of air through the third flow path or channel 243. The reading from the third sensor 227 when the third flow path or channel 243 is in the first configuration may be intended to be redundant with or indicative of a reading from the first sensor 225. When the third flow path or channel is in the second configuration, the third sensor 227 may produce a reading that reflects a measure related to a flow of fuel through the second flow path or channel 242. The reading from the third sensor 227 when the third flow path or channel 243 is in the second configuration may be intended to be redundant with or indicative of a reading from the second sensor. Further, in some cases, air may flow through the third flow path or channel 243 in a direction opposite of the arrow of the third flow path or channel 243 and toward the variable restriction valve 236 that is depicted in FIG. 13. In such cases, the third sensor 227 may produce a third electrical signal 233 which may reflect a measure related to a flow of air through the third flow path or channel 243.

The system 251 may include a processor 252. The processor 252 may be configured to receive signals 231, 232, 233 from the sensors 225, 226, 227 and/or send signals to the sensors 225, 226, 227. In some cases, the processor 252 may have a first terminal connected to a signal terminal of the first sensor 225, a second terminal connected to a signal terminal of the second sensor 226, and a third terminal connected to a signal terminal of the third sensor 227 to facilitate transmission of the signals 231, 232, 233 between the sensors 225, 226, 227 and the processor 252. The terminals of the processor and the signal terminals of the sensors 225, 226, 227 may be connected in a wired and/or wireless manner.

Further, the processor 252 may be configured to send signals 260, 262 (e.g., control signals) to the variable restriction valves 235, 236 and/or receive signals from the variable restriction valves 235, 236. In some cases, the processor 252 may be configured to regulate an air to fuel ratio based, at least in part, on readings from the first sensor 225 and/or the second sensor 226. In one example of regulating an air to fuel ratio, the processor 252 may receive signals from the first sensor 225 and the second sensor 226 and then based, at least in part, on the signals (e.g., including readings) from the first sensor 225 and the second sensor 226, the processor 252 may send the signal 260 to an actuator (e.g., where the actuator has a control terminal connected to a terminal of the processor 252) of the first variable restriction valve 235 and set the variable restriction device 235 at a desired position between a fully closed position and a fully opened position to vary a restriction of the first variable restriction device 235 to a flow of fuel therethrough, to adjust or set an amount of fuel entering into the system 251, and/or to maintain or achieve a desired fuel to air ration.

In some cases, the processor 252 may be configured to adjust a configuration of the third flow path or channel 243 between the first configuration and the second configuration. In one example, the processor 252 may send the signal 262 to an actuator (e.g., where the actuator has a control terminal connected to a terminal of the processor 252) of the second variable restriction valve 236 to cause the actuator to open or close the second variable restriction valve and vary a restriction of the second variable restriction device 236 to adjust a flow of fuel therethrough.

In some cases, the processor 252 may be configured to test one or both of the first sensor 225 and the second sensor 226, along with the associated flow path or channel 241, 242. To perform a test on the first sensor 225 and the first flow path or channel 241, the processor 252 may compare one or more readings from the first sensor 225 for a particular time period to one or more readings from the third sensor 227 during the particular time period and when the third flow path or channel 243 is in the first configuration. If the readings from the third sensor 227 differ from the readings of the first sensor 225 by more than a threshold value, the first sensor 225 and/or the first flow path or channel 241 may be considered to have failed the test and further investigation into the cause of the failure may be performed. Similarly, to perform a test on the second sensor 226 and the second flow path or channel 242, the processor 252 may compare one or more readings from the second sensor 226 for a particular time period to one or more readings from the third sensor 227 during the particular time period and when the third flow path or channel 243 is in the second configuration. If the readings from the third sensor 227 differ from the readings of the second sensor 226 by more than a threshold value, the second sensor 226 and/or the first flow path or channel 242 may be considered to have failed the test and further investigation into the cause of the failure may be performed. Example causes of failure may include, but are not limited to, a clogged flow path, sensor drift, etc. Further, if the processor 252 determines a test has been failed, an alert or an alarm may be initiated by the processor 252.

An approach may be to record flow sensor 25, 26,225, 226,227 readings 31, 32,231, 232, 233, respectively, and/or other flow sensor readings for different pressure levels during commissioning and store those combinations for later use. Depending on heat demand, the pressure may be regulated at some level and the present control system may read air flow and regulate matching a gas flow precisely. One may note that flow resistances in the main flows, for example as shown in FIG. 1 between node 1 (air input) and node 5 (air and gas mixing point) and between node 4 (gas input) and node 5, are not necessarily known. For this, the relationship between two sensor readings 31 and 32, corresponding with the required combustion result that is measured during commissioning with a CO2 meter or an O2 meter, or the like, may need to be recorded during commissioning.

One may note that only plain air flows through both sensors 25, 26, 225, 226, and 227. Variation in chemical content of the applied gaseous fluid will not necessarily affect pressure regulation based on sensor readings.

Accessibility, signal feedback and adjustability may be considered. Virtually all required input and output signals may be lead via a controller to an embedded or external display/processor that can display results and that can receive commands from the installer. The display/processor may be a laptop, smart-phone, burner controller or dedicated handhold tool. There is necessarily no need to access screws, or read signals close to the valve inside the burner cover. A connection cable may be mounted at an easy to reach position, but input, output signals may also be transferred via a wireless device during commissioning.

One may want to lock, secure and fixate settings. Virtually all input and output commands may be monitored. An ability to adjust settings may be password protected. Passwords may be coupled to installer accounts. Revision control may be applied for settings. A list may be made that shows who did what change at what time together with recorded combustion results. For non-authorized persons, the readings may be visible but any adjustment possibility can be blocked.

Manual adjustment may be avoided. Virtually all mechanical adjustment devices may be excluded from the present system. There is necessarily no throttle that needs adjustment, no mechanical amplifier that needs adjustment, and no pneumatic amplifier that needs adjustment (adjustable throttle).

The upstream pressure regulator, such as one in a gas channel, which receives its commands from a controller, may be stepper motor driven, like items 63 and 64 in FIG. 11, and the result of this stepper driven pressure regulator valve may be guarded by the pressure control system. The stepper driven pressure regulation valve may need no external adjustment.

However, some manual adjustment may be possible. The installer may enter or change a desired CO2 result, or an O2 or other emission combustion result as function of burner capacity. The installer may enter a desired start up setting. The CO2 curve or O2 curve may be non-linear if desired.

There may be semi-automatic commissioning. A commissioning procedure may be captured in software and need only some guarding from the installer while it is applied automatically. The procedure may incorporate steps: 1) Read the wished combustion result as a function of burner capacity; 2) Establish initial setting at low flow; 3) Read combustion result from temporary attached combustion sensor as CO2 meter or O2 meter; 4) Determine direction to adjust gas flow and pressure to get to the required combustion result; 5) Store readings of flow sensors for optimal setting; 6) Store reading of flow sensors for limit settings; 7) Repeat for higher burner capacities until a maximum burner capacity is reached; 8) Validate settings; 9) Detach temporary combustion sensor; and 10) Repeat combustion after commissioning according stored data.

Tolerances, rate of curvature of combustion result, outer limits, and so on, may be captured in software. Required actions, based on emission readings, may be captured in software. No special skills or patience are necessarily demanded from the installer.

There may be full automatic commissioning as noted herein. A commissioning procedure may be captured in software and need only some guarding from the combustion sensor which may be connected downstream of the combustion chamber measuring flue gases. Measured combustion emissions may be compared with target combustion emissions. The measured emission reading may differ from the target emission readings and an error may be established hence a second correction factor may be established. A fifth transfer function may be calculated out of the third transfer function, the first correction factor and the second correction factor to calculate a target reading for sensor (#2) as a function of sensor (#1) reading.

There is no necessary need for special orifices with tight tolerances, regardless of any tolerance the system is commissioned at and relation between sensor readings is captured. One significant thing for the system to perform well may be repeatability and resolution. Repeatability may be checked during a pre-purge system check and resolution may be chosen as appropriate.

Diagnostics may be considered. High gas pressure may be detected while the stepper motor driven pressure regulator has received the command to fully close while still a sensor reading being measured indicates that a gas pressure level is too high. Low gas pressure may be detected while the stepper motor driven pressure regulator has received a command to fully open while still a sensor reading being measured that indicates a gas pressure level is too low. Low air pressure does not necessarily have to be detected as the mixing ratio may be air-gas proportional. Air flow may be measured and regardless of the level of that flow, the appropriate amount of gas flow may be regulated. However, it may be possible to store the fan speed and or the air restriction valve position together with sensor readings and detect any mismatch as soon as it occurs. The same may account for any other mismatch in air flow due to voltage fluctuations, changing fan or air restriction valve characteristics, chimney characteristics, and so on. Any change due to blocked filters, blocked orifices, sensor drift may be detected during pre-purge check. Plugged air filters 20 and 30 may be detected by noting that sensor readings for sensor (#1) and sensor (#2) gradually reduce over time during pre-purge check. Change of chemical content of gaseous fluid does not necessarily affect a mixing ratio more than (related art) comparable systems in the field. Typically, the gas suppliers may keep a Wobbe index, meaning that specific heat capacity over density remains about the same. Mixing ratios may remain between certain limits, which can be tested and approved with so-called limit gases.

Air flow may be measured and with the sensor readings 31, 32, 231, 232, 233, and with help of feedback from CO2 levels or CO levels, the gas flow may be calculated accurately and monitored over time.

Validation measurements may be helpful. Measurements may be performed on a tube model with orifices inside and differential pressure sensors connected. Gas sided pressure may be treated as leading where gas pressure is manually adjusted, to achieve a predefined amplification ratio, respectively 2:1, 1:1, 5:1 and 10:1. The tube model may bleed flow to the environment, which can mean an absence of increased combustion chamber pressure. Calibration characteristics may be measured by disconnecting gas pressure channel upstream from the orifices and bleeding a flow to environment.

Settings may be chosen for validation measurements. Test setup orifices may be normal stamped production orifices for gas side upstream at 0.28 mm, gas side downstream at 0.66 mm, air side upstream at 0.28 mm, and air side downstream, in series with a sensor 1, at 0.66 mm. Sensor 1 may be at a channel to combustion chamber at a 500 Pa range, Sensirion™ SDP 620. Sensor 2 may be at a channel between air and gas at a 500 Pa range, Sensirion SDP 620. No orifice should be between the gas and air tubes.

Figure 14:
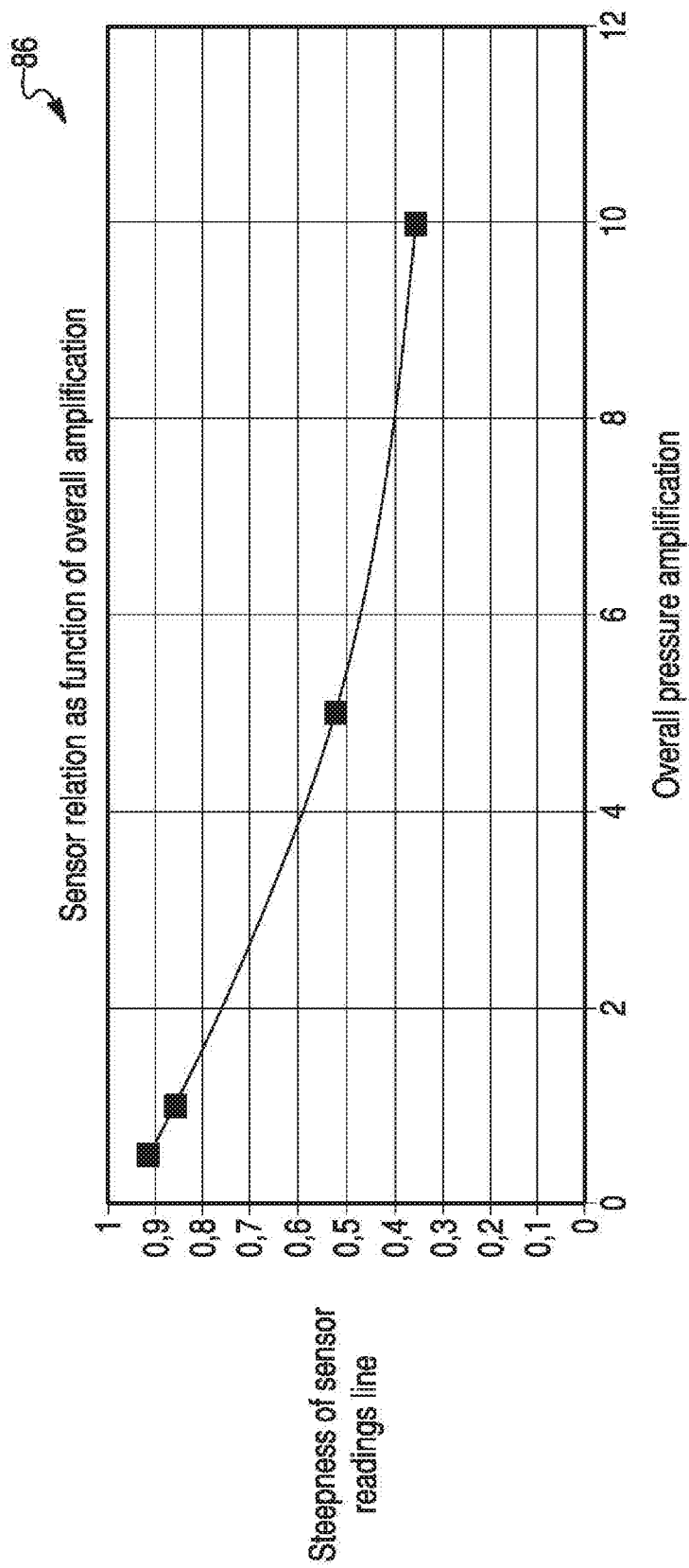
FIG. 14 is a diagram of a graph a sensor relation as a function of an overall amplification.

FIG. 14 is a diagram of a graph 86 a sensor relation as a function of an overall amplification. Graph 86 may plot steepness of a sensor reading line versus overall pressure amplification. When overall pressure amplification is approximately known, for instance, from an installation specification, it may be easy to find initial settings for the sensor readings with the curve as shown in the diagram of graph 86. As an example, an overall amplification may be expected to be about 4. Steepness of the specific curve that matches may be approximately 0.6, assuming for the moment that lines cross the origin virtually in an exact fashion.

For a given fan speed (and corresponding air pressure), an initial gas pressure setting may be regulated at a sensor reading 1, and a sensor reading 2 may equal 0.6 of sensor reading 1. After an initial start-up, the setting may be fine-tuned with feedback from a temporarily attached combustion result meter.

In conclusion, salient features of the present system and approach may be reviewed. The present system may measure air flow with a first servo mass flow sensor 25 or differential pressure sensor as a reference for the heat capacity to the burner chamber being accurate over the whole envisioned flow capacity range. The present control system may measure the ratio of the gas and air manifold pressures with a second flow sensor 26 or differential pressure sensor such that only an air flow passes the sensor and such that the system is capable to regulate gas pressure in the range from about 0.4 times the air pressure until about 9 times air pressure.

Just plain air should flow through the sensors, and any embedded fail safe protocol of the sensor may remain valid. Any significant error or drift in the sensor may be detected, measured and corrected for. Pollution or plugging of the gas filters may be detected, measured and compared to a defined threshold. During commissioning, the sensor readings may be stored in the system and secured for diagnostics later on. Transfer functions may be derived from the stored values to generate target values for regulation, correction, and safety decisions. Optionally, a combustion sensor may be applied to measure content of flue gases. The reading of the combustion sensor may be applied to fine-tune or to update specific transfer functions for regulation. During pre-purge and during run time operation, the readings of the sensors may be checked and compared to each other in relation to a stored value to detect any shift or mismatch. During pre-purge, virtually any pollution of the gas side filter or gas side orifice may be checked and measured by comparing two situations to a known situation. Also, since the sensors are coupled directly to the air and fuel, the system is no longer necessarily sensitive to certain failure modes (i.e., regulator drift or obstructed air supply). The system may also have desired flexibility. Virtually any fuel air curve may be programmed and stored in the controller, no matter how non-linear.

In a standard burner configuration where a fan is used to inject air into the burner under pressure, there may be a manifold for gas and a manifold for air coming into the burner. A first bypass channel may be connected to the air supply downstream of the air control valve or fan, but upstream of the burner baffle plate and then to the combustion chamber. In the bypass channel, there may be a first flow sensor and optionally one orifice. This may be referred to as a first measurement channel. A second bypass channel may be connected to the air supply downstream of the air control valve or fan, but upstream of the burner baffle plate and then to the combustion chamber. In the bypass channel, there may be two orifices. The two orifices in series may form a pneumatic circuit commonly referred to as an air pressure divider. A purpose may be to reduce air pressure to a lower level which is needed for the system to reach minimum amplification factor (gas pressure minus combustion chamber pressure over air pressure minus combustion chamber pressure, (Pgas−Pcc)/(Pair−Pcc)=minimal). First and second bypass channels may also be combined to one air bypass channel with two orifices and one sensor.

A third bypass channel may be connected to the gas supply downstream of the control valve, but upstream of the burner orifice and then to the combustion chamber. In the bypass channel there may be two orifices. The two orifices in series may form a pneumatic circuit commonly referred as a gas pressure divider. The purpose of this circuit may be to reduce the gas pressure in the bypass channel from the manifold pressure to some pressure that is suitable for the whole required pressure amplification range and between minimal and maximal flow capacity lower than reduced air pressure. Between the two orifices of the air pressure divider circuit and the two orifices of the gas pressure divider circuit there may be a connection. The connection may be referred to as the second measurement channel. In the measurement channel, there may be a mass flow or differential pressure sensor and optionally an orifice. This sensor may measure a magnitude of the flow through the measurement channel or the differential pressure, and provide feedback to the systems controller. The readings of the two sensors may be stored, during commissioning of the application, in a table for the required flow capacity range and for the required amplification range, which can be used by the microprocessor to give an accurate steering signal to the actuator that drives the pressure regulation valve to restore the actual reading at any later time to those readings that are initially stored in the table.

The readings of the two sensors during pre-purge, where the gas valve is closed, may be stored in a table. The stored readings and the ratio between the actual readings at any later time may be used as a reference to detect sensor drift over time.

Also, a sensor embedded safety protocol may be utilized as only plain air flow passes the sensor during operation. The system constituting the sensor, measurement channel, bypass channel, pressure divider, fuel control valve, and controller may be located in a single body, may be all individual items, or may make up any combination. Optionally, a combustion sensor may be added to the control system for increased ease of system setup and for improved control accuracy during operation. This sensor may have to be placed in the flue of the combustion chamber or other appropriate location to observe the byproducts of combustion. Another optional feature may be a temperature addition of temperature sensor(s) to measure the air and gas temperature. If this information is available to the system controller, then the temperature (density) effects on the system mass flows may be compensated out. The temperature compensation may or may not involve separate temperature sensors as many readily available pressure and flow sensors have built-in temperature compensation.

To set up the present system in the field, the burner may be adjusted between minimum and maximum fire and the combustion byproducts can be observed (either manually or by the control itself if it has its own combustion sensor). The excess air may be adjusted to the desired amount at each point on the fuel/air curve between min and max fire, and the output of the sensors in the measurement channels may be recorded and stored by the controller.

This process may be repeated until the entire fuel/air curve has been profiled and stored. Once the controller has this curve, it may position the air damper and the pressure regulation valve precisely based on the desired firing rate of the system and the feedback from the sensors in the measurement channels.

Further, in some cases precise control of the fuel/air ratio may be one of the most important aspects of improving overall burner performance and efficiency. Related art control systems appear to lack the accuracy, flexibility, and function/feature sets to take full advantage of modern day burner performance or to advance burner designs to the next level. Two of the most common control systems for controlling burners in the related art may be the parallel positioning system and the pneumatic gas-air system. Both have drawbacks.

The parallel positioning system may rely on precisely positioning two actuators (one on a fuel control valve, one on an air damper) along a known, predefined curve. A drawback to this system may be that the actual flow of gas and air is not necessarily being measured directly and that certain shifts (i.e., temperature change, upstream pressure regulator drift, obstructed air supply, and so forth) might go undetected and uncompensated. An advantage of the parallel positioning system appears to be that it is flexible. This system may be used to control any fuel/air ratio profile (e.g., non-linear) and do it precisely.

The pneumatic gas-air system may utilize pneumatic feedback signals from gas, air, and optionally from the combustion chamber to control the amount of fuel. Since this system may rely on the fluid parameters of the gas and air directly, it is not necessarily sensitive to certain components' shifting (e.g., upstream pressure regulator drift or obstructed air supply). A disadvantage may be that only two points of the system might be calibrated and the fuel/air (F/A) curve would be a linear approximation to what the burner really needs between the two points. Additionally, this type of system may be sensitive to, for example, pressure surges due to ignition and pressure instabilities around the pressure pick-up detection points for Pgas (gas pressure), Pair (air pressure), and Pee (combustion chamber pressure).

A present system may combine the strengths of the related-art systems and eliminate virtually all of their weaknesses. A control system may measure the ratio of the gas and air manifold parameters. The system may combine the measurement of gas and air in such a way that a single sensor can be used to measure both fluids. Optionally, a second sensor may be added for safety through redundancy or to expand the measurement range of the system. The sensor feedback signal may replace, or be used in conjunction with, the position feedback of a parallel positioning system. Since the sensor may be coupled directly to the air and fuel supply, the system is no longer necessarily sensitive to certain failure modes (e.g., regulator drift or obstructed air supply). The system may also have the desired flexibility. Any fuel air curve may be programmed and stored in the controller, despite non-linearity. In essence, this system may have virtually all of the flexibility of a parallel positioning system, and virtually all of the inherent safety of a pneumatic gas air system.

The present burner control arrangement may be a component of a heating system or a component of a heating, ventilation and air conditioning (HVAC) system.

Additional features may be added to the baseline system to make it even more useful to the end user. The gas and air flow may be trimmed by the controller to account for variability in the air and gas temperatures (i.e., densities). This may be achieved by measuring/estimating the temperature of the fluids and adjusting the flow restrictions of air and/or gas, accordingly. For example, by keeping the air flow constant and only changing the gas flow, the burner load may be kept constant. The system may be further trimmed based on the chemical composition of the flue gas. This may be achieved by measuring the byproducts (i.e., NOx, CO, HC, O2, and so forth) of combustion and adjusting the flow restrictions of air and/or gas accordingly. These two measures may be combined to eliminate nearly all of the tolerances from burner performance design, and should enable the end user of the system to run at optimum combustion across a turn-down ratio of the appliance.

In a standard burner configuration where a fan may be used to inject air into the burner under pressure, there may be a manifold for gas and a manifold for air coming into the burner. A bypass channel may be connected to the gas supply downstream of the control valve, but upstream of the burner orifice and then to the combustion chamber. In this bypass channel, there may be two orifices (at least one should be adjustable, but both can be adjustable for added flexibility of the system). These two orifices in series may form a pneumatic circuit commonly referred to as a pressure divider. The purpose of this circuit may be to reduce the gas pressure in the bypass channel from the manifold pressure to some pressure closer in value to the air pressure. Between the two orifices of the pressure divider circuit there may be a coupling between the gas bypass channel and the air supply channel. This may be referred to as a measurement channel. In the measurement channel, there may be mass flow, differential pressure or gauge pressure sensors. The sensors may measure the direction and magnitude of the flow through the measurement channel or of the differential pressure or gauge pressure, and provide feedback to the system's controller. The system constituting the sensor, measurement channel, bypass channel, pressure divider, fuel control valve, and controller may all be located in a single body, or may all be individual items, or may be made up of any combination. Optionally, a combustion sensor may be added to the control system for increased ease of system setup and for improved control accuracy during operation. A sensor may be placed in the flue of the combustion chamber or other appropriate location to observe byproducts of combustion.

Another feature may be an addition of temperature sensing to measure the air and gas temperatures. If this information is available to the system controller, then the temperature (density) affecting the system mass flow may be compensated out. The temperature compensation may or may not involve separate temperature sensors since many readily available pressure and flow sensors can have built-in temperature measurement used for compensating temperature drifts of the sensor and/or compensation of the system to account for temperature related changes in the working fluids.

To set up the present system in the field, the burner may be adjusted between minimum and maximum fire and the combustion byproducts may be observed (either manually or by the controller itself if it has its own combustion sensor). The air flow and gas flow may be adjusted to a desired amount at each point on the fuel/air curve between minimum and maximum fire, and the output of the sensor in the measurement channel may be recorded and stored by the controller. This process may be repeated until the entire fuel/air curve has been profiled and stored. Once the controller has this curve, it may adjust the air damper, fan or the fuel valve precisely based on a desired firing rate of the system and feedback from the sensor in the measurement channel.

One way that the system could work may be as follows: 1) A combustion sensor senses a byproduct concentration and sends a signal to the controller; 2) the controller recalculates the "predetermined magnitude of the parameter" based on the present and the desired byproduct concentrations; and the controller sends a signal to a control mechanism or mechanisms, adjusting fuel and/or air such that the parameter is driven to the new predetermined magnitude.

A system, where the temperature of both air and fuel is monitored, may work as follows: 1) A controller determines a difference between air and fuel temperatures; 2) The controller recalculates the "predetermined magnitude of the parameter" based on the temperature difference; and 3) The controller sends a signal to control mechanism(s), adjusting fuel and/or air such that the parameter is driven to the new predetermined magnitude.

Figure 15:
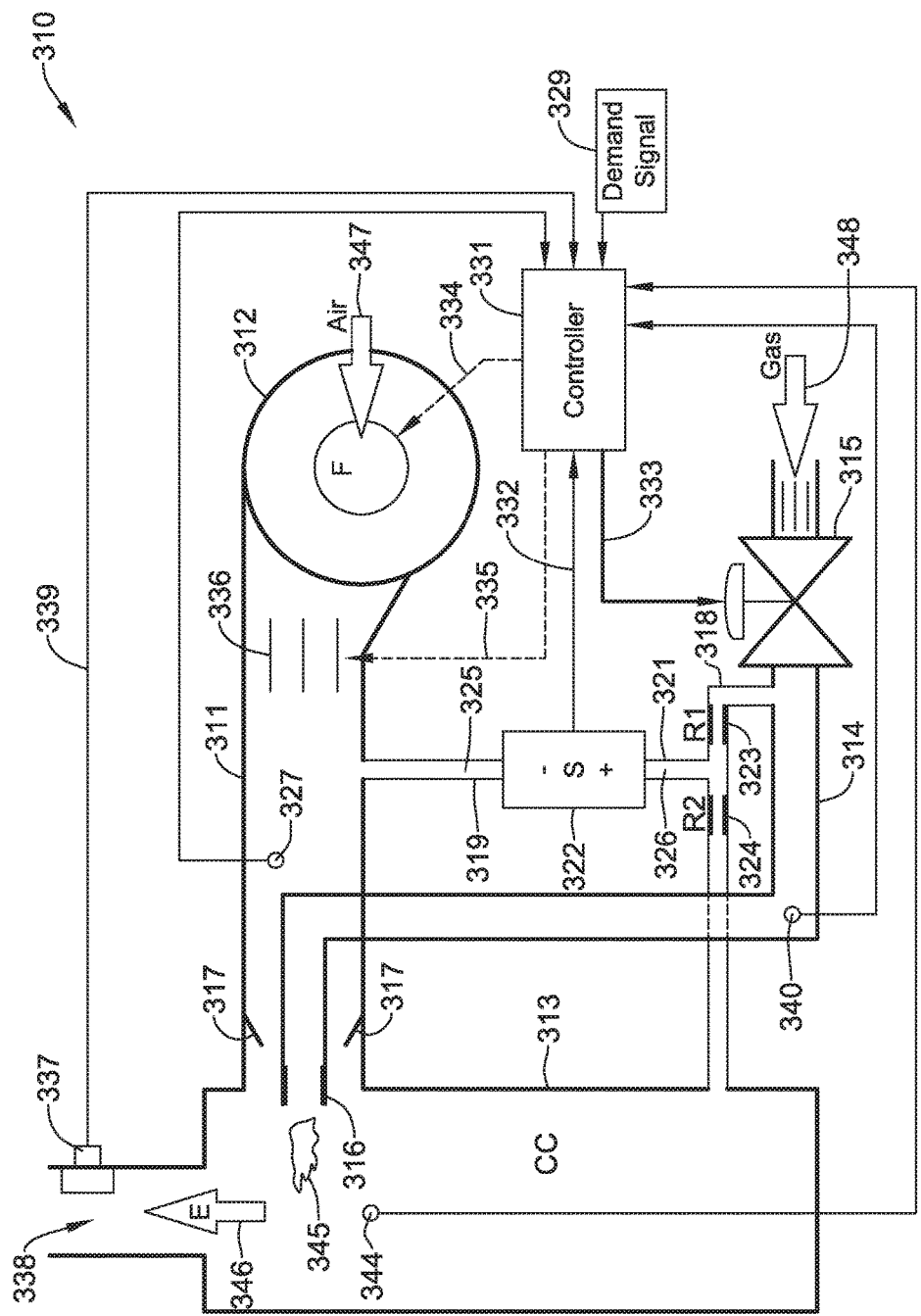
FIG. 15 is a diagram of a burner control system having a burner fuel and air mixture where a fuel parameter detected by the sensor is adjustable.

FIG. 15 is a diagram of a burner control system 310 having a burner fuel and air mixture where the fuel pressure within or flow through the bypass channel 318 is adjustable. System 310 may have an air supply channel 311 for pumping air 347 with a fan 312 at one end of channel 311 into a chamber 313, such as a combustion chamber. At the other end of channel 311, there may be a baffle plate 317. Fuel 348, such as gas, may be injected downstream of baffle plate 328 into the airflow. Baffle plate 317 may be essential to make sure that the gas pressure is related to, for instance, the combustion chamber 313 pressure. This may assure that the gas flow goes down in case of a reduced air flow as a result of a flow blockage, e.g., in the flue.

Chamber 313 may be a volume where the one or more bypass channels terminate. Basically, the bypass channel or channels should terminate at a volume that has the same pressure as the termination points of the gas and air channels. Combustion chamber may be regarded herein as an illustrative example of chamber 313. A fuel channel 314 may be connected to a valve 315 at one end and connected at another end to an orifice 316. A measurement channel 319 may connect one end of a sensor 322 to air channel 311. A bypass channel 318 may have one end connected to fuel channel 314 and another end connected to combustion chamber 313. A measurement channel 321 may connect another end of sensor 322 to bypass channel 318. A resistive orifice 323 may be situated in bypass channel 318 between fuel channel 314 and measurement channel 321. Another resistive orifice 324 may be situated in bypass channel 318 between measurement channel 321 and combustion chamber 313. Orifices 323 and 324 may constitute a pressure divider circuit. Orifice 323 may be varied when tuning burner system 310. Orifice 324 may be fixed but could also or instead be variable. An orifice may be variable, for example, in size, shape and/or other property.

Sensor 322 may be one or more flow sensors, one or more pressure sensors, one or more differential pressure sensors, and/or a manifold of similar or different sensors. The present examples in FIGS. 15-17 may utilize a differential pressure sensor for illustrative purposes, though the differential sensor may be substituted with other kinds of sensors such as a flow sensor or gauge pressure sensors. For instance, if sensor 322 is a flow sensor, then a flow may go from a channel that would have had been indicated by the differential pressure sensor as the channel to have a higher pressure, to the other channel indicated to have the lower pressure as indicated by the differential pressure sensor if it were situated in lieu of the flow sensor.

When tuning the burner system 310 for operation with nominal settings of air flow in channel 311 and fuel 348 in channel 314, orifice 323, may be adjusted in size to, for example, equalize the pressures or adjust them to predefined magnitudes in measurement channels 319 and 321, which may be designated as pressures 325 and 326, respectively. As a result, for equalization between ports 319 and 321 as a matter of course, there should be no flow through a flow sensor 322 or there should be a zero pressure difference indicated by a differential pressure sensor 322. The differential pressure, flow rate, gauge pressures, or other parameter value does not necessarily need to be zero or reflect similar magnitudes of parameters relating to the air and fuel channels. There may be a deviation or offset from zero as a setpoint referred to for control of the air pressure, gas pressure, flow, or other parameter. A sensor or sensors indicating a parameter comparison relative to the air and fuel channels may allow for a lambda adjustment as a function of the burner load and/or air flow. In lieu of zero, there may be a predefined differential pressure, gauge pressures, flow, or other parameter relative to the burner load, fuel consumption, air usage, fuel air mixture, and/or the like.

After burner system 310 is in place after being tuned and operating, for instance, pressures 325 and 326 may become different resulting in an indication by sensor 322 that the pressures are different either by a flow or differential pressure indication. A signal 332 of the indication of pressures 325 and 326 or other parameters may go to a controller 331. In response to the difference in pressures 325 and 326, controller 331 may send a signal 333 to valve 315. Valve 315 may be motorized in that it may open or close incrementally according to signal 333. For example, if pressure 325 is greater than pressure 326, then via signals 332 and 333 to and from controller 331, respectively, valve 315 may open to increase the fuel pressure in channels 314 and 318, and thus pressure 326 until it is about equal to pressure 325 if that is the goal, or some predefined differential pressure. If pressure 325 is less than pressure 326, then via signals 332 and 333 to and from controller 331, respectively, valve 315 may close to decrease the fuel pressure in channels 314 and 318, and thus, for example, pressure 326 until it is about equal to pressure 325 if that is the goal, or some predefined differential pressure.

Controller 331 may be connected to fan 312 which may be varied in speed according to a signal 334 from controller 331 and thus vary flow of air 347 through channel 311. Changing speed of fan 312 may increase or decrease pressure 325 to make it equal to pressure 326, or result in a predetermined differential pressure between pressures 325 and 326, or some other parameter such as a flow rate, indicated by sensor 322 via signals 332 and 334 to and from controller 331, respectively.

Controller 331 may be connected to a motorized damper/louver 336 which may vary closure or opening of channel 311 to affect an amount of air flow through channel 311 according to a signal 335 from controller and thus vary the flow of air 347 through channel 311. Opening or closing damper/louver 336 may increase or decrease pressure 325 to make it equal to pressure 326, or to result in a predetermined differential pressure between pressures 325 and 326, as indicated by sensor 322 via signals 332 and 335 to and from controller 331, respectively.

Pressures 325 and 326 may also be equalized or differentiated to a predetermined value, with a combination of two or more kinds of control which incorporate control of valve 315, control of fan 312 and/or control of damper 336, via signals 333, 334 and 335, respectively, from controller 331 according to signal 332 from sensor 322. In a basic form, the present system pressures 325 and 326, or a flow rate between channels 319 and 321, may be adjusted to some value through control over the fuel 348, such as, for instance, gas.

Figure 16:
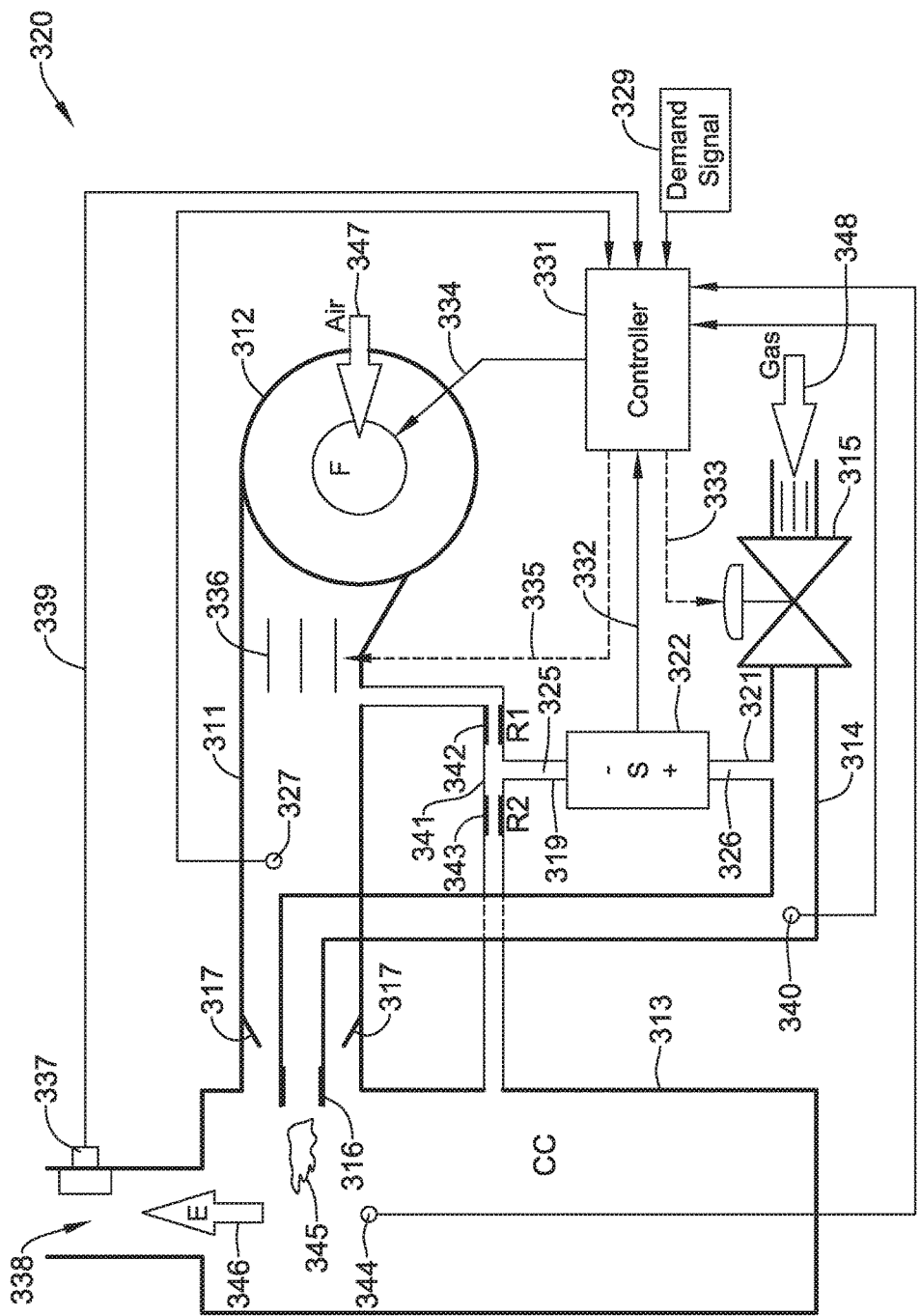
FIG. 16 is a diagram of a burner control system having a burner fuel and air mixture where an air parameter detected by the sensor is adjustable.
Figure 17:
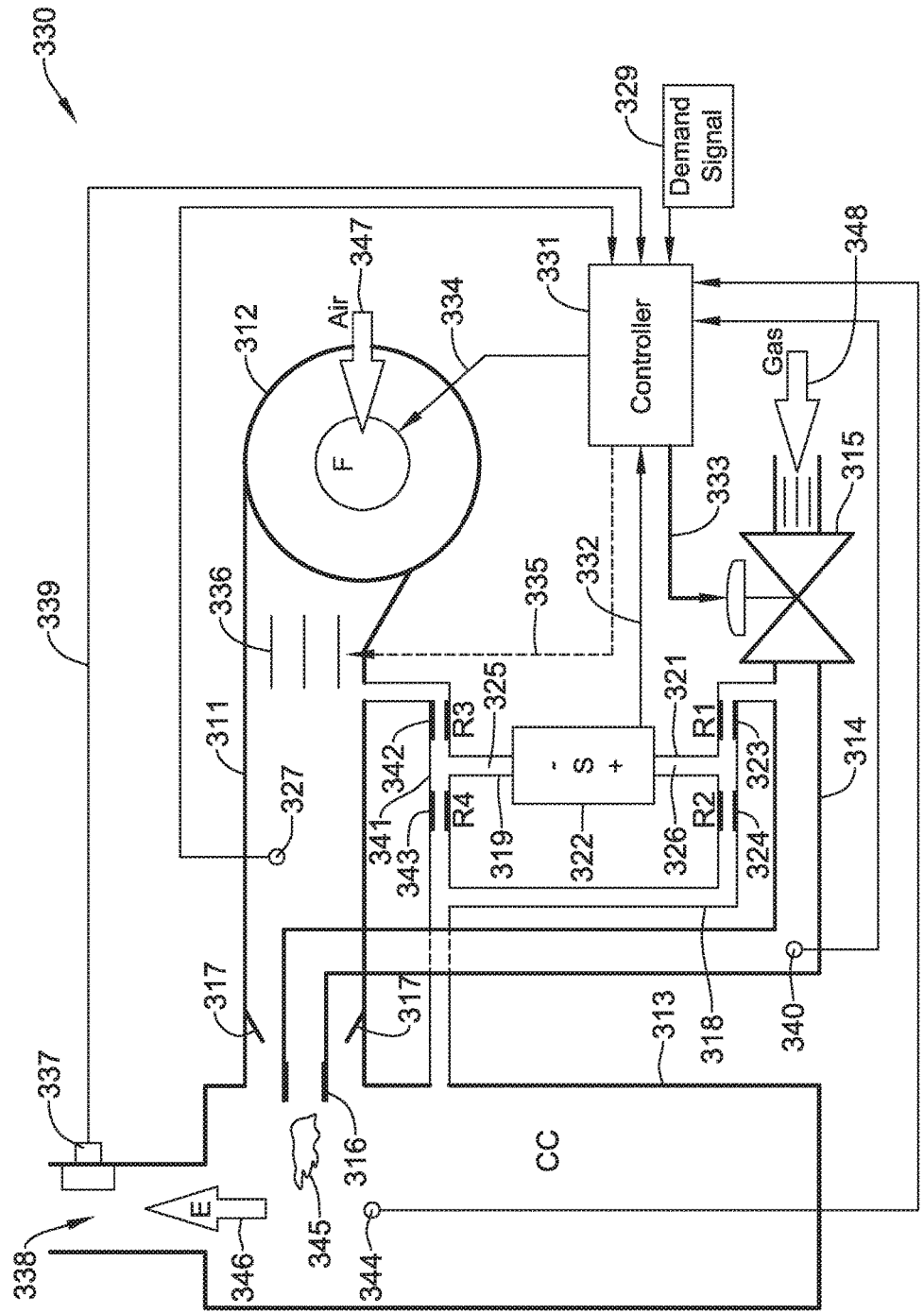
FIG. 17 is a diagram of a burner control system having a burner fuel and air mixture where both the air and fuel parameters detected across the sensor are adjustable.

Air temperature may be detected by a sensor 327 in air channel 311 and provided as a signal to controller 331 of systems 310,320 and 330 of FIGS. 15, 16 and 17, respectively. Fuel temperature may be detected by sensor 340 in fuel channel 314 and provided as a signal to controller 331 of systems 310, 320 and 330. Instead, temperature sensing of the air 347 and/or fuel 348 may be a built-in part of primary control of the air and/or fuel, respectively. Controller 331 may compensate for densities of air 347 and fuel 348 in a fuel air ratio control. Sensors 327 and 340 may be a combination of temperature and pressure sensors.

A demand signal 329 may also go to controller 331 in systems 310, 320 and 330. Signal 329 may be regarded as a load control signal. A predefined pressure drop or offset, or flow rate across sensor 322 may be nearly instantaneously set by controller 331 through adjusting fuel valve 315 via line 333 and/or manipulating the air supply with a mechanism such as, for example, fan 312 or damper/louver 336 via lines 334 and 335, respectively, from controller 331. The pressure offset or flow across sensor 322 may be induced as a function of a demand signal 329. Demand signal 329 may effectively tell system 310, 320 or 330, what a firing rate should be, taking into account that a desired fuel air ratio may be different at different firing rates.

Any of systems 310, 320 and 330, may be used with virtually any control scheme such as controlling fuel 348 or air 347 only, controlling both fuel 348 and air 347, controlling both fuel and air with a combustion byproduct sensor to offset the system, controlling both the fuel and air with the combustion byproduct sensor 337, and so on. A combustion sensor 337 may be mounted at an exhaust port 338 of combustion chamber 313 to provide a signal 339, indicating information about byproducts in exhaust gases 346 emanating from a flame 345 at orifice 316 in combustion chamber 313 for systems 310, 320 and 330. Byproducts of combustion in the burner exhaust, temperatures of the gas and air, and/or flame quality may be monitored and adjusted with control of the fuel and air ratio for optimum combustion in the burner. A quality of flame 345 may be inferred from information about byproducts and/or other information such as parameters relative to pressure, temperature, flow and so forth. A specific flame quality sensor (not shown) may be incorporated. Signal 339 may go to controller 331, which can adjust pressures 325 and/or 326 or flow rate to change an amount of certain byproducts in exhaust gases 346. Sensor 337 may also or instead be a temperature sensor of exhaust gases 346. There may also be a sensor 344 situated in chamber 313 and connected to controller 331. Sensor 344 may be a pressure sensor, or a temperature sensor, or both a pressure and temperature sensor. A basic form of the system may incorporate a pressure divider on the fuel (restrictors 323 and 324) or air side (restrictors 342 and 343), sensor 322, valve 315 and controller 331 that takes signal 332 from sensor 322 and drives valve 315 with signal 333. The system does not necessarily control air 347 but rather the system may simply follow an air signal that the system is given. A flame sensor monitor may be added to the present system. The sensor may be a flame rod, optical sensor, and so on, that can monitor the combustion process and be used to offset the fuel air ratio.

FIG. 16 is a diagram of a burner control system 320 having a burner fuel and air mixture where the air pressure across the sensor is adjustable. System 320 may have some components similar to those of system 310 shown in FIG. 15. In system 320, port 321 of sensor 322 may be connected directly to fuel channel 314, since bypass channel 318 of system 310 is absent. Port 319 of sensor 322 may be connected to a bypass channel 341 that has a one end coupled to air channel 311 and another end coupled to combustion chamber 313. A restrictive orifice 342 may be situated in bypass channel 341 between the end of the bypass channel 341 coupled to air channel 311 and port 319 of sensor 322. A second resistive orifice 343 may be situated in bypass channel 341 between the coupling port 319 of sensor 322 and the end of bypass channel 341 that is coupled to combustion chamber 313. One or both orifices 342 and 343 may be variable, for instance, in size, shape and/or other property. Pressures 325 and 326 at ports 319 and 321, respectively, may be equalized initially by adjusting a passage size of one or both orifices 342 and 343, and then possibly be set to a predefined differential value of pressures 325 and 326 indicated by a pressure sensor 322, or a flow rate between ports 319 and 321 of a flow sensor 322. A variable passage may equal a bypass channel plus one or more restrictors. In operation further on in time, pressures 325 and 326 may be equalized or set to the predefined value by control of air flow in channel 311 by control of fan or air mover 312 with a signal 334 from controller 331 as guided by signal 332 indicating the differential pressure of pressures 325 and 326 or flow rate across sensor 322. Air flow in channel 311 may also be affected by damper or louver 336 with a signal 335 from controller 331 as guided by signal 332 from sensor 322. The differential of pressures 325 and 326, or flow rate between ports 319 and 321 of sensor 322, may also be affected by fuel flow in channel 314 as controlled by valve 315 with a signal 333 from controller 331 as guided by signal 332 from sensor 322. Control of the differential pressure or the flow rate may be effected by valve 315 control, air mover 312 control or damper/louver 336 control, or any combination of these controls. A basic system may utilize just the valve 315 control. Sensor 322 may detect or measure values or magnitudes of other parameters relative to channels 311 and 314.

FIG. 17 is a diagram of a burner system 330 having a burner fuel and air mixture where the air and fuel pressures or flow rate across sensor 322 may be adjustable. System 330 may have some components similar to those of systems 310 and 320 shown in FIGS. 15 and 16, respectively. Bypass channel 341 with restrictive orifices 342 and 343 may be coupled at one end to air channel 311 and coupled at the other end to combustion chamber 313. Port 319 of sensor 322 may be coupled to bypass channel 341 between orifices 342 and 343. Port 321 of sensor 322 may be coupled to bypass channel 318 between orifices 323 and 324. Bypass channel 318 with orifices 323 and 324 may be coupled at one end to fuel channel 314 and coupled at the other end to bypass channel 341 between orifice 343 and the end of channel 341 connected to combustion chamber 313. Instead of to channel 341, bypass channel 318 may have the other end coupled directly to chamber 313. At least one or more of orifices 323, 324, 342 and 343 may have an adjustable passage size, shape or other property. By adjusting the orifices in the bypass channels the gas flow may be adjusted in order to meet a desired lambda (excess air) setting of the application, and thus adjust the amplification factor between the air and gas pressures in the air channel 311 and fuel channel 314, or flow rate between channels 311 and 314 across sensor 322, respectively.

In operation further on in time, pressures 325 and 326 may be equalized or made to meet a desired differential pressure by control of air flow in channel 311 by control of fan or air mover 312 with a signal 334 from controller 331 as guided by signal 332 indicating the differential pressure of pressures 325 and 326 across sensor 322. Instead of the differential value of pressures 325 and 326, another parameter such as flow rate, may be measured across sensor 322. Air flow in channel 311 may also be affected by damper or louver 336 with a signal 335 from controller 331 as guided by signal 332 from sensor 322. The differential of pressures 325 and 326 or flow rate as indicated by sensor 322 may also be affected by fuel flow in channel 314 as controlled by valve 315 with a signal 333 from controller 331 as guided by signal 332 from sensor 322. Control of the differential pressure or flow rate may be effected by valve 315 control, air mover 312 control or damper/louver 336 control, or any combination of these controls. A measurement of gauge pressures at both ends of or across sensor 322, or flow rate may be measured through sensor 322 that is to provide a signal 332 to controller 331 and in turn the controller to provide the respective control signals for regulating air and fuel flow through the respective channels 311 and 314.

To recap, A burner control system may incorporate a first sensor having a first port connectable to an air supply, a second port, and a signal terminal; a second sensor having a first port connectable to the air supply, a second port, and a signal terminal; a third sensor having a first port connectable to the air supply, a second port, and a signal terminal; a first coupling point having a first port connected to the second port of the third sensor, a second port connectable to a fuel source, and a third port; a second coupling point having a first port connected to the second port of the second sensor, a second port connectable to a fuel source, and a third port; a third coupling point having a first port connected to the second port of the first sensor, a second port connected to the third port of the second coupling point, and a third port; a fourth coupling point having a first port connected to the third port of the third coupling point, a second port connected to the third port of the first coupling point, and a third port connectable to a combustion chamber.

The burner control system may further incorporate a processor having a first terminal connected to the signal terminal of the first sensor, a second terminal connected to the signal terminal of the second sensor, a third terminal connected to the signal terminal of the third sensor, and having a fourth terminal connectable to a control terminal for the fuel source.

In some cases, the fuel source of the burner control system may incorporate a first variable restriction device having a first port for connection to a fuel supply, a second port for connection to the second port of the first coupling point, and a third port.

The burner control system may further incorporate an actuator connected to the first variable restriction device, and having the control terminal connected to the third terminal of the processor. In some cases, a signal to the control terminal of the actuator can vary a restriction of the first variable restriction device to a flow of fuel through the first variable restriction device.

The burner control system may further incorporate a second variable restriction device having a first port for connection to the third port of the first variable restriction device and a second port for connection to the second port of the second coupling point. In some cases, adjustment of the second variable restriction device between an opened position and a closed position, may adjust an outputted reading of the second sensor.

In some cases, the second sensor may outputs a reading that is intended to be redundant with readings from the first sensor when the second variable restriction device is closed and the second sensor outputs a reading that is intended to be redundant with readings from the third sensor when the second variable restriction device is opened.

The burner control system may further incorporate an actuator connected to the second variable restriction device, and having the control terminal connected to the third terminal of the processor. In some cases, a signal to the control terminal of the actuator can vary a restriction of the second variable restriction device to a flow of fuel through the second variable restriction device.

In some cases, the processor may be configured to regulate an air to fuel ratio based on readings from the first sensor and the third sensor.

Further, in some cases, the processor may be configured to test one of the first sensor and the third sensor based on comparing readings from the second sensor to readings from the one of the first sensor and the second sensor.

In another example, a burner control system may incorporate a first flow path having an input from an air supply; a second flow path having an input from the air supply and a fuel supply; a third flow path having a first arrangement with an input only from the air supply and a second arrangement with an input from the air supply and the fuel supply; a sensor in communication with the third flow path; and a processor in communication with the sensor. The processor may be configured to selectively configure the third flow path in the first arrangement such that the sensor senses a measure indicative of a measure in the first flow path and selectively configure the third flow path in the second arrangement such that the sensor senses a measure indicative of a measure in the second flow path.

The burner control system may further incorporate a sensor in communication with the first flow path; and a sensor in communication with the second flow path.

In some cases, the processor may be configured to receive a measure sensed by the sensor in communication with the first flow path; receive a measure sensed by the sensor in communication with the third flow path when the third flow path is in the first arrangement; and compare the measure sensed by the sensor in communication with the first flow path to the measure sensed by the sensor in communication with the third flow path; provide an alert if the measure sensed by the sensor in communication with the first flow path differs from the measure sensed by the sensor in communication with the third flow path by an amount greater than a threshold amount.

In some cases, the processor may be configured to receive a measure sensed by the sensor in communication with the second flow path; receive a measure sensed by the sensor in communication with the third flow path when the third flow path is in the second arrangement; compare the measure sensed by the sensor in communication with the second flow path to the measure sensed by the sensor in communication with the third flow path; and provide an alert if the measure sensed by the sensor in communication with the second flow path differs from the measure sensed by the sensor in communication with the third flow path by an amount greater than a threshold amount.

The burner control system may further incorporate a first variable restriction device in communication with the third flow path and the processor. The processor of the burner control system may be configured to send a signal to the first variable restriction device to selectively configure the third flow path in one of the first arrangement and the second arrangement.

The burner control system may further incorporate a second variable restriction device in communication with the fuel supply and the processor. The processor of the burner control system may be configured to send a signal to the second variable restriction device to selectively provide a fuel flow input to the second flow path and the third flow path.

In one approach, a burner control system may be tested. The approach may incorporate receiving a measure sensed by a first sensor in communication with a first flow path having an air supply input; receiving a measure sensed by a second sensor in communication with a second flow path having an air supply and a fuel supply; adjusting a third flow path to one of a first configuration in which the third flow path has an input from only the air supply and a second configuration in which the third flow path has an input from the air supply and the fuel supply; receiving a measure sensed by a third sensor in communication with the third flow path; and comparing the measure sensed the third sensor to one or both of the measure sensed by the first sensor and the measure sensed by the second sensor.

In some cases, the approach may incorporate that if the third flow path is in the first configuration, the comparing step includes comparing the measure sensed by the third sensor to the measure sensed by the first sensor; and if the third flow path is in the second configuration, the comparing step includes comparing the measure sensed by the third sensor to the measure sensed by the second sensor.

Further, the approach may incorporate triggering an alert if the measure sensed by the third sensor differs by more than a threshold amount from one or more of the measure sensed by the first sensor and the measure sensed by the second sensor.

In some cases, the approach may incorporate adjusting the third flow path to one of the first configuration and the second configuration includes sending a signal from a processor to a variable restriction device in communication with the third flow path.

Further, a burner control system for heating, ventilating and air conditioning (HVAC) may incorporate an air channel having an output coupled to a chamber, a fuel channel having an output coupled to the chamber, an air mover coupled to the air channel, a fuel valve coupled to an input of the fuel channel, a first bypass channel having a first end coupled to the air channel and having a second end coupled to the chamber, a second bypass channel having a first end coupled to the fuel channel and a second end coupled to the first bypass channel or the chamber, a sensor having a first port connected to the first bypass channel and having a second port connected to the second bypass channel, and a controller connected to the sensor. The sensor may detect a parameter between the first port of the sensor and the second port of the sensor. The sensor may provide a signal, indicating a magnitude of the parameter, to the controller. The controller may send a signal to a control mechanism to adjust an amount of fuel to the fuel channel and/or to adjust a quantity of air to the air channel, so as to cause the parameter to approach a predetermined magnitude for achieving a certain fuel air ratio of a fuel air mixture to the chamber. The parameter may be selected from a group consisting of a flow rate, differential pressure and gauge pressures.

There may also be a sensor, situated in the chamber and connected to the controller, for detecting a quality of a flame resulting from the fuel air mixture in the chamber. The quality of the flame may be used to achieve or adjust a ratio of the fuel air mixture.

The system may further incorporate a first restrictor orifice situated in the second bypass channel between the first end of the second bypass channel and the second port of the sensor, and a second restrictor orifice situated in the second bypass channel between the second port of the sensor and the second end of the second bypass channel.

The system may also further incorporate a third restrictor orifice situated in the first bypass channel between the first end of the first bypass channel and the first port of the sensor, and a fourth restrictor orifice situated in the first bypass channel between the first port of the sensor and second end of the second bypass channel coupled to the first bypass channel or the chamber.

One or more restrictor orifices may have a variable orifice size. The variable orifice size may be varied to make the parameter approach the predetermined magnitude.

The control mechanism may be the fuel valve that adjusts the amount of fuel to the fuel channel so as to cause the parameter to approach the predetermined magnitude. The control mechanism may be an air mover that adjusts the quantity of air to the air channel so as to cause the parameter to approach the predetermined magnitude.

The system may further incorporate a variable damper/louver situated in the air channel. The control mechanism may be the variable damper/louver that adjusts the quantity of air to the air channel so as to cause the parameter to approach the predetermined magnitude.

The sensor may be an item consisting of one or more sensors and is selected from a group consisting of one or more pressure sensors, differential pressure sensors, and flow sensors.

The system may further incorporate a combustion sensor situated at an exhaust port of the chamber. The combustion sensor may provide a signal, indicative of a concentration of one or more combustion byproducts, to the controller. The controller may calculate a predetermined magnitude of the parameter based on the concentration and desired concentration of the one or more combustion byproducts. The controller may send a signal to the control mechanism to adjust the amount of fuel to the fuel channel and/or to adjust the quantity of air to the air channel so as to drive the parameter to a new predetermined magnitude.

The system may further incorporate a temperature sensor situated in a fuel channel and/or air channel. The temperature sensor may provide a signal, indicative of a temperature of fuel and/or air, to the controller. The controller may calculate a predetermined magnitude of the parameter based on the temperature of the fuel and/or air. The controller may send a signal to the control mechanism to adjust the amount of fuel to the fuel channel and/or to adjust the quantity of air to the air channel so as to drive the parameter to a new predetermined magnitude.

Another burner control system may incorporate a chamber, an air channel having an output coupled to the chamber, a fuel channel having an output coupled to the chamber, an air mover coupled to the air channel, a fuel valve coupled to an input of the fuel channel, a bypass channel having a first end coupled to the fuel channel and having a second end coupled to the chamber, a sensor having a first port coupled to the air channel and having a second port coupled to the bypass channel, and a controller connected to the sensor and to the valve or the air mover.

A difference between a first parameter at the first port of the sensor and a second parameter at the second port of the sensor may be detected by the sensor.

The system may further incorporate one or more restrictors situated in the bypass channel. At least one restrictor of the one or more restrictors may have a variable flow restriction. A variable passage may incorporate a bypass channel and one or more restrictions. The variable passage may be tuned so that a difference of magnitudes of the first parameter and the second parameter approaches a magnitude to obtain a predetermined fuel air mixture during operation of the burner system.

If the difference of magnitudes of the first and second parameters is greater or less than a predetermined magnitude by a given delta of magnitude, a signal from the sensor to the controller may indicate the difference of the first and second parameters, and the controller may provide a signal to the valve to close or open the valve to decrease or increase fuel flow in the fuel channel or to the air mover to decrease or increase air flow and change the difference between the first and second parameters to approach the predetermined magnitude.

A predetermined magnitude of the difference between the first and second parameters may be needed to obtain a correct fuel air mixture. if the first parameter needs to be greater than the second parameter to approach the predetermined magnitude of the difference between the first and second parameters, then the controller may provide a signal to adjust the valve to change an amount of fuel entering the fuel channel or to adjust the air mover to change an amount of air entering the air channel which decreases the second parameter or increases the first parameter. If the second parameter needs to be greater than the first parameter to approach the predetermined magnitude of the difference between the first and second parameters, then the controller may provide a signal to the valve to change an amount of fuel entering the fuel channel or to adjust the air mover to change an amount of air entering the air channel which increases the second parameter or decreases the first parameter.

The following may be stated as an alternative to the previous paragraph. If the difference between the first and the second parameter needs to be increased to approach the predetermined magnitude of the difference between the first and second parameters, then the controller may provide a signal to adjust the valve to decrease an amount of fuel entering the fuel channel and/or to adjust the air mover to increase an amount of air entering the air channel which decreases the second parameter and/or increases the first parameter, respectively. If the difference between the first and the second parameter needs to be decreased to approach the predetermined magnitude of the difference between the first and second parameters, then the controller may provide a signal to adjust the valve to increase an amount of fuel entering the fuel channel and/or to adjust the air mover to decrease an amount of air entering the air channel which increases the second parameter and/or decreases the first parameter, respectively.

Still another burner system may incorporate an air channel having an output coupled to a combustion chamber, a fuel channel having an output coupled to the chamber, an air flow control mechanism coupled to the air channel, a fuel valve coupled to an input of the fuel channel, a bypass channel having a first end coupled to the air channel and having a second end coupled to the chamber, and a sensor having a first port coupled to the bypass channel and a second port coupled to the fuel channel.

The system may further incorporate a controller having an input connected to an output of the sensor. A difference between a first parameter at the first port of the sensor and a second parameter at the second port of the sensor may be detected by the sensor and indicated by the sensor on a signal to the controller. The system may still further incorporate one or more restrictors situated in the bypass channel. At least one restrictor of the one or more restrictors may have a variable flow restriction.

A predetermined magnitude of the difference between the first and second parameters may be needed to obtain a correct fuel air mixture. If the second parameter needs to be more than the first parameter to approach the predetermined magnitude of the difference between the first and second parameters, then the controller may provide a signal to the air flow control mechanism to adjust an amount of air going through the air channel or to the valve to adjust an amount of fuel going through the fuel channel which decreases the first parameter or increases the second parameter. If the first parameter needs to be greater than the second parameter to approach the predetermined magnitude of the difference between the first and second parameters, then the controller may provide a signal to the air flow control mechanism to adjust the amount of air going through the air channel or to the valve to adjust the amount of fuel going through the fuel channel which increases the first parameter or decreases the second parameter.

The system may further incorporate a second sensor connected to the controller and situated in the chamber. The second sensor may detect a quality of a flame in the chamber. The quality of the flame may be conveyed via a signal to the controller for calculating a fuel air mixture for optimizing the quality of the flame in the chamber. The fuel air mixture may be attained by signals from the controller to the air flow control mechanism and/or to the fuel valve. Optimizing the quality of the flame may incorporate reducing or increasing the byproducts in an exhaust of the chamber, increasing or decreasing an amount of heat per unit of fuel used, and/or achieving other beneficial results relative to energy, environment, efficiency, and/or the like.

In the present specification, some of the matter may be of a hypothetical or prophetic nature although stated in another manner or tense.

Although the present system and/or approach has been described with respect to at least one illustrative example, many variations and modifications will become apparent to those skilled in the art upon reading the specification. It is therefore the intention that the appended claims be interpreted as broadly as possible in view of the related art to include all such variations and modifications.

What is claimed is:

1. A burner control system comprising:
a first sensor having a first port connectable to an air supply, a second port, and a signal terminal;
a second sensor having a first port connectable to the air supply, a second port, and a signal terminal;
a third sensor having a first port connectable to the air supply, a second port, and a signal terminal;
a first coupling point having a first port connected to the second port of the third sensor, a second port connectable to a fuel source, and a third port;
a second coupling point having a first port connected to the second port of the second sensor, a second port connectable to a fuel source, and a third port;
a third coupling point having a first port connected to the second port of the first sensor, a second port connected to the third port of the second coupling point, and a third port; and
a fourth coupling point having a first port connected to the third port of the third coupling point, a second port connected to the third port of the first coupling point, and a third port connectable to a combustion chamber.

2. The system of claim 1, further comprising a processor having a first terminal connected to the signal terminal of the first sensor, a second terminal connected to the signal terminal of the second sensor, a third terminal connected to the signal terminal of the third sensor, and having a fourth terminal connectable to a control terminal for the fuel source.

3. The system of claim 2, wherein the control terminal for the fuel source comprises a first variable restriction device having a first port for connection to a fuel supply, a second port for connection to the second port of the first coupling point, and a third port.

4. The system of claim 3, further comprising:
an actuator connected to the first variable restriction device, and having the control terminal connected to the third terminal of the processor; and
wherein a signal to the control terminal of the actuator can vary a restriction of the first variable restriction device to a flow of fuel through the first variable restriction device.

5. The system of claim 3, further comprising a second variable restriction device having a first port for connection to the third port of the first variable restriction device and a second port for connection to the second port of the second coupling point.

6. The system of claim 5, wherein adjustment of the second variable restriction device between an opened position and a closed position, adjusts an outputted reading of the second sensor.

7. The system of claim 6, wherein the second sensor outputs a reading that is intended to be redundant with readings from the first sensor when the second variable restriction device is closed and the second sensor outputs a reading that is intended to be redundant with readings from the third sensor when the second variable restriction device is opened.

8. The system of claim 5, further comprising:
an actuator connected to the second variable restriction device, and having the control terminal connected to the third terminal of the processor; and
wherein a signal to the control terminal of the actuator can vary a restriction of the second variable restriction device to a flow of fuel through the second variable restriction device.

9. The system of claim 2, wherein the processor is configured to regulate an air to fuel ratio based on readings from the first sensor and the third sensor.

10. The system of claim 2, wherein the processor is configured to test one of the first sensor and the third sensor based on comparing readings from the second sensor to readings from the one of the first sensor and the second sensor.

11. A burner control system comprising:
a first flow path having an input from an air supply;
a second flow path having an input from the air supply and a fuel supply;
a third flow path having a first arrangement with an input only from the air supply and a second arrangement with an input from the air supply and the fuel supply;
a sensor in communication with the third flow path;
a processor in communication with the sensor, wherein the processor is configured to selectively configure the third flow path in the first arrangement such that the sensor senses a measure indicative of a measure in the first flow path and selectively configure the third flow path in the second arrangement such that the sensor senses a measure indicative of a measure in the second flow path;
a sensor in communication with the first flow path; and a sensor in communication with the second flow path.

12. The system of claim 11, wherein the processor is configured to:
receive a measure sensed by the sensor in communication with the first flow path;

receive a measure sensed by the sensor in communication with the third flow path when the third flow path is in the first arrangement;

compare the measure sensed by the sensor in communication with the first flow path to the measure sensed by the sensor in communication with the third flow path; and provide an alert if the measure sensed by the sensor in communication with the first flow path differs from the measure sensed by the sensor in communication with the third flow path by an amount greater than a threshold amount.

13. The system of claim 11, wherein the processor is configured to:

receive a measure sensed by the sensor in communication with the second flow path;

receive a measure sensed by the sensor in communication with the third flow path when the third flow path is in the second arrangement;

compare the measure sensed by the sensor in communication with the second flow path to the measure sensed by the sensor in communication with the third flow path; and provide an alert if the measure sensed by the sensor in communication with the second flow path differs from the measure sensed by the sensor in communication with the third flow path by an amount greater than a threshold amount.

14. The system of claim 11, further comprising:

a first variable restriction device in communication with the third flow path and the processor; and wherein the processor is configured to send a signal to the first variable restriction device to selectively configure the third flow path in one of the first arrangement and the second arrangement.

15. The system of claim 14, further comprising:

a second variable restriction device in communication with the fuel supply and the processor; and wherein the processor is configured to send a signal to the second variable restriction device to selectively provide a fuel flow input to the second flow path and the third flow path.

16. A method of testing a burner control system, the method comprising:

receiving a measure sensed by a first sensor in communication with a first flow path having an air supply input;

receiving a measure sensed by a second sensor in communication with a second flow path having an air supply and a fuel supply;

adjusting a third flow path to one of a first configuration in which the third flow path has an input from only the air supply and a second configuration in which the third flow path has an input from the air supply and the fuel supply;

receiving a measure sensed by a third sensor in communication with the third flow path; and comparing the measure sensed the third sensor to one or both of the measure sensed by the first sensor and the measure sensed by the second sensor.

17. The method of claim 16, wherein if the third flow path is in the first configuration, the comparing step includes comparing the measure sensed by the third sensor to the measure sensed by the first sensor; and if the third flow path is in the second configuration, the comparing step includes comparing the measure sensed by the third sensor to the measure sensed by the second sensor.

18. The method of claim 16, further comprising triggering an alert if the measure sensed by the third sensor differs by more than a threshold amount from one or more of the measure sensed by the first sensor and the measure sensed by the second sensor.

19. The method of claim 16, wherein adjusting the third flow path to one of the first configuration and the second configuration includes sending a signal from a processor to a variable restriction device in communication with the third flow path.

* * * * *